United States Patent
Dichter et al.

(10) Patent No.: US 12,537,270 B2
(45) Date of Patent: *Jan. 27, 2026

(54) ELECTRODE STACK ASSEMBLY FOR A METAL HYDROGEN BATTERY

(71) Applicant: EnerVenue Holdings, Ltd., Fremont, CA (US)

(72) Inventors: Nelson Dichter, Oakland, CA (US); Jingyi Zhu, San Jose, CA (US); Ge Zu, San Jose, CA (US); Majid Keshavarz, Pleasanton, CA (US)

(73) Assignee: EnerVenue Holdings, Ltd., Fremont, CA (US)

( * ) Notice: Subject to any disclaimer, the term of this patent is extended or adjusted under 35 U.S.C. 154(b) by 661 days.

This patent is subject to a terminal disclaimer.

(21) Appl. No.: 17/830,193

(22) Filed: Jun. 1, 2022

(65) Prior Publication Data
US 2023/0395951 A1    Dec. 7, 2023

(51) Int. Cl.
| | |
|---|---|
| *H01M 50/54* | (2021.01) |
| *H01M 10/04* | (2006.01) |
| *H01M 12/06* | (2006.01) |
| *H01M 50/26* | (2021.01) |
| *H01M 50/46* | (2021.01) |
| *H01M 50/466* | (2021.01) |

(52) U.S. Cl.
CPC ....... *H01M 50/54* (2021.01); *H01M 10/0468* (2013.01); *H01M 12/065* (2013.01); *H01M 50/26* (2021.01); *H01M 50/46* (2021.01); *H01M 50/466* (2021.01)

(58) Field of Classification Search
CPC ...... H01M 50/54; H01M 50/26; H01M 50/46; H01M 50/466; H01M 10/0468; H01M 12/065
See application file for complete search history.

(56) References Cited

U.S. PATENT DOCUMENTS

| | | | |
|---|---|---|---|
| 4,115,630 | A | 9/1978 | Van Ommering et al. |
| 4,324,845 | A | 4/1982 | Stockel |
| 4,395,469 | A * | 7/1983 | Fritts .................. H01M 10/345 429/513 |
| 2008/0096096 | A1 * | 4/2008 | Komori ................. H01M 50/30 429/72 |

OTHER PUBLICATIONS

International Search Report and Written Opinion for PCT/US2023/067635, dated Feb. 12, 2024, 14 pages.

* cited by examiner

*Primary Examiner* — James Lee
(74) *Attorney, Agent, or Firm* — Haynes and Boone, LLP

(57) ABSTRACT

An electrode stack can include a plurality of anode assemblies, each anode assembly including at least one anode layer attached to an anode tab; a plurality of cathode assemblies, each cathode assembly including at least one cathode layer attached to a cathode tab; a plurality of separators; an anode feedthrough bridge arranged to engage each anode tab of each of the plurality of anode assemblies; a cathode feedthrough bridge arranged to engage each cathode tab of each of the plurality of cathode assemblies; an anode feedthrough terminal coupled to the anode feedthrough bridge; and a cathode feedthrough terminal coupled to the cathode feedthrough bridge, wherein the plurality of anode assemblies and the plurality of cathode assemblies are alternately arranged and separated by the plurality of separators to form an electrode stack. A battery is also presented.

16 Claims, 33 Drawing Sheets

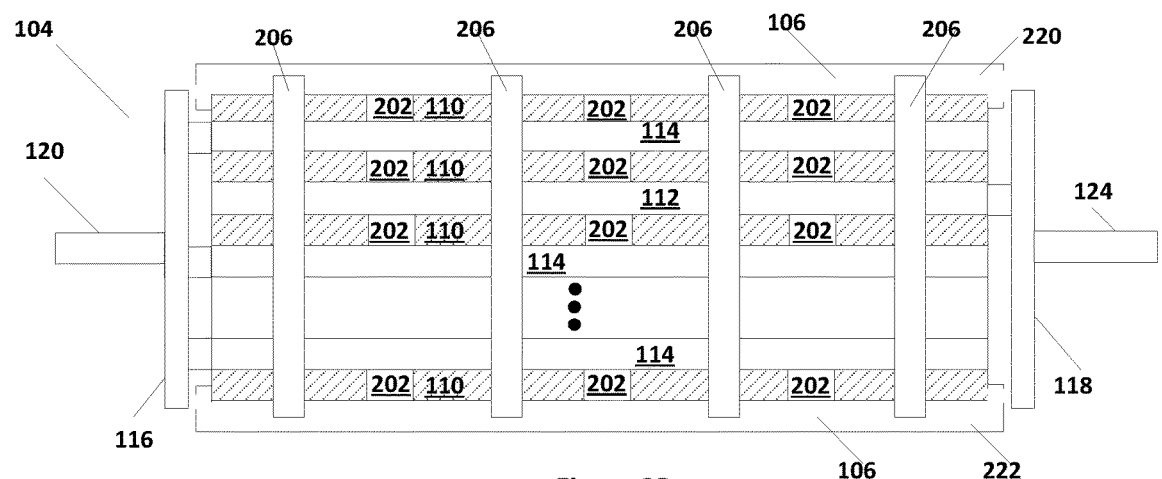
Figure 2B
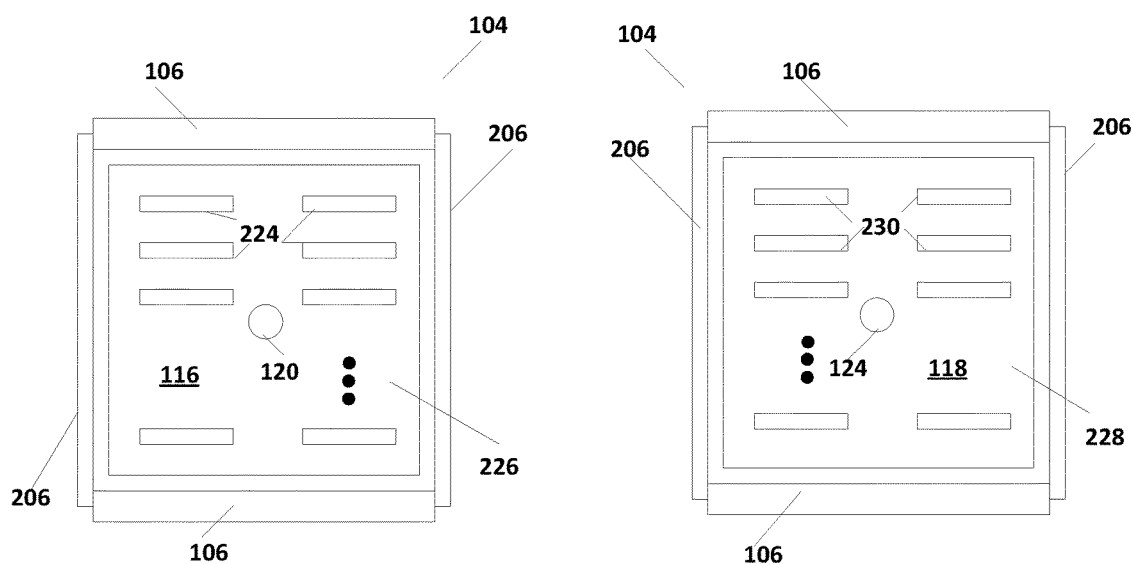
Figure 2C
Figure 2D

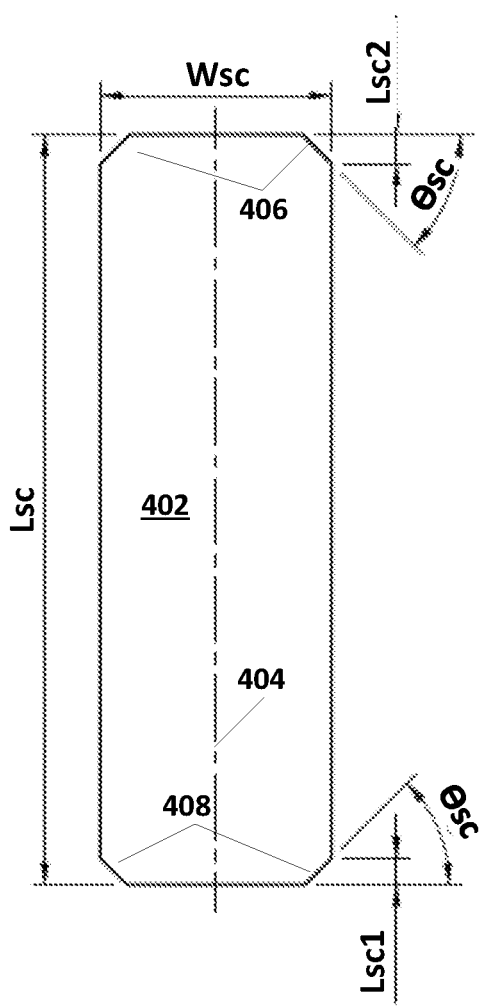
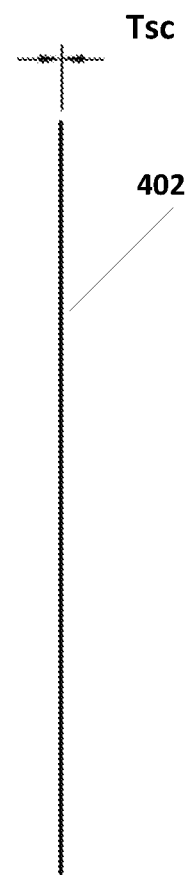
Figure 4A    Figure 4B
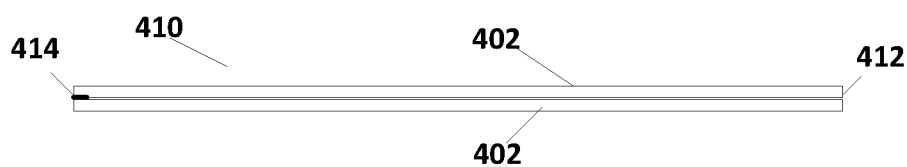
Figure 4C

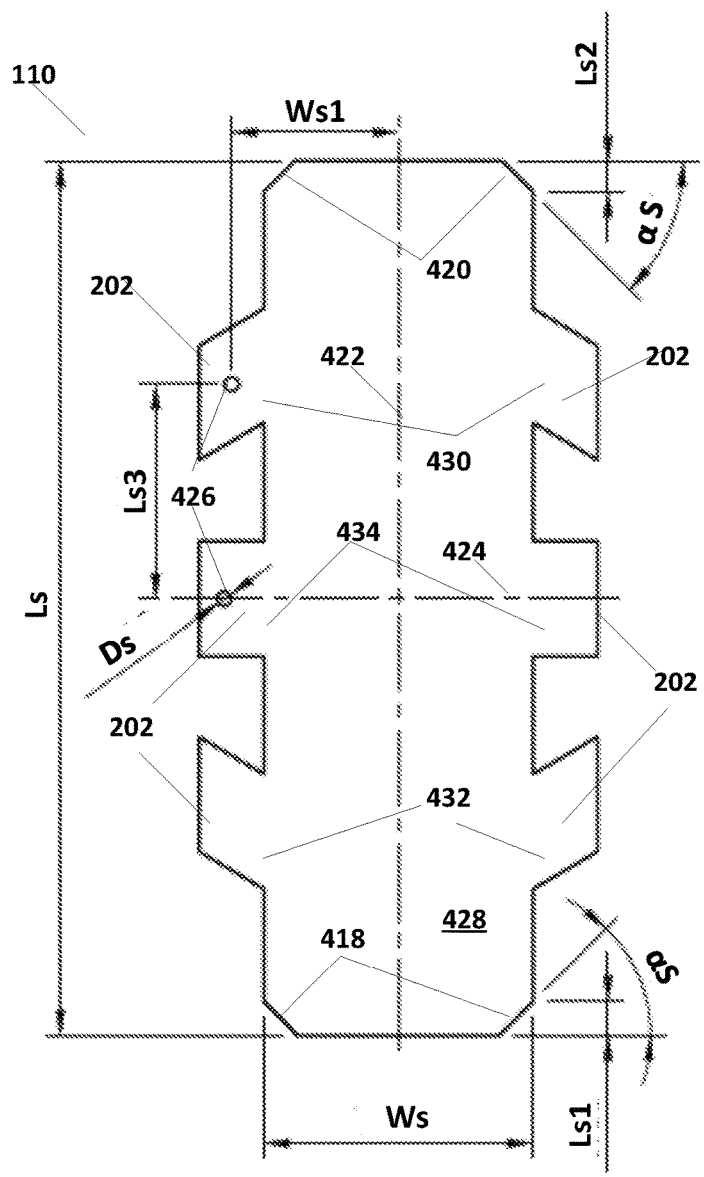
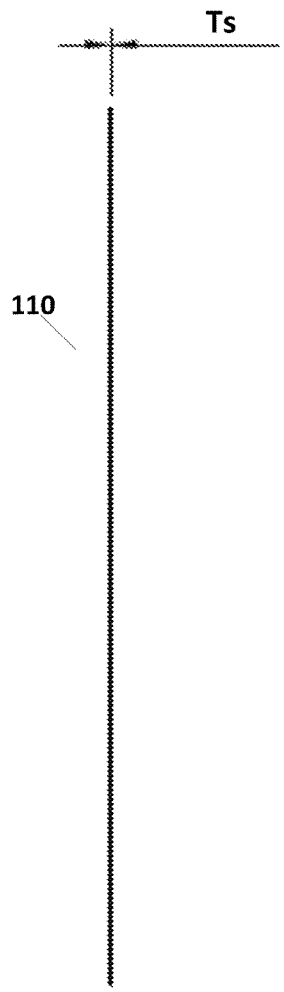
Figure 4D                    Figure 4E

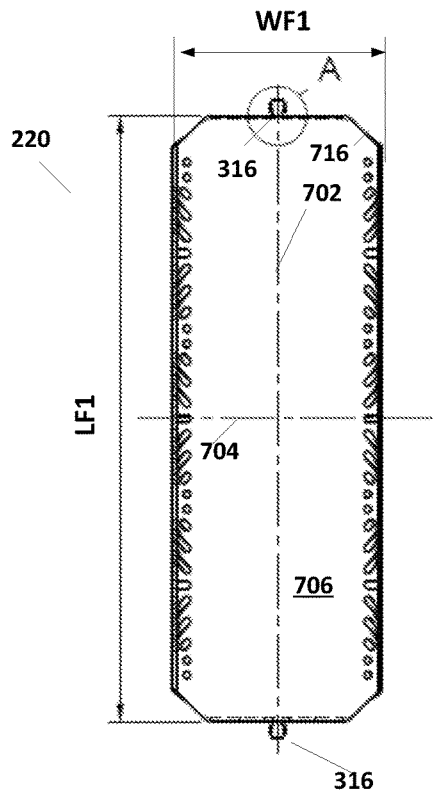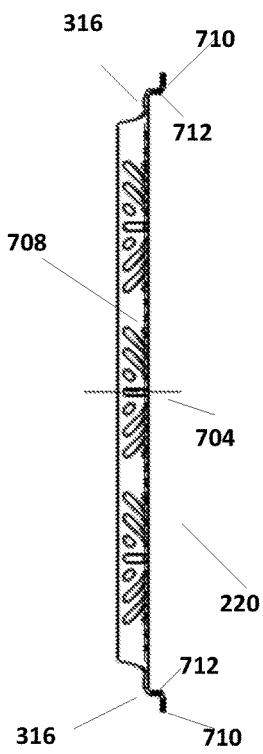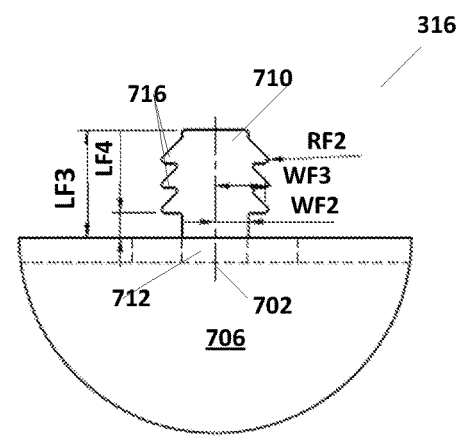
Figure 7D
Figure 7A
Figure 7C
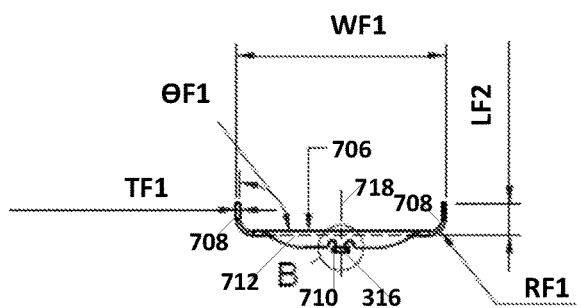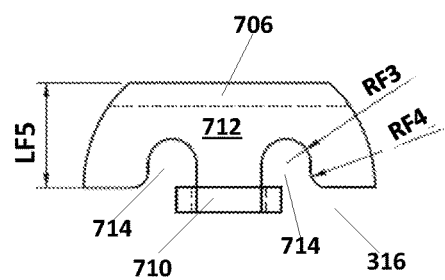
Figure 7B
Figure 7E

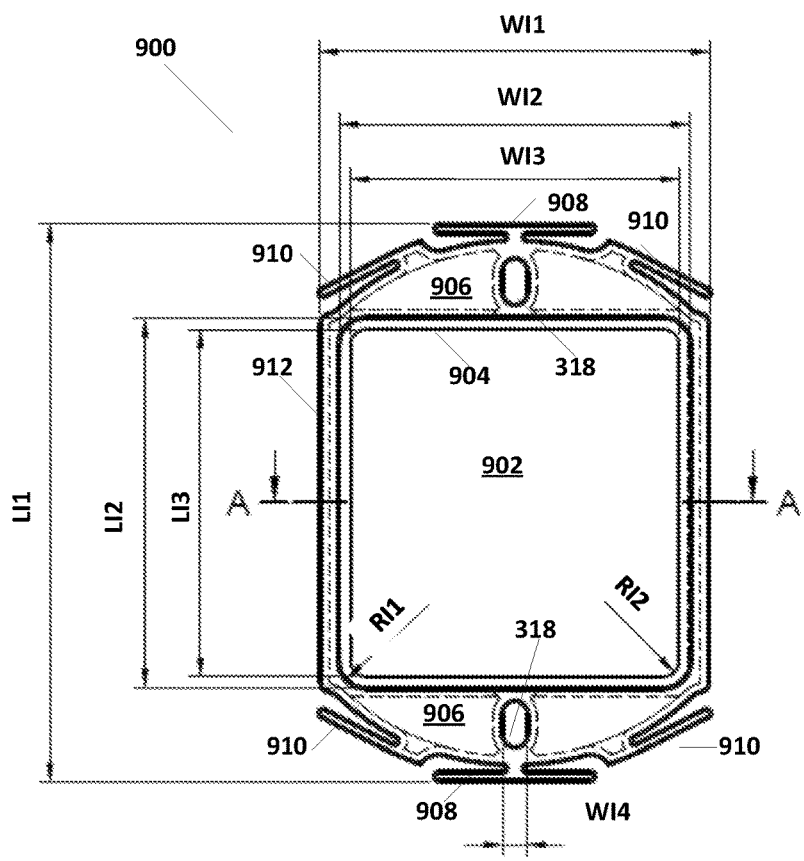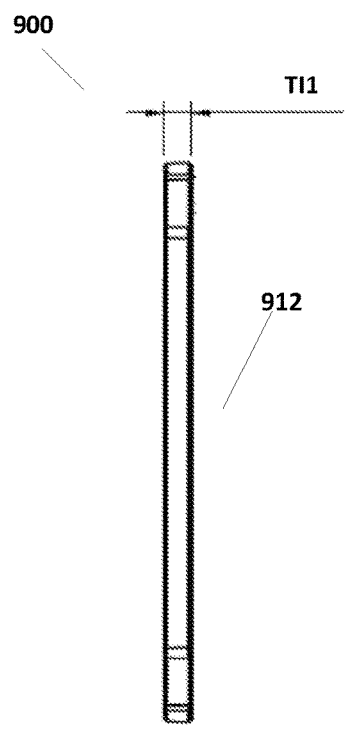
Figure 9A
Figure 9B
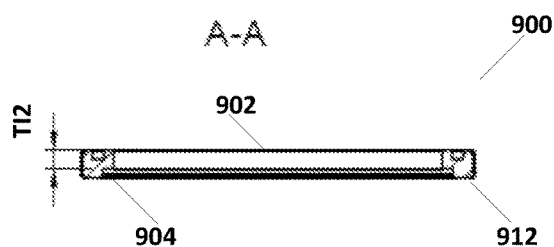
Figure 9C

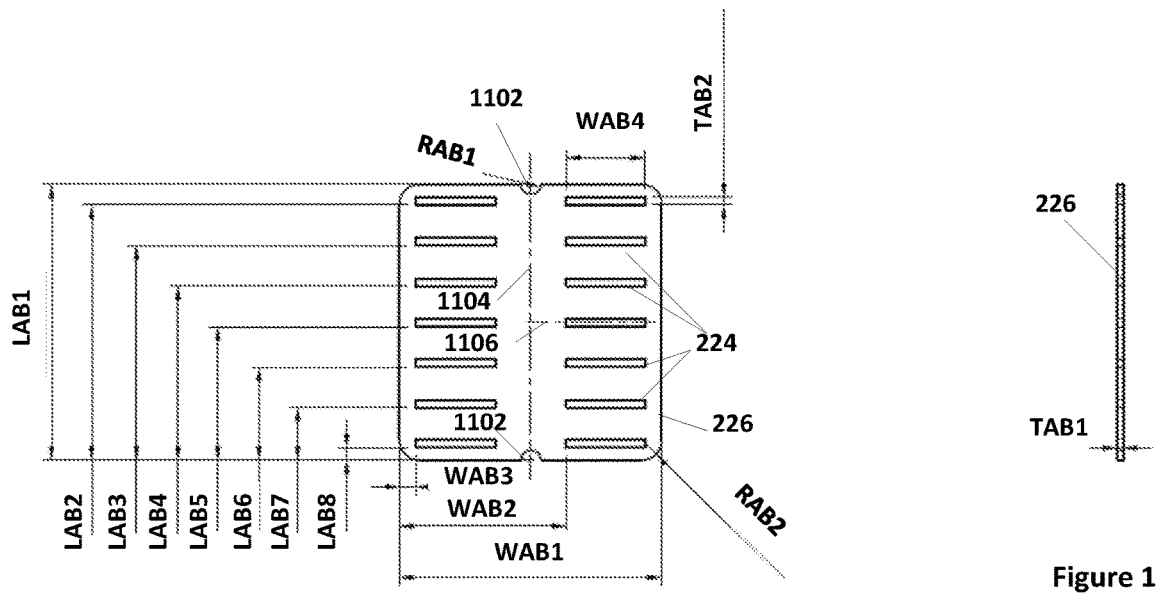
Figure 11A
Figure 11B
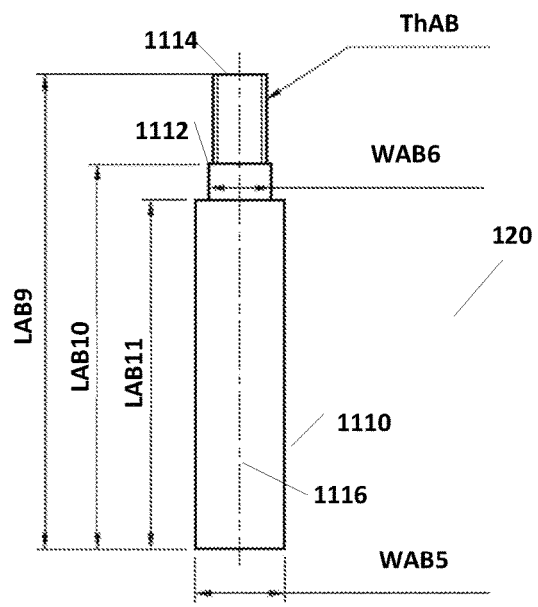
Figure 11C
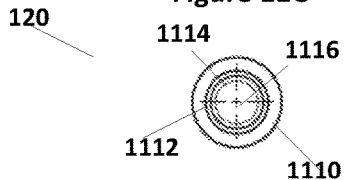
Figure 11D

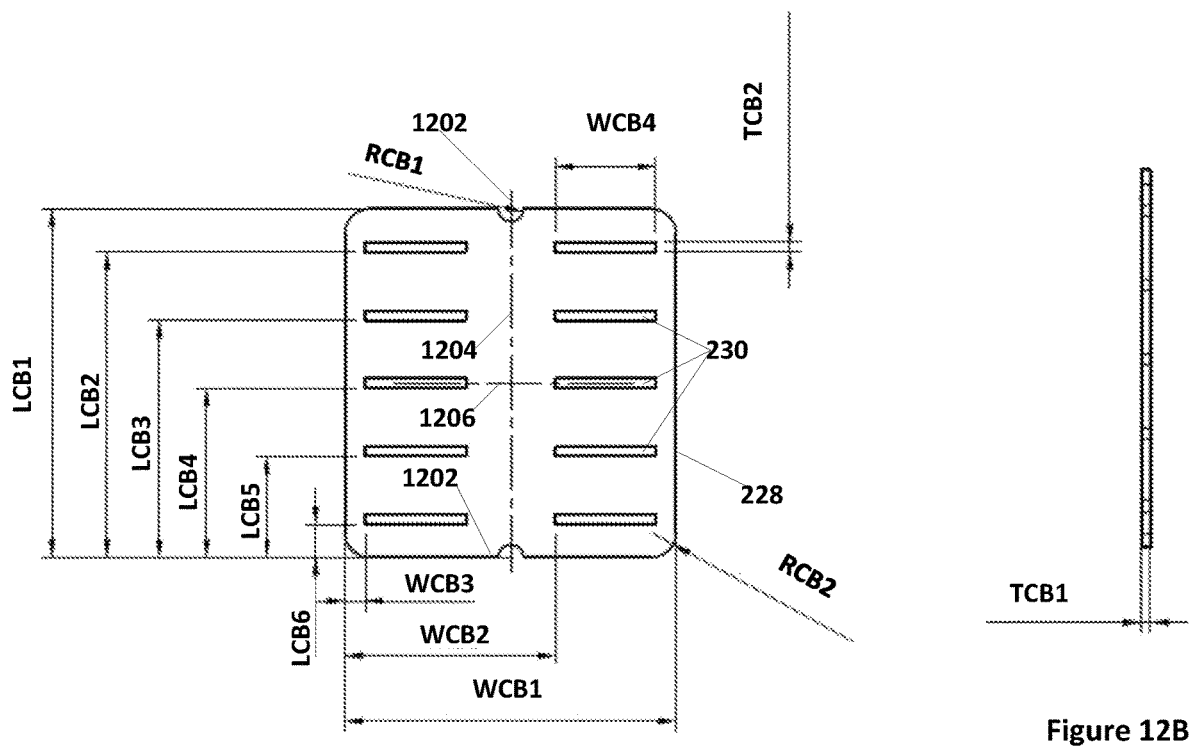
Figure 12A
Figure 12B
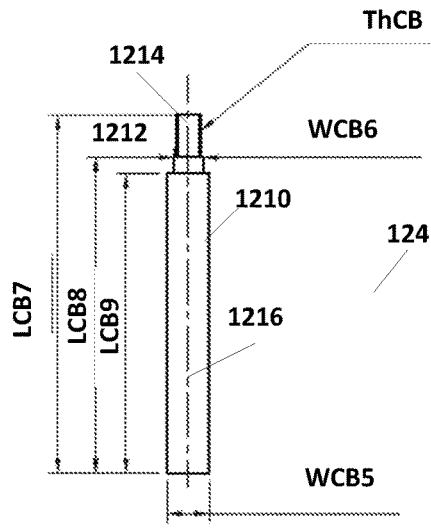
Figure 12C
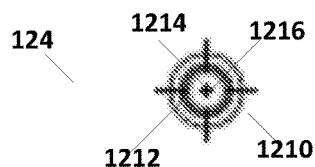
Figure 12D

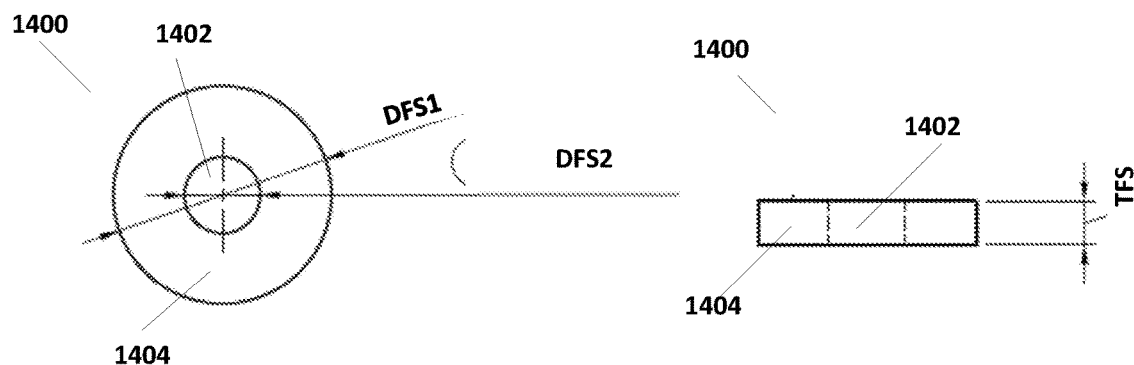
Figure 14A
Figure 14B
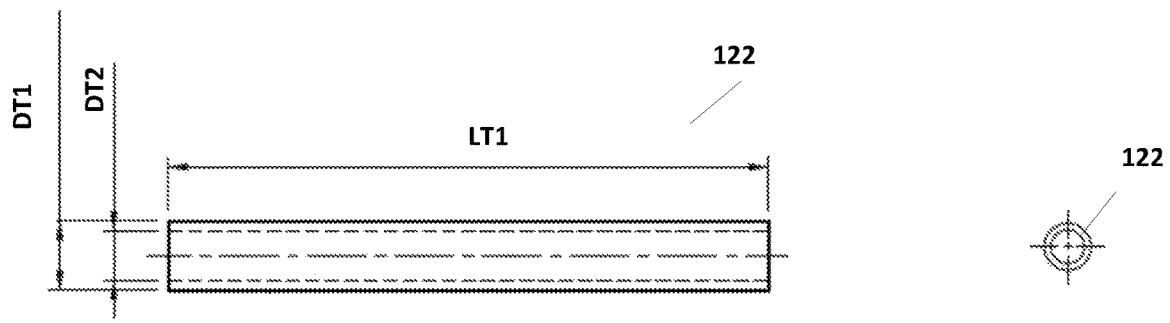
Figure 15A
Figure 15B

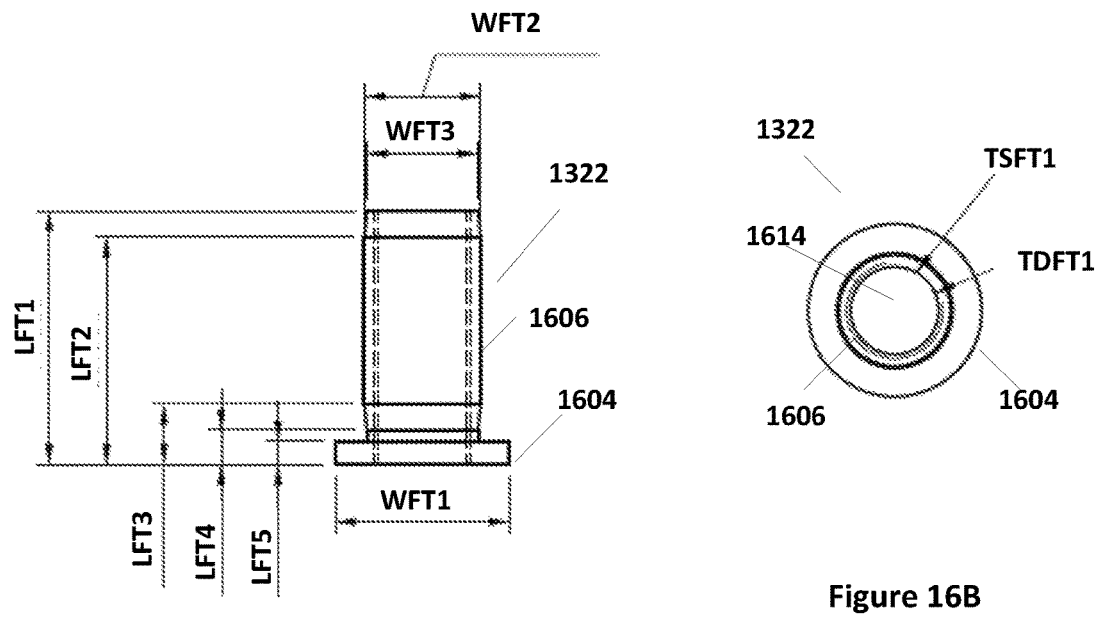
Figure 16A
Figure 16B
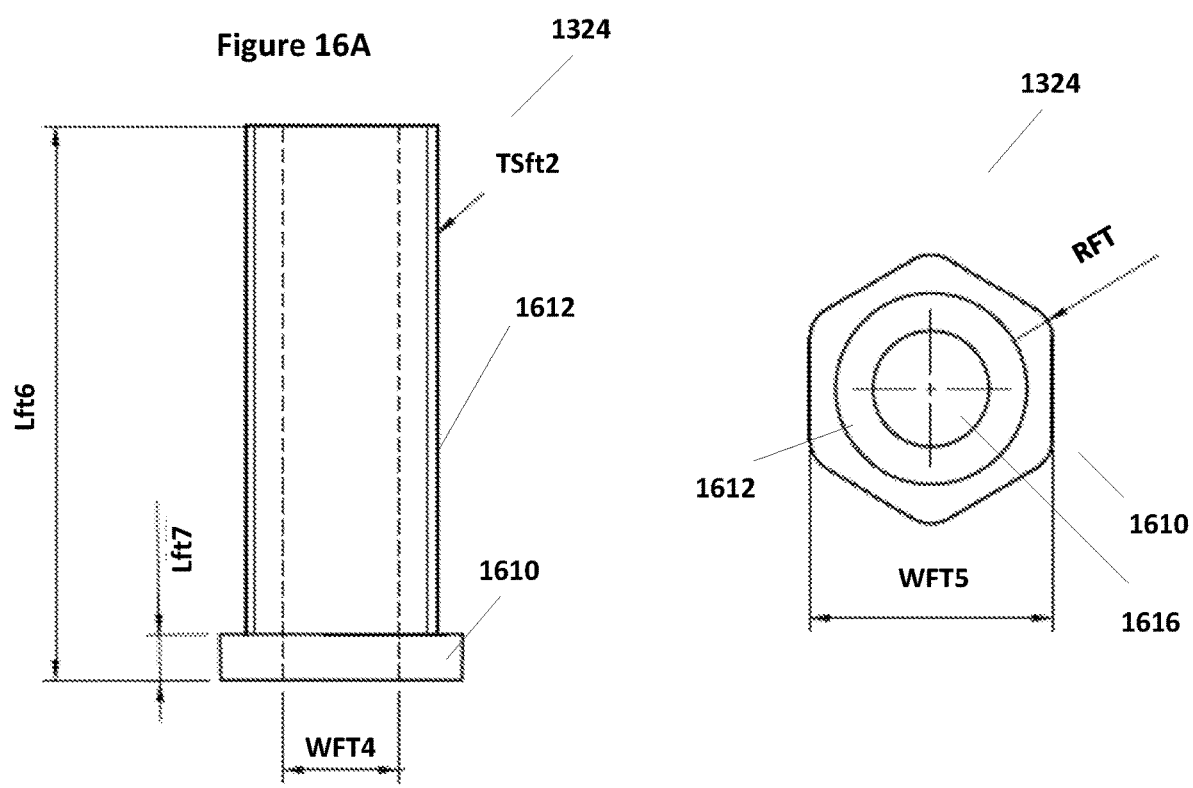
Figure 16C
Figure 16D

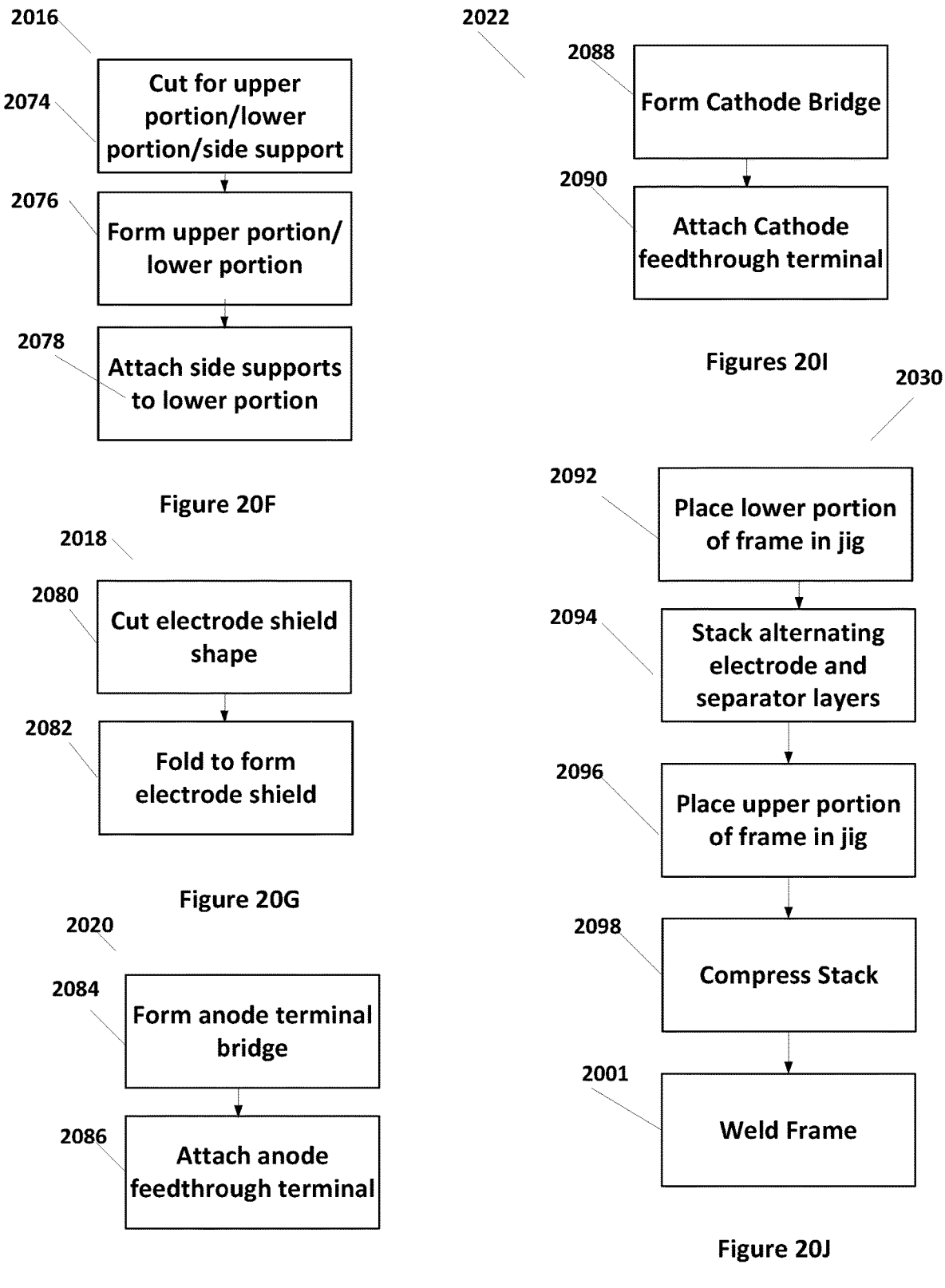

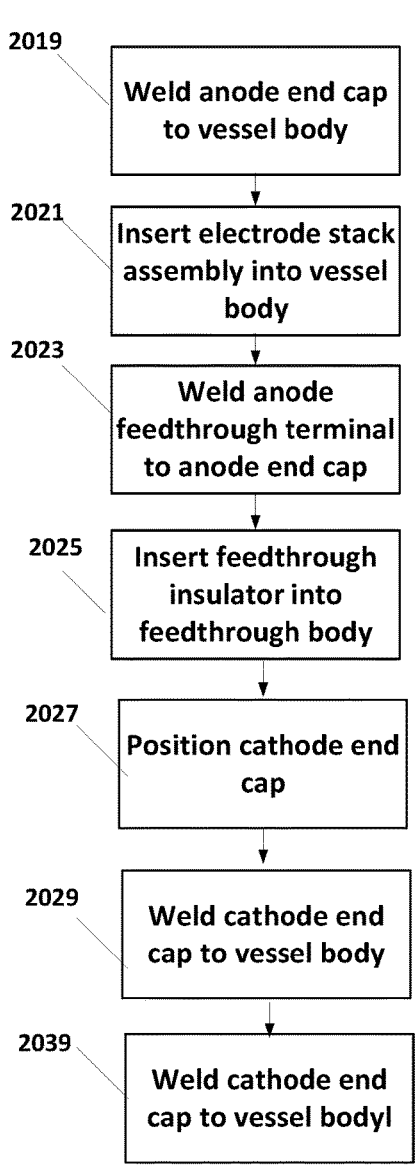
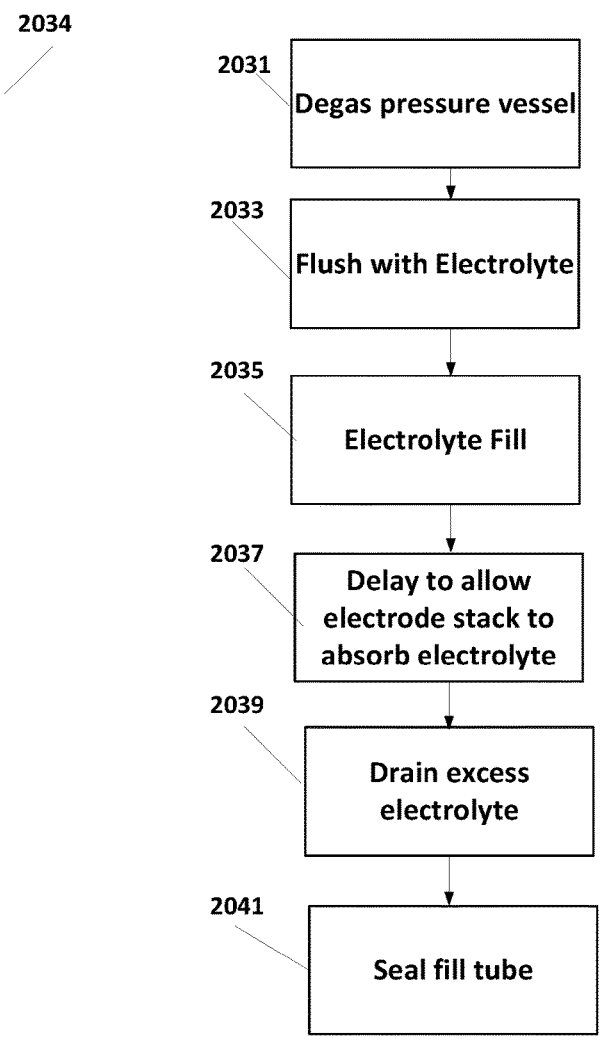
Figure 20N                    Figure 20O

ELECTRODE STACK ASSEMBLY FOR A METAL HYDROGEN BATTERY

TECHNICAL FIELD

Embodiments of the present invention are related to metal-hydrogen batteries and, in particular, to configurations of metal-hydrogen batteries.

DISCUSSION OF RELATED ART

For renewable energy resources such as wind and solar to be competitive with traditional fossil fuels, large-scale energy storage systems are needed to mitigate their intrinsic intermittency. To build a large-scale energy storage, the cost and long-term lifetime are the utmost considerations. Currently, pumped-hydroelectric storage dominates the grid energy storage market because it is an inexpensive way to store large quantities of energy over a long period of time (about 50 years), but it is constrained by the lack of suitable sites and the environmental footprint. Other technologies such as compressed air and flywheel energy storage show some different advantages, but their relatively low efficiency and high cost should be significantly improved for grid storage. Rechargeable batteries offer great opportunities to target low-cost, high capacity and highly reliable systems for large-scale energy storage. Improving reliability of rechargeable batteries has become an important issue to realize a large-scale energy storage.

Consequently, there is a need for better metal-hydrogen battery configurations.

SUMMARY

In accordance with embodiments of this disclosure an electrode stack and battery formed with the electrode stack is disclosed.

An electrode stack assembly for a metal hydrogen battery according to some embodiments includes a plurality of anode assemblies, each anode assembly including at least one anode layer attached to an anode tab; a plurality of cathode assemblies, each cathode assembly including at least one cathode layer attached to a cathode tab; a plurality of separators; an anode feedthrough bridge arranged to engage each anode tab of each of the plurality of anode assemblies; a cathode feedthrough bridge arranged to engage each cathode tab of each of the plurality of cathode assemblies; an anode feedthrough terminal coupled to the anode feedthrough bridge; and a cathode feedthrough terminal coupled to the cathode feedthrough bridge, wherein the plurality of anode assemblies and the plurality of cathode assemblies are alternately arranged and separated by the plurality of separators to form an electrode stack.

A metal hydrogen battery according to some embodiments includes an electrode stack assembly, the electrode stack assembly including: a plurality of anode assemblies, each anode assembly including at least one anode layer attached to an anode tab, a plurality of cathode assemblies, each cathode assembly including at least one cathode layer attached to a cathode tab, a plurality of separators, an anode feedthrough bridge arranged to engage each anode tab of each of the plurality of anode assemblies, a cathode feedthrough bridge arranged to engage each cathode tab of each of the plurality of cathode assemblies, an anode feedthrough terminal coupled to the anode feedthrough bridge; and a cathode feedthrough terminal coupled to the cathode feedthrough bridge, wherein the plurality of anode assemblies, the plurality of cathode assemblies, and the plurality of separators are alternately arranged to form an electrode stack; a pressure vessel surrounding the electrode stack assembly such that the cathode feedthrough terminal extends through the pressure vessel; and an electrolyte contained within the pressure vessel.

A method of forming an electrode stack assembly for a metal hydrogen battery, according to some embodiments includes: preassembling components of the electrode stack assembly by assembling a plurality of cathode assemblies, each cathode assembly having cathode tabs attached to one or more cathode material layers, assembling a plurality of anode assemblies, each anode assembly having anode tabs coupled to one or more anode material layers, forming a plurality of separators from separator material, forming frame top portions and frame bottom portions, forming an anode feedthrough bridge assembly, and forming a cathode feedthrough bridge assembly; stacking the separators, anode assemblies, and cathode assemblies in alternate fashion between the frame top portion and the frame bottom portion to capture the electrodes between the frame top portion and the frame bottom portion; pressing the electrodes, the frame top portion, and the frame bottom portion; forming an electrode stack by attaching the frame top portion to the frame bottom portion to form a frame; attaching cathode tabs of the plurality of cathode assemblies in the electrode stack to the cathode feedthrough bridge assembly; and attaching anode tabs of the plurality of anode assemblies in the electrode stack to the anode feedthrough bridge assembly.

A method of forming a hydrogen metal battery according to some embodiments includes: forming an electrode stack assembly, wherein forming the electrode stack assembly includes: assembling a plurality of cathode assemblies, each cathode assembly having cathode tabs attached to one or more cathode material layers, assembling a plurality of anode assemblies, each anode assembly having anode tabs coupled to one or more anode material layers, forming a plurality of separators from separator material, forming frame top portions and frame bottom portions, forming an anode feedthrough bridge assembly that includes an anode feedthrough terminal, forming a cathode feedthrough bridge assembly that includes a cathode feedthrough terminal, stacking the separators, anode assemblies, and cathode assemblies in alternate fashion between the frame top portion and the frame bottom portion to capture the electrodes between the frame top portion and the frame bottom portion, pressing the electrodes, the frame top portion, and the frame bottom portion, forming an electrode stack by attaching the frame top portion to the frame bottom portion to form a frame, attaching cathode tabs of the plurality of cathode assemblies in the electrode stack to the cathode feedthrough bridge assembly, and attaching anode tabs of the plurality of anode assembles in the electrode stack to the anode feedthrough bridge assembly; attaching an anode end cap to a vessel side wall; inserting the electrode stack assembly into the vessel side wall so that the anode feedthrough terminal engages with the anode end cap; attaching a cathode end cap to the vessel side wall such that the cathode feedthrough terminal passes through a feedthrough in the cathode end cap.

These and other embodiments are discussed below with respect to the following figures.

BRIEF DESCRIPTION OF THE FIGURES

An understanding of the features and advantages of the technology described in this disclosure will be obtained by reference to the following detailed description that sets forth illustrative aspects with reference to the following figures.

FIGS. 2A, 2B, 2C, and 2D illustrate an example of an electrode stack assembly according to some aspects of the present disclosure.

FIGS. 4A, 4B, and 4C illustrate a separator pouch according to some aspects of the present disclosure.

FIGS. 4D and 4E illustrate a separator according to some aspects of the present disclosure.

FIGS. 7A, 7B, 7C, 7D, 7E, 7F, 7G, 7H, 7I, and 7J illustrate an electrode stack assembly frame according to some embodiments of the present disclosure.

FIGS. 9A, 9B, and 9C illustrate an isolator of the electrode stack assembly according to some embodiments of the present disclosure.

FIGS. 11A, 11B, 11C, 11D, 11E, and 11F illustrate an anode feedthrough bridge and anode feedthrough terminal according to some embodiments of the present disclosure.

FIGS. 12A, 12B, 12C, 12D, 12E, and 12F illustrate a cathode feedthrough bridge and cathode feedthrough terminal according to some embodiments of the present disclosure.

FIGS. 14A and 14B illustrate a feedthrough shoulder according to some embodiments of the present disclosure.

FIGS. 15A and 15B illustrate a fill tube according to some embodiments of the present disclosure.

FIGS. 16A, 16B, 16C, and 16D illustrate an example of a feedthrough as illustrated in FIGS. 13A and 13B according to some embodiments of the present disclosure.

FIGS. 20A, 20B, 20C, 20D, 20E, 20F, 20G, 20H, 20I, 20J, 20K, 20L, 20M, 20N, and 20O illustrate an example method of constructing an electrode stack assembly and a battery according to some aspects of the present disclosure.

Figure 1:
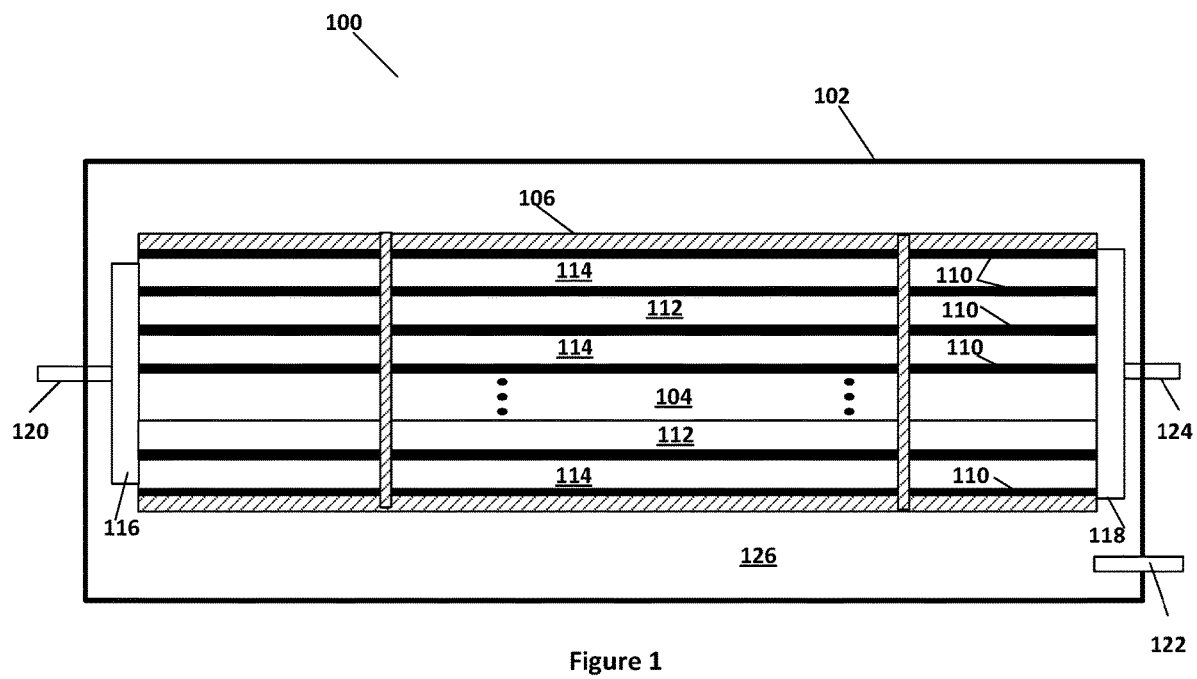
FIG. 1 illustrates an example of a metal-hydrogen battery according to some aspects of the present disclosure.

These figures are further discussed below.

DETAILED DESCRIPTION

In the following description, specific details are set forth describing some aspects of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. Such modifications may include substitution of known equivalents for any aspect of the disclosure in order to achieve the same result in substantially the same way.

Consequently, this description illustrates inventive aspects and embodiments that should not be taken as limiting—the claims define the protected invention. Various changes may be made without departing from the spirit and scope of this description and the claims. In some instances, well-known structures and techniques have not been shown or described in detail in order not to obscure the invention.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Further, individual values provided for particular components are for example only and are not considered to be limiting. Specific dimensional values for various components are there to provide a specific example only and one skilled in the art will recognize that the aspects of this disclosure can be provided with any dimensions. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In the figures, relative sizes of components are not meaningful unless stated otherwise and should not be considered limiting. Components are sized in the figures to better describe various features and structures without consideration of the displayed sizes with respect to other components. Further, although specific dimensions to describe one example of a battery, those specific dimensions are provided as an example only and are not limiting. Batteries according to aspects of the following disclosure can be formed having any dimensions with components having any relative dimensions.

Metal-hydrogen batteries can be configured in a number of ways. In each case, the battery itself includes an electrode stack with a series of electrodes (alternating cathodes and anodes) separated by electrically insulating separators. The electrode stack is housed in a pressure vessel that contains an electrolyte and hydrogen gas. The electrode stack can provide an array of cells (i.e., pairs of cathode and anode electrodes) that can be electrically coupled in series or in parallel. An electrode stack according to aspects of the present disclosure are arranged such that the cells formed in the array of electrodes are coupled in parallel. The electrode stack can be arranged in an individual pressure vessel (IPV), where each electrode stack is housed in a separate IPV.

Embodiments according to the present disclosure include an electrode stack that includes stacked alternating cathode and anode electrodes. Each of the cathode and anode electrodes includes tabs. The tabs from the cathode electrodes can be inserted into slots in a cathode bridge while tabs from the anode electrodes can be inserted into slots in an anode bridge. Terminals can be attached to the cathode bridge and the cathode bridge to complete an electrode stack assembly.

FIG. 1 depicts a schematic depiction of an IPV metal-hydrogen battery 100 according to some aspects of the present disclosure. The metal-hydrogen battery 100 includes electrode stack assembly 104 that includes stacked electrodes separated by separators 110. The electrodes include cathodes 112, anodes 114, and separators 110 disposed between the cathode 112 and the anode 114. Separator 110 is saturated with an electrolyte 126. In some embodiments, separator 110, in addition to electrically separating cathode 112 and anode 114, also provides a reservoir of electrolyte 126 that buffers the electrodes form either drying out or flooding during operation.

Each pair of cathode 112 and anode 114 can be considered a cell, although there may be additional electrode layers that are not paired. The electrode stack assembly 104 can be housed in a pressure vessel 102. An electrolyte 126 is disposed in pressure vessel 102. The cathode 112, the anode 114, and the separator 110 are porous to keep electrolyte 126 and allow ions in electrolyte 126 to transport between the cathode 112 and the anode 114. In some embodiments, the separator 110 can be omitted as long as the cathode 112 and the anode 114 can be electrically insulated from each other. For example, the space occupied by the separator 110 may be filled with the electrolyte 126. The metal-hydrogen battery 100 can further include a fill tube 122 configured to introduce electrolyte or gasses (e.g. hydrogen) into pressure vessel 102. Fill tube 122 may include one or more valves (not shown) to control flows into and out of the enclosure of pressure vessel 102 or fill tube 122 may be otherwise sealable after charging pressure vessel 102 with electrolyte 126 and hydrogen gas.

As shown in FIG. 1, electrode stack assembly 104 includes a number of stacked layers of alternating cathode 112 and anode 114 separated by a separator 110. Cells can be formed by pairs of cathode 112 and anode 114. Although the cells in an electrode stack assembly 104 may be coupled either in parallel or in series, in the example of battery 100 illustrated in FIG. 1 the cells are coupled in parallel. In particular, each of cathodes 112 are coupled to a conductor 118 and each of anodes 114 are coupled to conductor 116. Although FIG. 1 illustrates that fill tube 122 is positioned on the side of cathode conductor 118, fill tube 122 may alternatively be placed on the side of anode conductor 116, or otherwise placed anywhere on pressure vessel 102.

As is illustrated in FIG. 1, conductor 116, which is coupled to anodes 114, is electrically coupled to an anode feedthrough terminal 120, which may present the negative terminal of battery 100. Terminal 120 can include a feedthrough to allow terminal 120 to extend outside of pressure vessel 102, or conductor 116 may be connected directly to pressure vessel 102. Similarly, cathode conductor 118, which is coupled to cathode 112, can be coupled to a cathode feedthrough terminal 124 that represents the positive side of battery 100. Terminal 124 also pass through an insulated feedthrough to allow terminal 124 to extend to the outside of pressure vessel 102.

As discussed above, each cell included in electrode stack 104 includes a cathode 112 and an anode 114 that are separated by separators 110. Electrode stack assembly 104 is positioned in pressure vessel 102 where an electrolyte 126 is kept and ions in electrolyte 126 can transport between cathode 112 and anode 114. As is discussed further below, cathode 112 is formed of a porous conductive substrate coated by a porous compound. Similarly, anode 114 is formed of a porous conductive substrate coated by a porous catalyst. Separator 110 is a porous insulator that can separate alternating layers of cathode 112 and anode 114 to keep electrolyte 126 and let ions in electrolyte 126 to transport between cathode 112 and anode 114. In some embodiments, the electrolyte 126 is an aqueous electrolyte that is alkaline (with a pH greater than 7). Each of anode 114 and cathode 112 can be formed as anode or cathode assemblies with multiply layered structures, as is discussed further below.

As is illustrated in FIG. 1, electrode stack 104 can be fixed within a frame 106. Further, electrode stack assembly 104 can be organized with anode layer 114 on both sides, next to frame 106, in order to isolate cathode layers 112 from frame 106. Additionally, a separator 110 can be included adjacent to frame 106 for further isolation, or in some embodiments top and bottom anode layers 114 can be directly adjacent frame 106.

Electrode stack assembly 104, the core of battery 100, operates chemically to charge and discharge battery 100 through a hydrogen evolution reaction (HER) and a hydrogen oxidation reaction (HOR). These reactions are more mechanistically complex in alkaline conditions than in acidic conditions. Active alkaline HER/HOR catalysts tend to have more dynamic surfaces. In acidic conditions, the reactions proceed via the reduction of $H^+$ to $H_2$ or the oxidation of $H_2$ to $H^+$. The activity of a catalyst for these reactions in acidic conditions can be closely correlated to the binding energy of hydrogen to the metal surface. If hydrogen binds too strongly or too weakly, the catalytic process cannot effectively proceed and the kinetic overpotential will be large. Platinum has an ideal binding energy for hydrogen and demonstrates better HER/HOR performance than any other catalyst in low pH solutions. In alkaline conditions, the concentration of free H+ is essentially zero, and thus the HER first proceeds via the cleavage of the H—O bond of a water molecule to generate a surface-adsorbed hydrogen atom and a hydroxide anion according to Eq. 1 below. This step is slow on metal surfaces, resulting in alkaline HER exchange current densities that are two to three orders of magnitude smaller than in acid on the same metal. Hydrogen gas is generated according to Eq. 2 or Eq. 3 below. This step (Eq. 1) occurs in reverse as the last step of HOR and is also rate determining as metal surfaces do not interact strongly with the hydroxide anions required to complete the reaction and form $H_2O$.

$$H_2O + M + e- \leftrightarrow MH_{ad} + OH- \qquad \text{Eq. 1}$$

$$MH_{ad} + H_2O + e- \leftrightarrow M + H_2 + OH- \qquad \text{Eq. 2}$$

$$MHad + MHad \leftrightarrow 2M + H_2 \qquad \text{Eq. 3}$$

To expedite both HER and HOR on the catalyst, a catalyst material is provided that contains (i) metal sites to bind with hydrogen and (ii) metal oxide/metal hydroxide sites to bind with hydroxide anions. The interfaces where metal and metal oxide meet are highly active for both HER and HOR and an optimal ratio of metal-to-metal oxide is maintained to achieve high catalyst activity. If the catalyst surface becomes too oxidized during prolonged, or high overpotential, HOR, the catalyst surface can become deactivated and the battery performance will suffer as a result.

Accordingly, anode 114 is a catalytic hydrogen electrode. In some embodiments, as discussed above, anode 114 includes a porous conductive substrate with a catalyst layer covering the porous conductive substrate. The catalyst layer of anode 114 can cover the outer surface of the porous conductive substrate of anode 114 and, since the porous conductive substrate has internal pores or interconnected channels, can also cover the surfaces of those pores and channels. The catalyst layer includes a bi-functional catalyst to catalyze both HER and HOR at anode 114. In some embodiments, the porous conductive substrate of anode 114 can have a porosity of at least about 10%, at least about 20%, at least about 30%, at least about 40%, or at least about 50%, and up to about 80%, up to about 90%, up to about 95% or greater. In some embodiments, the porous conductive substrate of anode 114 can be a metal foam, such as a nickel foam, a copper foam, an iron foam, a steel foam, an aluminum foam, or others. In some embodiments, the porous conductive substrate of anode 114 can be a metal alloy foam, such as a nickel-molybdenum foam, a nickel-copper foam, a nickel-cobalt foam, a nickel-tungsten foam, a nickel-silver foam, a nickel-molybdenum-cobalt foam, or others. Other conductive substrates, such as metal foils, metal meshes, and fibrous conductive substrates can be used. In some embodiments, the conductive substrates of anode 114 can be carbon-based materials, such as carbon fibrous paper, carbon cloth, carbon felt, carbon mat, carbon nanotube film, graphite foil, graphite foam, graphite mat, graphene foil, graphene fibers, graphene film, and graphene foam.

In some embodiments, the bi-functional catalyst of the catalyst layer of anode 114 can be a nickel-molybdenum-cobalt (NiMoCo) alloy. Other transition metal or metal alloys as bi-functional catalysts are encompassed by this disclosure, such as nickel, nickel-molybdenum, nickel-tungsten, nickel-tungsten-cobalt, nickel-carbon, nickel-chromium, based composites. In some embodiments, bi-functional catalyst is a transition metal alloy that includes two or more of Ni, Co, Cr, Mo, Fe, Mn and W. Other precious metals and their alloys as bi-functional catalysts are encompassed by this disclosure, such as platinum, palladium, iridium, gold, rhodium, ruthenium, rhenium, osmium, silver, and their alloys with precious and non-precious transition metals such as platinum, palladium, iridium, gold, rhodium, ruthenium, rhenium, osmium, silver, nickel, cobalt, manganese, iron, molybdenum, tungsten, chromium and so forth. In some embodiments, bi-functional catalysts are a combination of HER and HOR catalysts. In some aspects, the bi-functional catalysts of the metal-hydrogen battery 100 include a mixture of different materials, such as transition metals and their oxides/hydroxides, which contribute to hydrogen evolution and oxidation reactions as a whole. In some embodiments, the catalyst layer of anode 114 includes nanostructures of the bi-functional catalyst having sizes (or an average size) in a range of, for example, about 1 nm to about 100 nm, about 1 nm to about 80 nm, or about 1 nm to about 50 nm. In some embodiments, the catalyst layer includes microstructures of the bi-functional catalyst having sizes (or an average size) in a range of, for example, about 100 nm to about 500 nm, about 500 nm to about 1000 nm.

In some embodiments, to create different affinities with respect to the electrolyte (e.g., electrolyte 126) on the anode 114, the catalyst layer may be partially coated with a surface-affinity modification material. For example, when the catalyst layer of anode 114 on the porous substrate of anode 114 are hydrophilic to the electrolyte, the catalyst layer of anode 114 may be partially or entirely coated with a material that is hydrophobic to the electrolyte. On the contrary, when the catalyst layer of anode 114 on the porous substrate of anode 114 are hydrophobic to the electrolyte, the catalyst layer of anode 114 may be partially or entirely coated with a material that is hydrophilic to the electrolyte. This structure can facilitate movement of hydrogen gas in the pores of the anode 114 and improve HOR during discharge.

The cathode 112 may include a conductive substrate and a coating covering the conductive substrate. The coating can include a redox-reactive material that includes a transition metal. In some embodiments, the conductive substrate of cathode 112 is porous, such as having a porosity of at least about 10%, at least about 20%, at least about 30%, at least about 40%, or at least about 50%, and up to about 80%, up to about 90%, or greater. In some embodiments, the conductive substrate of cathode 112 can be a metal foam, such as a nickel foam, or a metal alloy foam. Other conductive substrates are encompassed by this disclosure, such as metal foils, metal meshes, and fibrous conductive substrates. In some embodiments, the transition metal included in the redox-reactive material is nickel. In some embodiments, nickel is included as nickel hydroxide or nickel oxyhydroxide. In some embodiments, the transition metal included in the redox-reactive material is cobalt. In some embodiments, cobalt is included as cobalt oxide or zinc cobalt oxide. In some embodiments, the transition metal included in the redox-reactive material is manganese. In some embodiments, manganese is included as manganese oxide or doped manganese oxide (e.g., doped with nickel, copper, bismuth, yttrium, cobalt or other transition or post-transition metals). Other transition metals are encompassed by this disclosure, such as silver. In some embodiments, the cathode 112 is a cathode, and the anode 114 is an anode. In some embodiments, the coating microstructures of the redox-reactive material, may have sizes (or an average size) in a range of, for example, about 1 µm to about 100 µm, about 1 µm to about 50 µ, or about 1 µm to about 10 µm.

In some embodiments, the electrolyte 126 is an aqueous electrolyte. The aqueous electrolyte is alkaline and has a pH greater than 7, such as about 7.5 or greater, about 8 or greater, about 8.5 or greater, or about 9 or greater, or about 11 or greater, or about 13 or greater. As a non-limiting example, the electrolyte 126 may include KOH or NaOH or LiOH or a mixture of LiOH, NaOH and/or KOH.

Although hydrogen oxidation catalysts such as inexpensive transition metals are suitable for metal-hydrogen batteries, they may be passivated during prolonged HOR, and this may significantly hindered their use in practical devices. According to some embodiments of the present disclosure, catalyst of anode 114 can be a bi-functional TMA (transition metal alloy). In some embodiments, combinations of Ni, Co, Cr, Mo, Fe and W can be used as an alternative to the bi-functional TMA catalyst. For example, a catalyst composed of Ni with CrOx particles decorating the surface can be used. A small amount of Pt can be added to further improve the activity. One such TMA catalyst is described in U.S. patent application Ser. No. 16/373,247, which is herein incorporated by reference in its entirety.

Furthermore, each of cathode 112 and anode 114 may include multiple layers of materials as described above. One example of a multi-layer structured anode 114 is provided in U.S. Provisional Application 63/214,514, which is herein incorporated by reference in its entirety.

Figure 2A:
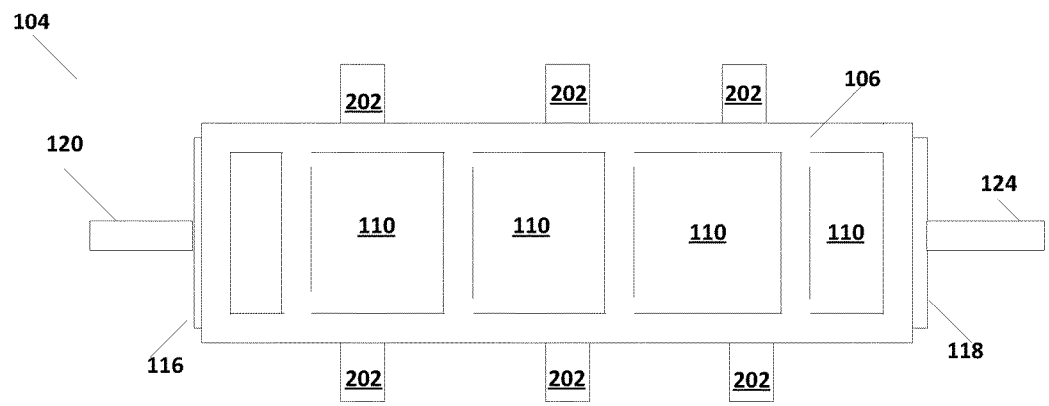

FIGS. 2A, 2B, 2C, and 2D further illustrate electrode stack assembly 104 according to some embodiments. In accordance with some aspects of this disclosure, each of cathode 112, anode 114, and separator 110 are substantially planar of approximately the same planar surface area. Each of cathode 112, anode 114, and separator 110 can be produced, as is further discussed below, in material sheets of the appropriate material as discussed above and cut appropriately to form electrode stack assembly 104 as discussed here and further below. FIGS. 2A and 2B illustrate a top and a side view of electrode stack assembly 104, respectively. In this reference, "top" refers to a view towards a planar side of cathode 112, anode 114, and separator 110 and "side" refers to a view into (i.e. along) the planar sides of cathode 112, anode 114, and separator 110, perpendicular to the top view. FIG. 2C is an anode end view, where each of anodes 114 are connected, and FIG. 2D is a cathode end view, where each of cathodes 112 are connected.

As is illustrated in the top view illustrated in FIG. 2A, electrode stack assembly 104 can be contained in a frame 106. Frame 106 can be metallic structure that allows the flow of electrolyte 126 into the layered electrode stack assembly 104. As is illustrated, and visible through this embodiment of frame 106, separator 110 may be the top layer (and the bottom layer) to electrically insulate whichever is the first electrode under the top separator 110 in the electrode stack 104. However, in some embodiments, anode layers 114 may form top and bottom layers of electrode stack assembly 104. In some embodiments, frame 106 may include a solid plate over separator 110 or anode layer 114 in the stack. As is further illustrated in FIG. 2A, in accordance with some aspects of this disclosure, each of separators 110 illustrated in FIG. 1 can include one or more wick tabs 202. Wick tabs 202 can extend to contact the inner side surface of pressure vessel 102 when electrode stack assembly 104 is placed in pressure vessel 102. The length of wick tabs 202 can be sufficient to allow electrolyte 126 to be wicked from the inner surfaces of pressure vessel 102 into electrode stack assembly 104, which allows circulation of electrolyte 126. It should be noted that a "bottom" view of electrode stack 104 appears identical to the top view shown in FIG. 2A.

FIG. 2B illustrates a side view of electrode stack assembly 104 according to some aspects of this disclosure. FIG. 2B illustrates layers of anodes 114 and cathodes 112 separated by separators 110. In some embodiments, each of cathodes 112 can be pouched (i.e. enclosed within a pouch) with insulator material to provide further insulation between electrode layers. As is illustrated, each of separators 110 includes at least one wick tab 202. Although, in this example, three wick tabs 202 are illustrated for each of separators 110, and for each side of stack 104, any number of wick tabs 202 can be included.

As is further illustrated in FIG. 2B, frame 106 includes a top portion 220 and a bottom portion 222 that are connected by side supports 206. As illustrated in FIG. 2A, top portion 220 and bottom portion 222 cover insulating separator 110 on the top and bottom, respectively, of electrode stack assembly 104. As is further illustrated, each of cathodes 112 are electrically connected to conductor 118 while each of anodes 114 are electrically connected to conductor 116.

As is further illustrated in FIG. 2B, top portion 220 and bottom portion 222 are structurally connected with side supports 206. There may be any number of side supports (also referred to as fingers) 206 on each side. Side supports 206 can, for example, be welded to fix top portion 220 and bottom portion 222 and therefore fix the stacked electrodes of electrode stack assembly 104 within the fixed frame 106.

As discussed in further detail below, the stack of electrodes can be formed between bottom portion 222 and top portion 220, pressure applied to the stack, and side supports 206 welded to top portion 220 and bottom portion 222 while pressure is applied to form frame 106. As is discussed further below, in some embodiments, top portion 220 and bottom portion 222 may be formed separately and side supports used to fix top portion 220 relative to bottom portion 222.

FIG. 2C illustrates an end view looking onto anode conductor 116 according to some embodiments. As illustrated in FIG. 2C, anode conductor 116 can be formed by connecting tabs that are attached to each of anodes 114 through slots 224 of anode feedthrough bridge 226. The tabs, as discussed further below, can be attached to anode feedthrough bridge 226, for example by mechanical fasteners, crimping, electric resistance welding, electric arc welding, ultrasonic welding, laser welding, brazing, soldering or other electrically conductive bonding methods. As is further illustrated in FIG. 2C, terminal 120 can be attached, to anode feedthrough bridge 226, for example by mechanical fasteners, crimping, electric resistance welding, electric arc welding, ultrasonic welding, laser welding, brazing, soldering or other electrically conductive bonding methods. In some embodiments, terminal 120 can be formed with feedthrough bridge 226 in a single piece. Anode conductor 116 is formed once tabs are attached through slots 224 of feedthrough bridge 226.

Similarly, FIG. 2D illustrates cathode conductor 118. Cathode conductor 118 is formed by connected tabs that are attached to each of cathodes 112 to a cathode feedthrough bridge 228 through slots 230, for example by mechanical fasteners, crimping, electric resistance welding, electric arc welding, ultrasonic welding, laser welding, brazing, soldering or other electrically conductive bonding methods. In some embodiments, terminal 124 can also be attached to cathode feedthrough bridge 228 by mechanical fasteners, crimping, electric resistance welding, electric arc welding, ultrasonic welding, laser welding, brazing, soldering or other electrically conductive bonding methods. In some embodiments, terminal 124 can be formed with cathode feedthrough bridge 228 as a single piece. Cathode conductor 118 is formed once taps are inserted through slots 230 and attached in place.

Figure 3A:
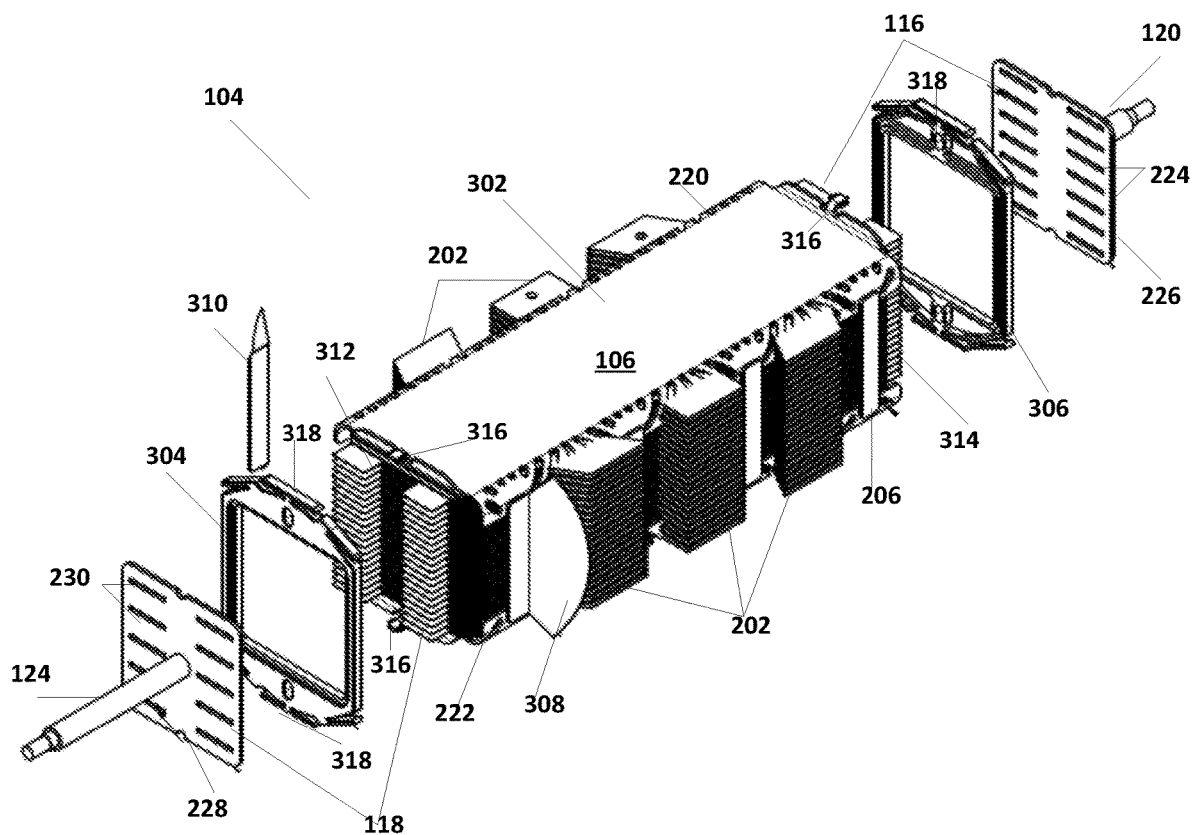
FIGS. 3A, 3B, 3C, 3D, 3E, 3F, and 3G further illustrate some aspects of an electrode stack assembly according to some aspects of the present disclosure.

FIGS. 3A through 3G illustrate aspects of electrode stack assembly 104 according to some aspects of the present disclosure. As illustrated in FIG. 3A, electrode stack assembly 104 includes an electrode stack 302 that is electrically coupled to cathode feedthrough bridge 228 and to anode feedthrough bridge 226. As illustrated in FIG. 3A, electrode stack 302 includes cathode tabs 312, each connected to individual cathodes 112, that are connected to cathode feedthrough bridge 228 through slots 230 to form cathode conductor 118. In some embodiments, multiple cathode tabs 312 are inserted through one of slots 320, bent 90 degrees, and resistive welded to cathode feedthrough bridge 228. In some embodiments, multiple tabs 312 (e.g., groups of four tabs 312) can be inserted through each slot 230 of cathode feedthrough bridge 228.

Similarly, electrode stack 302 includes anode tabs 314, each connected to individual anodes 112, that are connected to anode feedthrough bridge 226 through slots 224 to form anode conductor 116. In some embodiments anode tabs 314 are inserted through one of slots 224 of anode feedthrough bridge 226, bent 90 degrees, and resistive welded to anode feedthrough bridge 306 to form anode conductor 116. In some embodiments, multiple tabs 314 (e.g., groups of three (3) tabs 314 in some embodiments) can be inserted through slot 224 to form anode conductor 116.

As is further illustrated in FIG. 3A, cathode feedthrough conductor 124 is welded to cathode feedthrough bridge 228. Further, anode feedthrough conductor 120 is welded to anode feedthrough bridge 226.

As is further illustrated in FIG. 3A, isolator 304 is positioned between electrode stack 302 and cathode feedthrough bridge 228. As is illustrated in FIG. 3A, isolator 304 includes a connector 318 that can mate with a connector 316 of electrode stack 302. Similarly, isolator 306 is positioned between electrode stack 302 and anode feedthrough bridge 226. Isolator 306 also includes a connector 316 that can mate with a connector 316 of electrode stack 302.

As is further illustrated in FIG. 3A, separator shields 308 and 310 can be mounted to supports 206 that are closest to cathode conductor 118. Separator shields 308 and 310 protect stack 104 during the welding process of forming pressure vessel 102 (e.g., when pressure vessel 102 is welded shut).

Figure 3B:
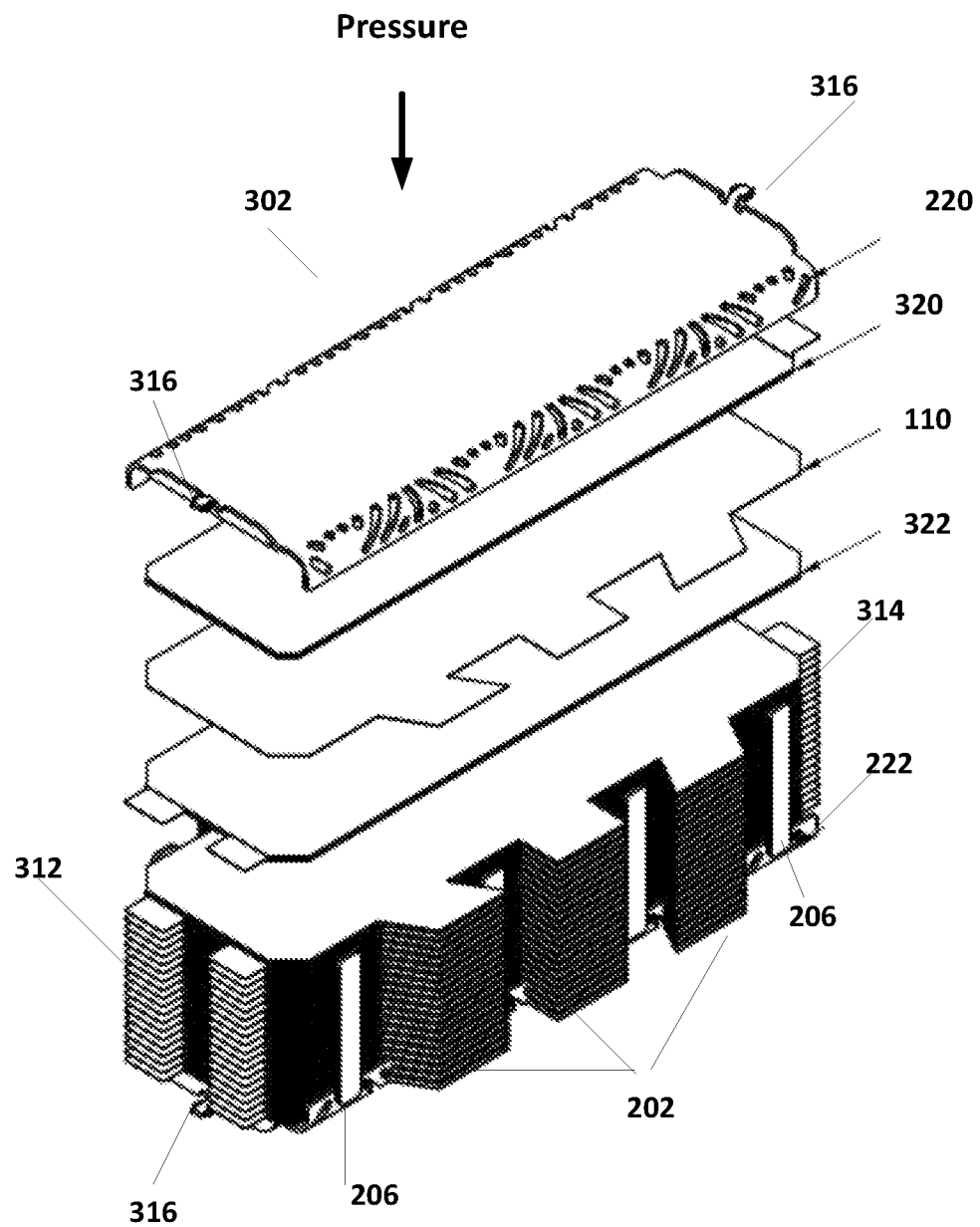

FIG. 3B illustrates assembly of electrode stack 302. As is illustrated in FIG. 3B, side supports 206 can be affixed to bottom portion 222 of frame 204. Cathode assemblies 322, separators 110, and anode assemblies 320 can be stacked appropriately to form stacked electrodes. As is illustrated, anode assemblies 320 are positioned directly adjacent top portion 220 and bottom portion 222 of frame 106. Cathode assemblies 322 can include a cathode that is pouched in separator material. Top portion 220 is positioned on top of the stacked electrodes. In some embodiments, the stacked electrodes can be formed in a jig that uses alignment features of bottom portion 222, separators 110, anode assemblies 320, and cathode assemblies 322 for alignment of the components. Pressure can then be applied to the stacked components and side supports welded to top portion 220 to form electrode stack 302.

Figure 3C:
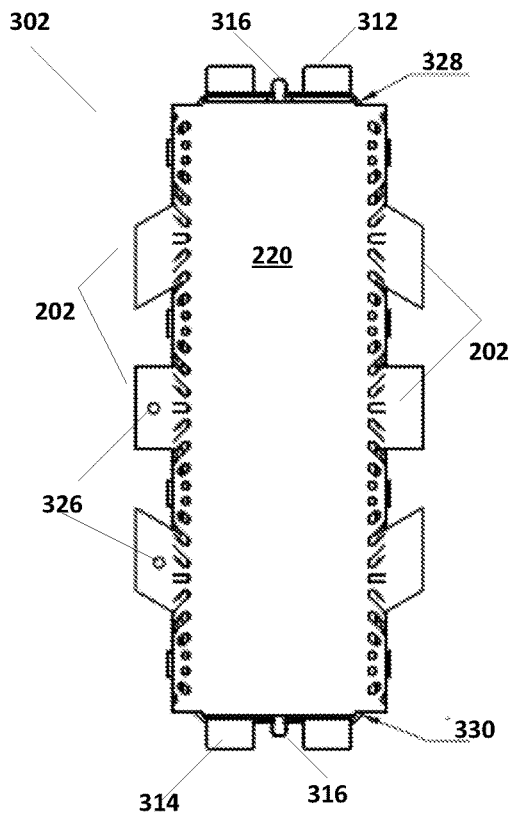

FIG. 3C illustrates a top planar view of electrode stack 302 according to some embodiments. As is illustrated, for example, some of wick tabs 202 include alignment holes 326 that can assist with positioning. Further, top portion 220 and bottom portion 222 can each include alignment features 328 and 330, respectively, to help with alignment during formation.

Figure 3D:
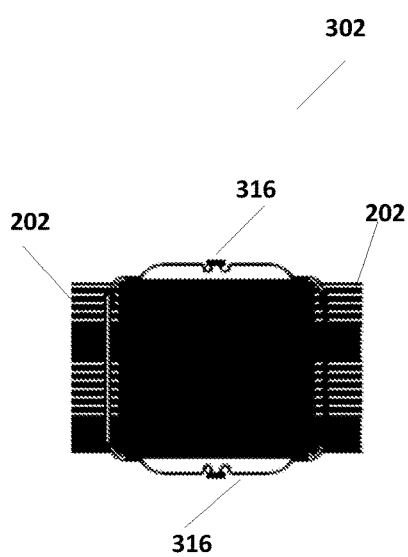

FIG. 3D further illustrates an end view of electrode stack 302. FIG. 3D further illustrates connector 316 and wick tabs 202 of separators 110.

Figure 3E:
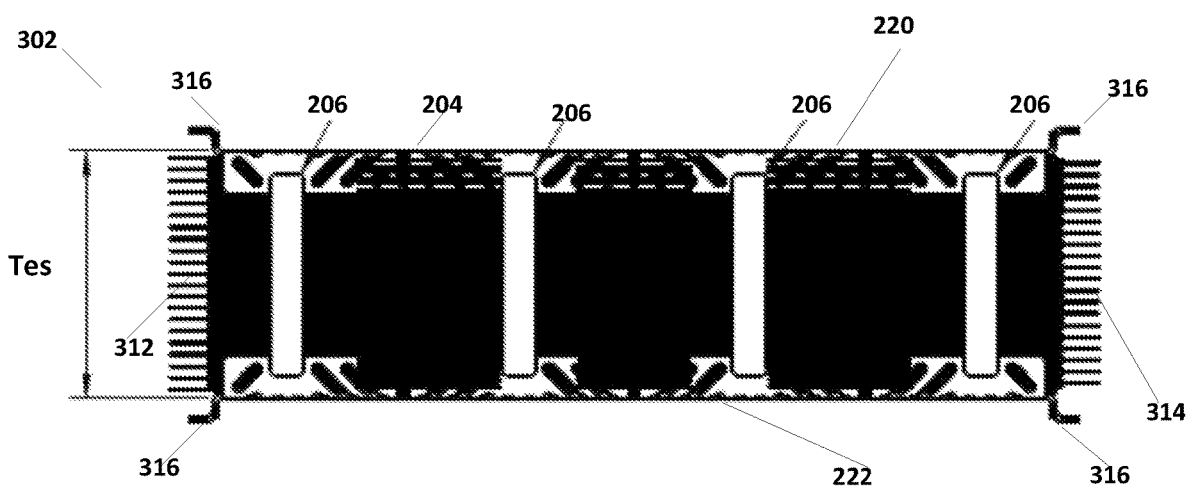

FIG. 3E illustrates a side view of electrode stack 302. Frame 204 is assembled such that supports 206 are welded to top portion 220 and bottom portion 222. Further, tabs 312 and 314 are illustrated. Further connector 316 is illustrated. As is illustrated, once assembled, electrode stack 302 can have a thickness of Tes. In some particular embodiments, for example, Tes can be about 71 mm.

Figure 3F:
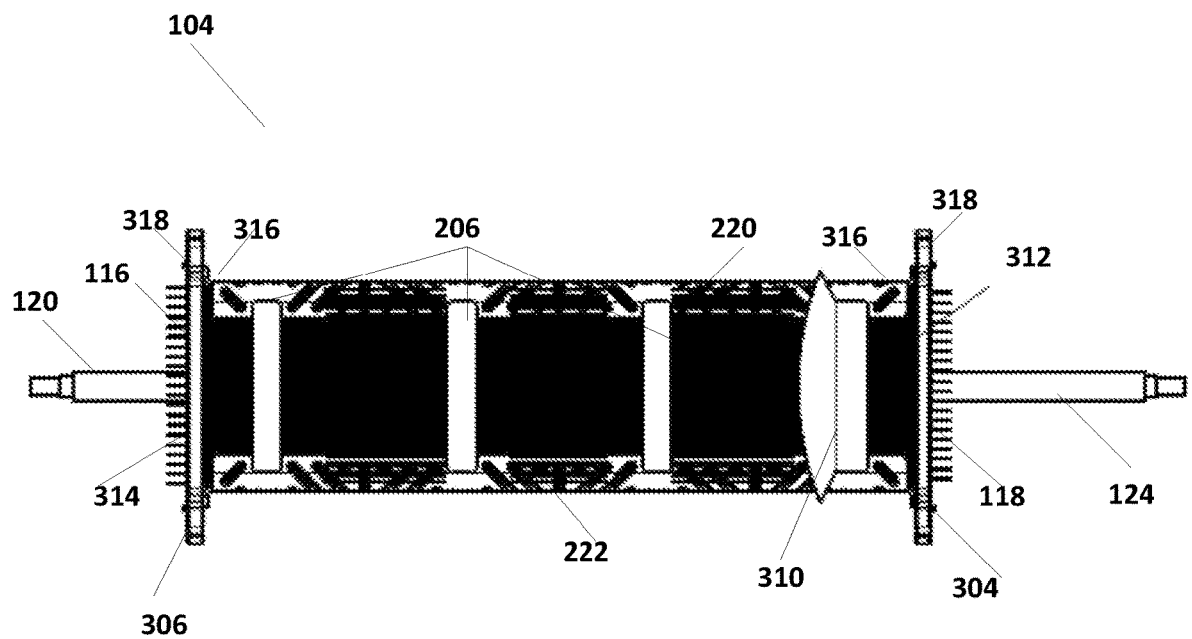
Figure 3G:
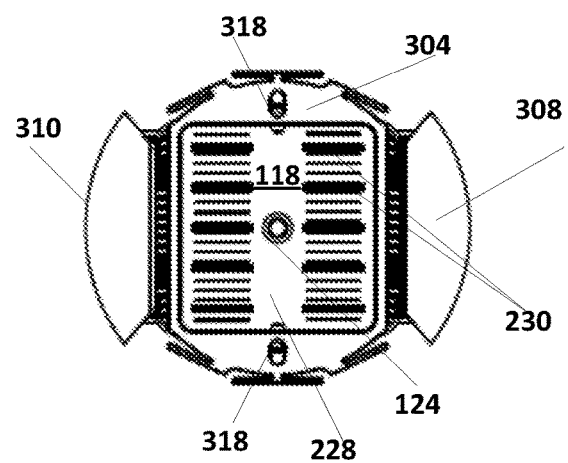

FIGS. 3F and 3G illustrate a side view and a cathode end view of electrode stack assembly 104 using electrode stack 302 as illustrated in FIGS. 3A through 3E. As illustrated in FIG. 3F, tabs 312 are connected to feedthrough bridge 228, to which cathode feedthrough 124 has been attached. As discussed above, the combination of tabs 312 and feedthrough bridge 228 forms cathode conductor 118. FIG. 3F further illustrates separator shield 310 that is attached to the support 206 that is closest to cathode conductor 118.

FIG. 3G further illustrates separator shields 308 and 310, feedthrough bridge 228, and cathode feedthrough 124. FIG. 3G further illustrates connector 318.

FIGS. 4A, 4B, and 4C illustrate a separator pouch 404 that is part of a cathode assembly 322 according to some embodiments. FIGS. 4A and 4B illustrate an example separator component 402 that is used, as illustrated in FIG. 4C, to form an insulating separator pouch 404. Separator component 402 may be cut from a sheet of separator material. As illustrated in FIGS. 4A and 4B, separator component 402 can have a length of $L_{sc}$, a width of $W_{sc}$, and a thickness of $T_{sc}$.

As is further illustrated in FIG. 4A, notches 406 and 408 are illustrated on each corner of separator component 402. As illustrated, notches 406 and 408 can be cut at an angle $\Theta_{sc}$ from the edge with width $W_{sc}$. As is further illustrated, notches 408 can be arranged such that the depth of the angular region of notches 408 is $L_{sc}1$. Further, notches 406 can have a depth of $L_{sc}2$. The depths may be different to provide for alignment and orientation.

In a particular example of component 402 the dimensions can be as follows: $L_{sc}$=244.0 mm; $W_{sc}$=75.0 mm; $T_{sc}$=0.25 mm; $L_{sc}1$=8.5 mm; $L_{sc}2$=9.5 mm; and $\Theta_{sc}$=45°. Further, separator component 402 is formed of separator material as discussed above. This particular example is not meant to be limiting and provides only a specific example of separator component 402. Separator component 402 can be formed with any dimensions that are consistent with other components of electrode stack assembly 104.

FIG. 4C illustrates formation of a pouch 410 using two of components 402 as illustrated in FIGS. 4A and 4B. As illustrated in FIG. 4C, pouch 410 includes a sealed end 414 and an open end 412. In particular, except for open end 412, pouch 410 can be formed by attached edges of two of components 402, for example heat welding components 402 together, to form a pouch 410 into which a cathode assembly, as discussed below, can be inserted.

FIGS. 4D and 4E illustrate a separator 110 according to some embodiments. As illustrated in FIGS. 4D and 4E, separator 110 has a main body 428 and wick tabs 202. Main body 428 has a width of $W_s$, a length of $L_s$, and a thickness $T_s$. As is further illustrated, main body 428 has notches 418 and 420, which are located on opposite sides of the length of main body 428. As is indicated, notches 418 and 420 are formed by cutting the corner at an angle of $\alpha_s$ from the width side of main body 428. Notches 418 are cut at a depth of $L_s1$ while notches 420 are cut at a depth of $L_s2$. As discussed above, the depths $L_s1$ and $L_s2$ may be different to assist in alignment during assembly of electrode stack assembly 104.

As is further illustrated in FIG. 4D, wick tabs 202 extend from main body 428. Wick tabs can take any shape and, in the embodiment shown in FIG. 4D, are positioned symmetrical along the lengthwise center line 422 and the widthwide center line 424. Wick tabs 202 can include angled tabs 430 and 432 and straight tabs 434. Angled tabs 430 are angled away from the end with notches 420 while angled tabs 432 are angled away from the end with notches 418. Straight tabs 434 are located along center line 424. Some of wick tabs 202 can include alignment holes 426. In the example illustrated in FIG. 4D, one of angled tabs 430 and one of straight tabs 434, both positioned on the same side of main body 428, include alignment holes 426. Alignment holes 426 in this example are located a distance $W_s1$ from center line 422 and are separated by a distance $L_s3$ on wick tabs 430 and 434. In some embodiments, alignment holes 426 can have a diameter $D_s$.

In a particular example of separator 110, the dimensions discussed above can be given by $L_s$=244.0 mm; $W_s$=75.0 mm; $T_s$=0.25 mm; $L_s1$=9.5 mm; $L_s2$=8.5 mm; $L_s3$=59.8 mm; $W^s1$=46.5 mm; and $\alpha_s$=45°. Further, separator 110 is formed of separator material as discussed above. This particular example is not meant to be limiting and provides only a specific example of separator 110. Separator 110 can be formed with any dimensions that are consistent with other components of electrode stack assembly 104.

Figure 5A:
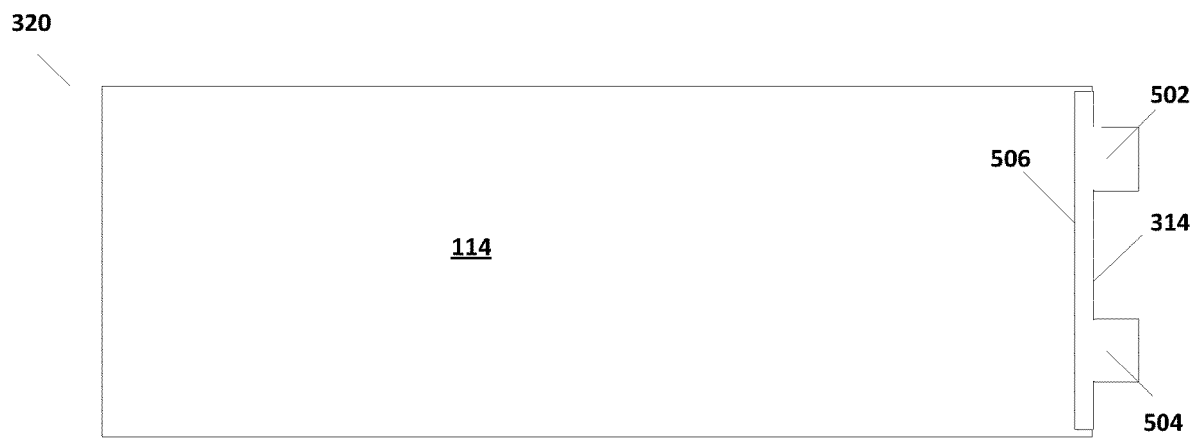
FIGS. 5A, 5B, 5C, 5D, and 5E illustrate an anode assembly according to some embodiments of the present disclosure.
Figure 5B:
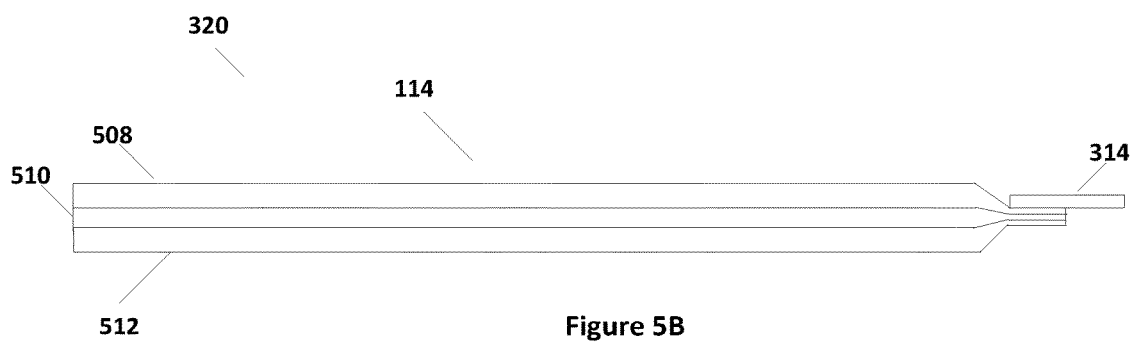

FIGS. 5A through 5E illustrate an anode assembly 320 as illustrated in FIG. 3B. As illustrated in FIG. 5A, anode assembly 320 includes anode 114 and anode tabs 314. As illustrated in FIG. 5B, which is a cross-sectional view of anode assembly 320, illustrates that anode 114 can include multiple layers, of which layers 508, 510, and 512 are illustrated. Layers 508, 510, and 512 can be formed from sheets of anode material. Anode tabs 314 can be formed of a conductor, for example nickel, although other conductive materials may be used. Anode tabs 314 can include a body 506 and tabs 502 and 504. Although two tabs (tabs 502 and 504) are illustrated, there may be any number of tabs. As illustrated in FIG. 5B, anode tabs 314 are attached to stacked anode layers 508, 510, and 512, for example by compressing body 506 with anode layers 508, 510, and 512 and then welding anode tabs 314 onto body 506. Anode layers 508, 510, and 512 may be arranged to enhance the flow of electrolyte 126. For example, anode 510 may be corrugated to facilitate the flow of electrolyte 126.

Figure 5C:
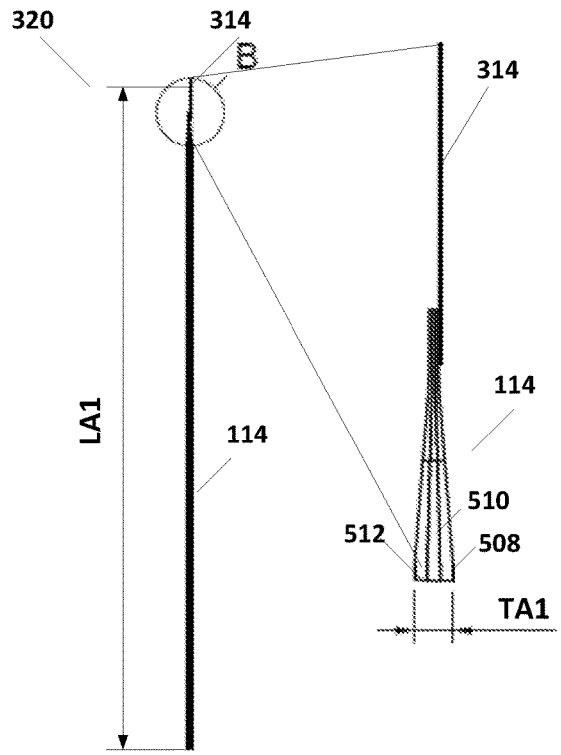
Figure 5D:
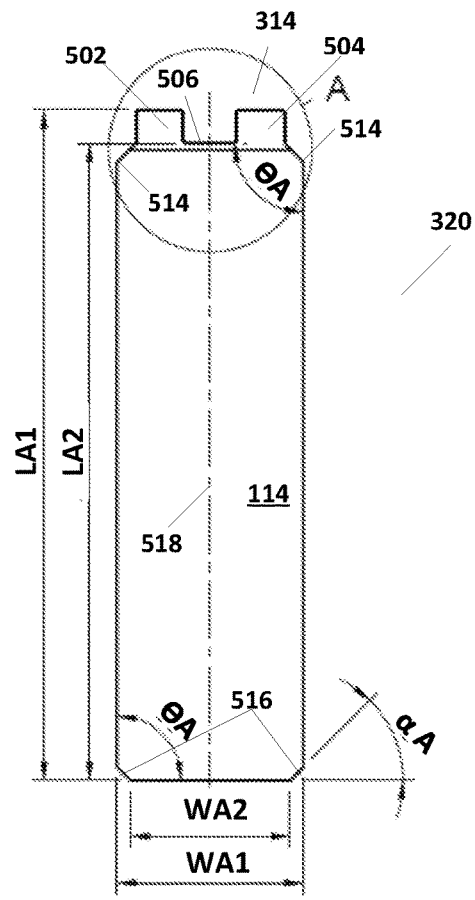
Figure 5E:
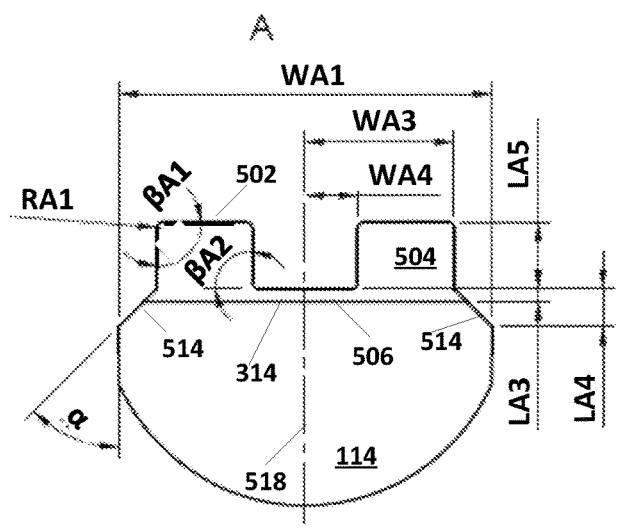

FIGS. 5C, 5D, and 5E illustrate a specific example of anode assembly 320. As illustrated in FIGS. 5C and 5D, anode assembly 320 includes an overall length of $L_A1$. The length of the anode 114 is $L_A2$. As is further illustrated, the overall width of anode assembly 320 is $W_A2$. As is further illustrated in FIG. 5D, anode assembly 320 can include notches 514 and 516, with notches 514 being located on the edge of anode 114 where anode tabs 314 are located and notches 516 being located on the opposite edge of anode 114. As is illustrated, the angle between the edges of anode 114 is $\Theta_A$. As is further illustrated, notches 514 and 516 form an angle as with the edges of anode 114. As is illustrated in FIG. 5D notches 516 leave a width $W_A1$ in the edge of anode 114.

FIG. 5E illustrate a blowup of portion A indicated in FIG. 5D, which includes anode tabs 314 attached to anode 114. As illustrated in FIG. 5E, the main body 506 of anode tabs 314 is shaped to match with notches 514, and therefore have an angle of $\alpha_A$ from an edge the same as notches 514. Main body 506, consequently, has an extent along anode 114 of $L_A3$. Therefore, notch 514 has a length along the length of anode 114 of $L_A4$.

As is further illustrated in FIG. 5E, anode tab 314 includes tabs 502 and 504 that are symmetrically positioned around center line 518. In particular, the inner edge of tab 504 is a distance of $W_A4$ from center line 518 and the outer edge is a distance $W_A3$ from center line 518. As illustrated with respect to tab 502, the edges of tab 502 are at an angle of $\beta_A1$ and the angle between an edge of tab 502 and main body 506 is at an angle of $\beta_A2$. Tabs 502 and 504 are cut with the edges forming a rounded edge with radius $R_A1$.

In a specific exemplary embodiment of anode assembly 320, the dimensions can be given by $L_A1$=252.5 mm; $L_A2$=240.0 mm; $L_A3$=2.5 mm; $L_A4$=7.1 mm; $L_A5$=12.5 mm; $W_A1$=60.0 mm; $W_A2$=70.0 mm; $W_A3$=27.9 mm; $W_A4$=9.9 mm; $T_A1$=1.8 mm; $\Theta_A$=90°; $\alpha_A$=45°; $\beta_A1$=90°; and $\beta_A2$=90°. Further, anode assembly 320 is formed with anode layers 508, 510, and 512 formed of anode material as discussed above and anode tab 314 formed of conductive material, for example nickel. This particular example is not meant to be limiting and provides only a specific example of anode assembly 320. Anode assembly 320 can be formed with any dimensions that are consistent with other components of electrode stack assembly 104. After formation of anode assembly 320, further processing may include anode coating, oven drying, and sintering to finalize anode assembly 320. Further, anode assembly 320 can include any number of layers of anode material.

Figure 6A:
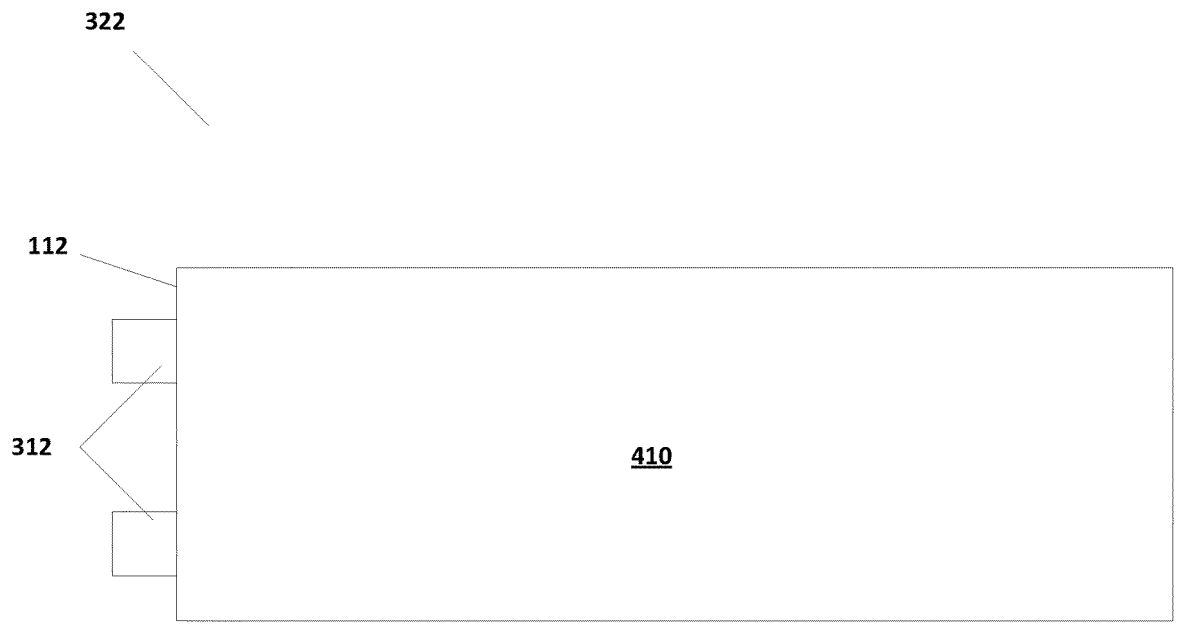
FIGS. 6A, 6B, 6C, 6D, 6E, 6F, 6G, and 6H illustrate a cathode assembly according to some embodiments of the present disclosure.
Figure 6B:
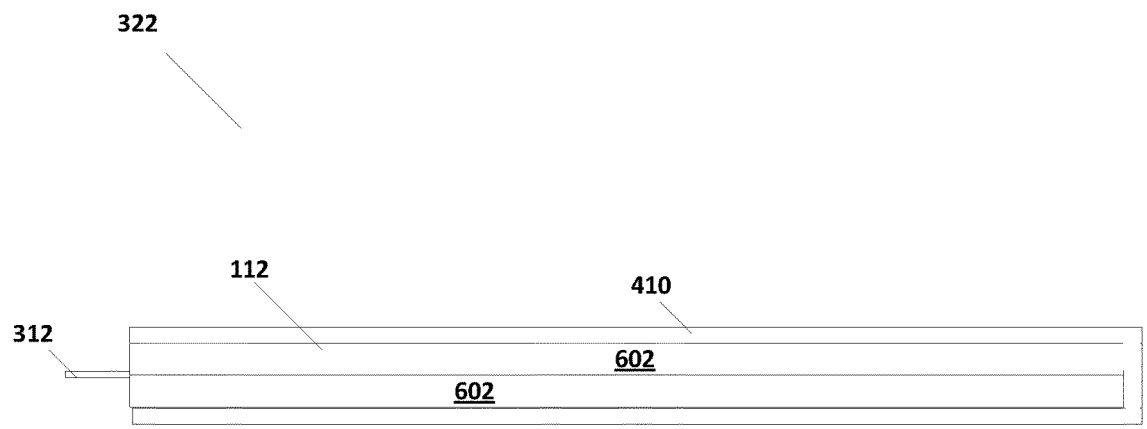

FIGS. 6A through 6H illustrate examples of cathode assembly 322. FIG. 6A illustrates a planar view of cathode assembly 322. As shown in FIG. 6A, cathode assembly 322 includes cathode 112 inserted in a separator pouch 410 as discussed above with respect to FIGS. 4A through 4C. FIG. 6B illustrates a cross-sectional view of an example cathode assembly 322. In the example illustrated in FIG. 6B, cathode 112 is formed from two cathode components 602. The cathode components 602 are inserted within separator pouch 410.

Figure 6C:
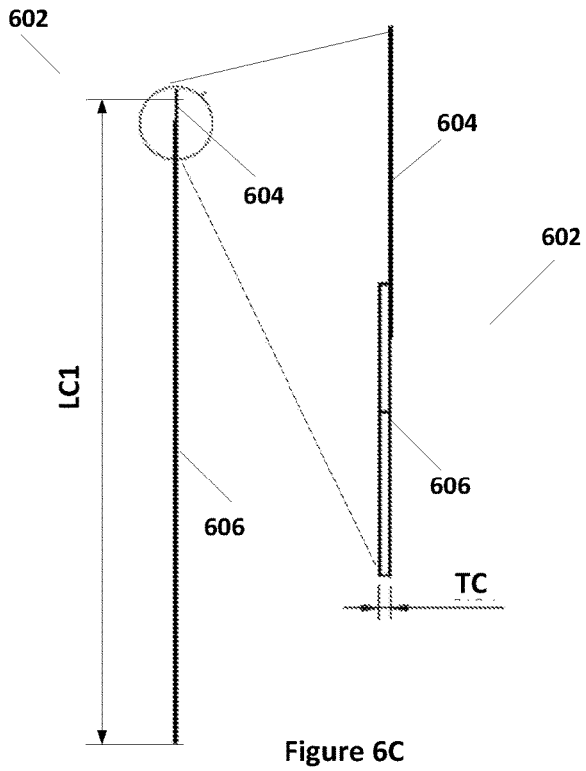
Figure 6D:
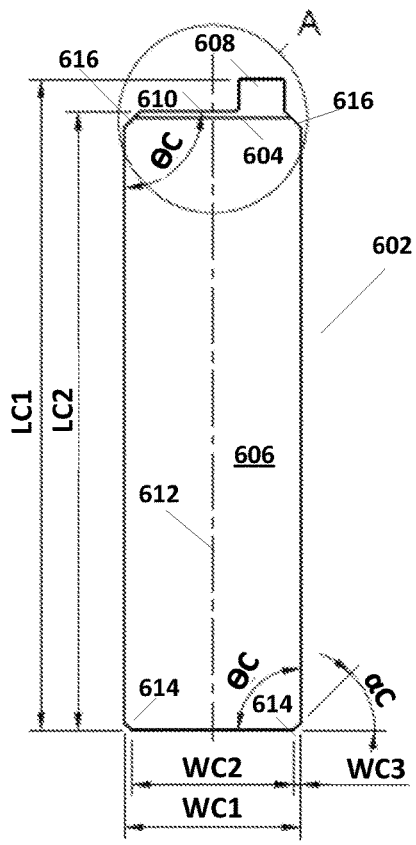
Figure 6E:
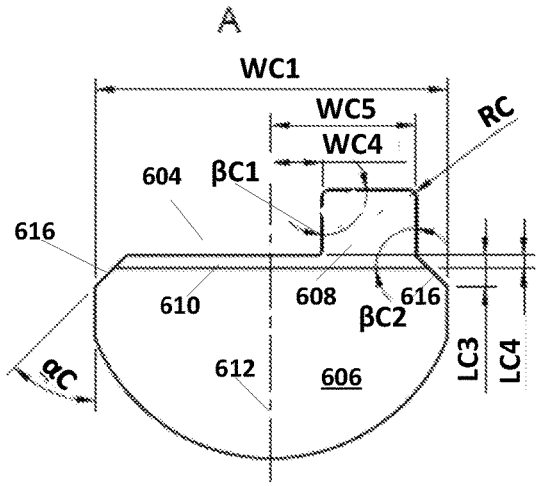

FIGS. 6C, 6D, and 6E illustrate an example of a cathode component 602 as illustrated in FIG. 6B. As illustrated in FIGS. 6C and 6D, cathode components 602 include a cathode portion 606 and a tab portion 604. As discussed above, cathode portion 606 can be formed by cutting from a cathode sheet material. In some embodiments, the cathode sheet material can include tab material. In that case, tab portion 604 can also be cut from cathode sheet material when cathode portion 606 is cut. As is further illustrated in FIG. 6C and 6D, cathode component 602 can have an overall length $L_C1$ and overall width $W_C1$. Cathode portion 606 can have a thickness $T_C$. As discussed above, tab portion 604 can be formed of a conducting material, for example nickel.

As shown in FIG. 6D, the length of cathode portion 606 can be $L_C2$. As is illustrated, notches 616 is formed in cathode portion 606 adjacent to where tab portion 604 is attached while notches 614 are formed on the opposite side of cathode portion 606. In the example illustrated in FIGS. 6D and 6E, notches 614 and form an angle of $\alpha_C$ from an edge of cathode portion 606. The edges of cathode portion 606 form an angle $\Theta_C$. As illustrated in FIG. 6D, notches 614 are cut so that the width of the edge of the cathode portion 606 opposite the tab portion 604 is given by $W_C2$, with a width $W_C3$ removed from that edge.

FIG. 6E illustrates the area identified in FIG. 6D as area A. As illustrated in FIGS. 6D and 6E, tab portion 604 includes a tab 608 and a tab body 610. Tab body 610 is attached to cathode portion 606 and is notched to fit with notches 616. In some embodiments, tab body 610 can be attached, for example by welding, to cathode portion 606. As discussed above, in some embodiments tab 608 and tab body 610 can be included in the cathode sheet from which cathode 602 is cut, in which case cathode portion 606 and tab body 610 are already attached. As is illustrated in FIG. 6E, the depth of notch 616 is $L_C3$ while notch body 610, which is attached to cathode portion 606, is of length $L_C4$. As is illustrated in FIG. 6E, tab 608 extends from the edge of tab body 610 such that tab has an outer edge at a distance of $W_C5$ from a center line 612, which extends through the length of cathode component 602. The inner edge of tab body 610 is at a distance $W_C4$ from center line 612. As illustrated in FIG. 6E, the edges of tab 608 forms an angle $\beta_C1$ on the inner edges and an angle $\beta_C2$ on the outer edge. The corners on tab 608 can be rounded with a radius $R_C$.

Figure 6F:
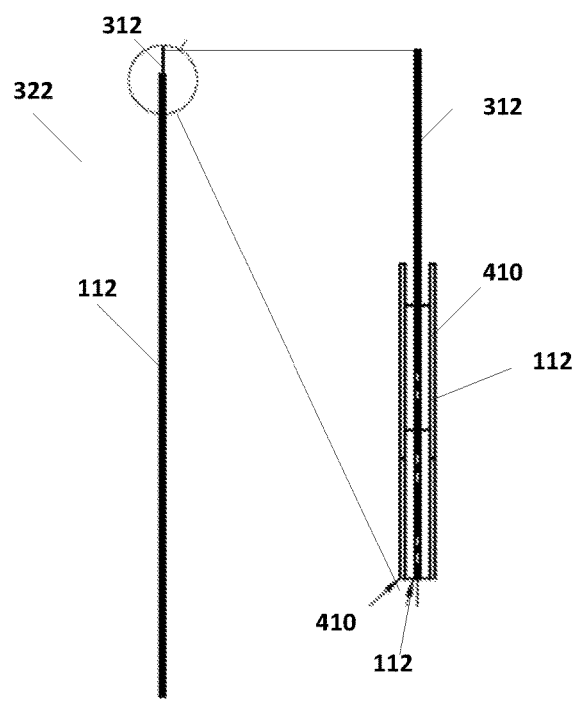
Figure 6G:
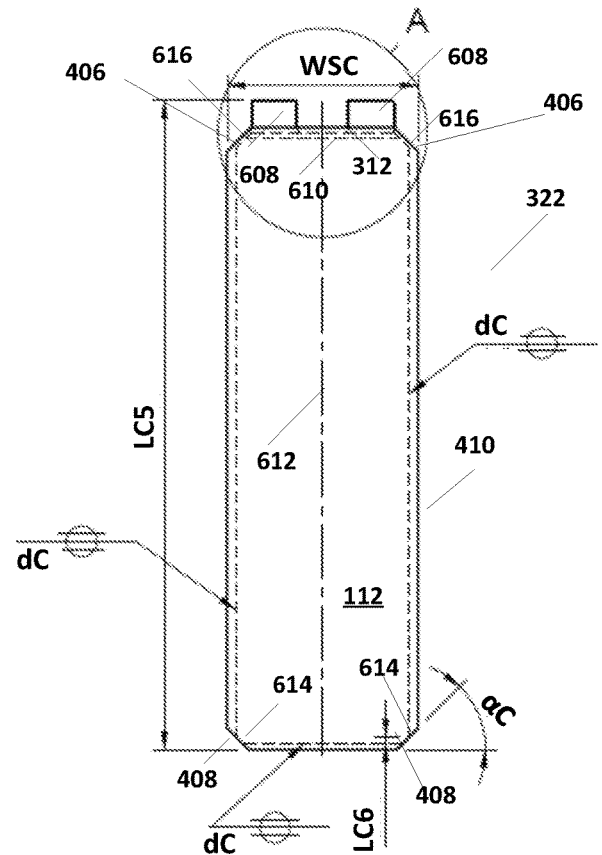

FIGS. 6F through 6G illustrate cathode assembly 322, which is formed from separator pouch 410 and two cathode components 602. As shown in FIGS. 6F and 6G, two cathode components 602 are stacked such that tabs 608 are arranged on both sides of cathode assembly 322 and attached to form cathode tabs 312. This is arranged by rotating one of the two cathode components 602 around central axis 612 and stacking it directly on the other one of cathode components 602. FIG. 6F illustrates a cross-sectional view of separator pouch 410 over anode 112 and cathode tabs 312.

FIG. 6G illustrates a planar view of assembled cathode assembly 322. As illustrated cathode 112, with cathode tabs 312, are inserted into separator pouch 410. As illustrated in FIG. 6G the thickness of of the seam weld along the perimeter of separator pouch 410 is given by $d_C$. Further, notches 616 of cathode components 602 and notches 406 of separator pouch 410 can align. Similarly, notches 614 of cathode components 602 align with notches 408 of separator pouch 410. As illustrated, the distance between the edge of separator pouch 410 and the center of notch 614 of cathode component 602 is given by $L_C6$. Further, the angle $\alpha_C$ is the same as the angle $\Theta_{sc}$ as illustrated in FIG. 4A. The resulting overall width of cathode assembly 322 is $W_{sc}$, the width of separator pouch 410.

Figure 6H:
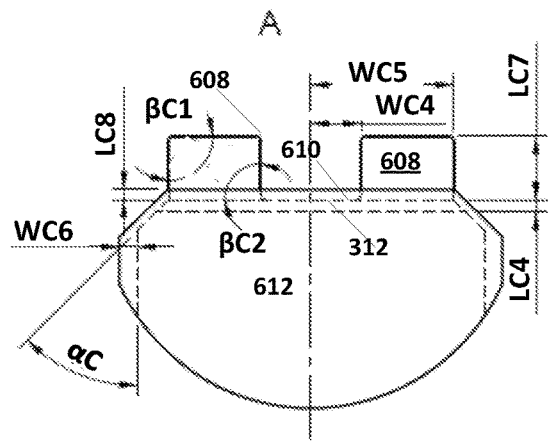

FIG. 6H illustrates an expanded view of area A illustrated in FIG. 6G. As illustrated in FIG. 6H, tabs 608 extend a distance $L_C7$ from main body 610. The separation between the edges of cathode components 602 and separator pouch 410 is given by $W_C6$. The distance that separator pouch 410 can extend from the edge of main body 610 by a distance $L_C8$.

In a specific example of cathode assembly 322, $L_C1$=252.5 mm; $L_C1$=240.0 mm; $L_C3$=6.1 mm; $L_C4$=2.5 mm; $L_C5$=254.5 mm; $L_C6$=3.0 mm; $L_C7$=12.5 mm; $L_C8$=2.0 mm; $W_C1$=68.0 mm; $W_C2$=62.0 mm; $W_C3$=3.0 mm; $W_C4$=9.9 mm; $W_C5$=27.9 mm; $W_C6$=3.5 mm; $T_C$=0.51 mm; $R_C$=1.0 mm; $d_C$=1.0 mm; $\alpha_C$=45°; $\Theta_C$=90°; $\beta_C1$=90°; and $\beta_C2$=90°. As discussed above, cathode assembly 322 is formed with pouch 410 and cathode components 602 as described above. This particular example is not meant to be limiting and provides only a specific example of cathode assembly 322. Cathode assembly 322 can be formed with any dimensions that are consistent with other components of electrode stack assembly 104.

Further, the example of cathode 112 illustrated in FIGS. 6A through 6H is exemplary only and cathode 112 that includes tabs 312 can be formed in other ways. For example, although FIGS. 6A through 6H illustrate a cathode 112 with two cathode portions 602, any number of cathode portions 602 may be stacked to form cathode 112. Additionally, any number of tabs 312 can be formed within a cathode 112.

Figure 7F:
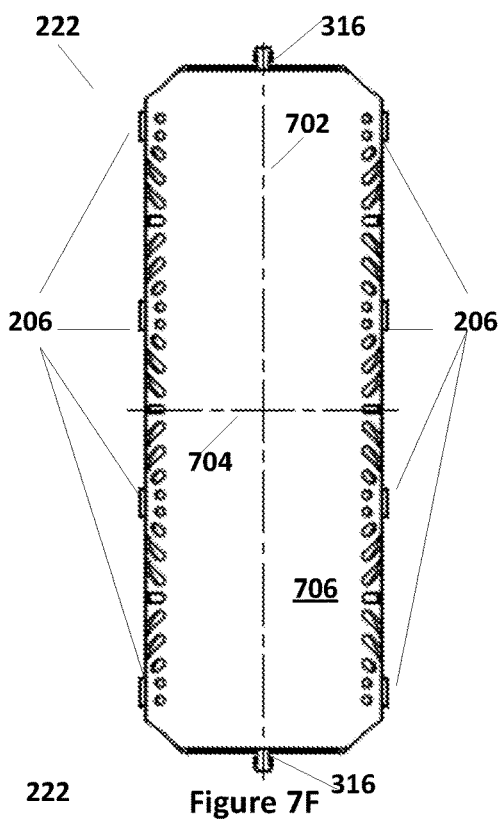

FIGS. 7A through 7J illustrate an example of frame 106 according to some embodiments of the present disclosure. FIGS. 7A through 7E illustrate upper portion 220 of frame 106. FIGS. 7F through 7J illustrate lower portion 222 of frame 106. FIG. 7A illustrate a planar view from the top of upper portion 220, illustrating top plate 706. As illustrated, upper portion 220 has a length of $L_F1$ and width $W_F1$. As is further illustrated in FIG. 7A, each of the corners of top surface 706 of upper portion 220 can be notched with notches 716. As illustrated in FIG. 7A, a center line 702 along the length of top plate 706 and a center line 704 along the width of top plate 706 can be defined.

FIG. 7B illustrates an edge view along the length of upper portion 220 (i.e., into center line 702). Line 718 is perpendicular to center lines 704 and 702. FIG. 7B illustrates that the thickness of the material that forms upper portion 220 has a thickness of $T_F1$. Further, upper portion 220 includes a lip 708 on each side, bent from the plane of plate 706 through a radius $R_F1$. Lip 708 forms an angle $\Theta_F1$ with the plane of plate 706. Lip 708 has a length of $L_F2$ from the plane of plate 706. Further, FIG. 7B illustrates connector 316, which includes a portion 712 that is bent in the opposite direction as that of lip 712.

FIG. 7C illustrates a side view of upper portion 220 (i.e. along center line 704). FIG. 7C illustrates lip 708 and also illustrates a cross section of connector 316, further illustrating connector tab 710 and portion 712.

FIG. 7D illustrates an expansion of the area labeled A in FIG. 7A. This illustrates a detailed example of connector tab 710. In the example illustrated in FIG. 7D, connector tab 710 includes barbs 716. As illustrated, connector tab 710 has a surface that is substantially parallel to the plane of 706 and has a length $L_F3$. Barbs 716 are spaced along the length of connector tab 710. The first barb is spaced a distance $L_F4$ from portion 712. In one example, barbs 716 are characterized by an inner width of $W_F2$ and an outer width of $W_F2$ from center line 702. The tips of barbs 716 can have a radius of $R_F2$. In some embodiments, barbs 716 can have a downward orientation.

FIG. 7E illustrates an expansion of area B shown in FIG. 7B. FIG. 7B illustrates edge on view of connector tab 710 and illustrates portion 712. As illustrated, portion 712 can have a length of $L_F5$. As is further shown, two insertions 714 on either side of tab 710 are formed. The insertions 714 can be characterized by circular hole of radius $R_F3$ transitioning to a straight portion with a radius $R_F4$.

Figure 7H:
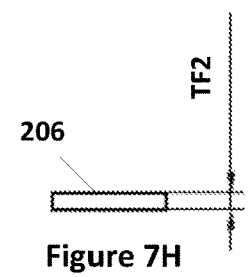
Figure 7I:
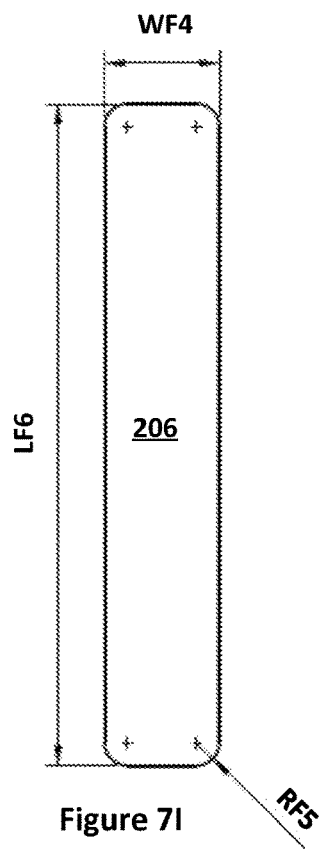
Figure 7G:
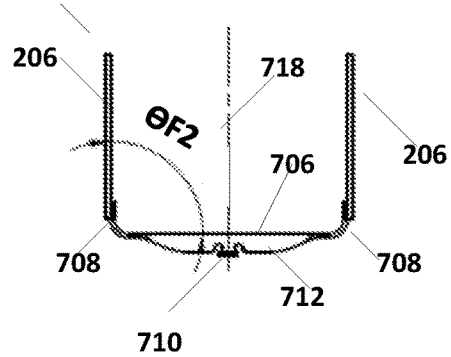

FIGS. 7F through 7J illustrate bottom portion 222. Bottom portion 222 includes a plate 706, lip 708, notches 716, and connectors 316 as described above with top portion 220 and additionally with side supports 206 added. FIGS. 7F illustrates a planar view of bottom portion 222, with side supports 206 attached to lip 708 as indicated. FIG. 7G illustrates an edge view of bottom portion 222. As illustrated in FIG. 7G, side supports 206 are attached (e.g., by welding) to lip 708 so that side supports 206 make an angle $\Theta_F2$ with plate 706.

FIGS. 7H and 7I illustrate an example of a side support 206 according to some embodiments. As shown in FIGS. 7H and 7I, side support 206 is a plate of length $L_F6$, width $W_F4$, and thickness $T_F2$. As is further illustrated in FIG. 7I, the corners may be rounded with a radius of $R_F5$.

Figure 7J:
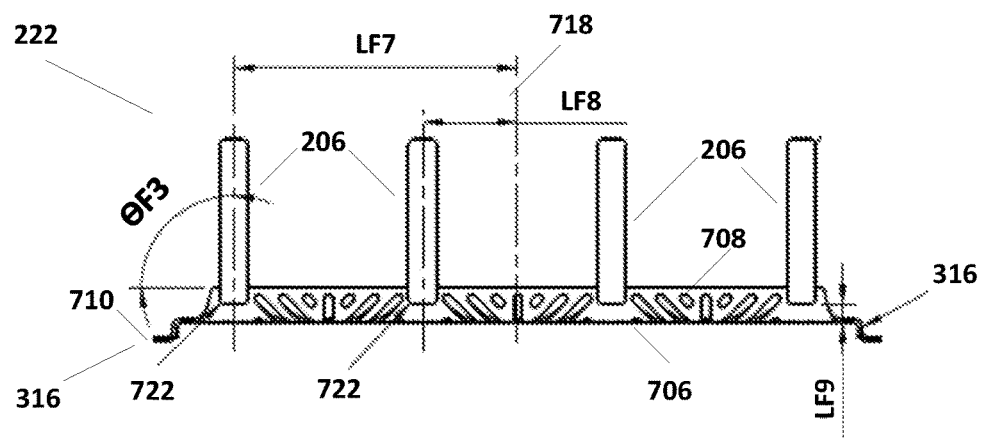

FIG. 7J illustrates attachment of side supports 206 to lip 708 as discussed above. As is illustrated, side supports 206 are positioned on lip 708 at a distance $L_F9$ from plate 706 and forming an angle $\Theta_F3$ from an edge of lip 708, which is parallel with the plane of plate 706. As is further illustrated, side supports 206 are positioned symmetrically around line 718 and at length $L_F7$ and length $L_F8$ from line 718. As is further illustrated, side supports 206 are welded to lip 708 at weld points 722.

In a specific example of frame 106, $L_F1$=241.2 mm; $L_F2$=12.5 mm; $L_F3$=6.5 mm; $L_F4$=1.5 mm; $L_F5$=6.5 mm; $L_F6$=58.0 mm; $L_F7$=99.2 mm; $L_F8$=33.0 mm; $L_F9$=6.5 mm; $W_F1$=83.0 mm; $W_F2$=2.0 mm; $W_F3$=3.0 mm; $W_F4$=10.0 mm; $T_F1$=1.5 mm; $R_F2$=1.5 mm; $R_F1$=5.0 mm; $R_F2$=0.2 mm; $R_F3$=1.5 mm; $R_F4$=1.0 mm; $R_F5$=2.0 mm; $\Theta_F1$=90°; $\Theta_F2$=90°, and $\Theta_F2$=90°. Further, frame 106 is formed of any material, for example stainless steel. This particular example is not meant to be limiting and provides only a specific example of frame 106. Frame 106 can be formed with any dimensions that are consistent with other components of electrode stack assembly 104.

Figure 8:
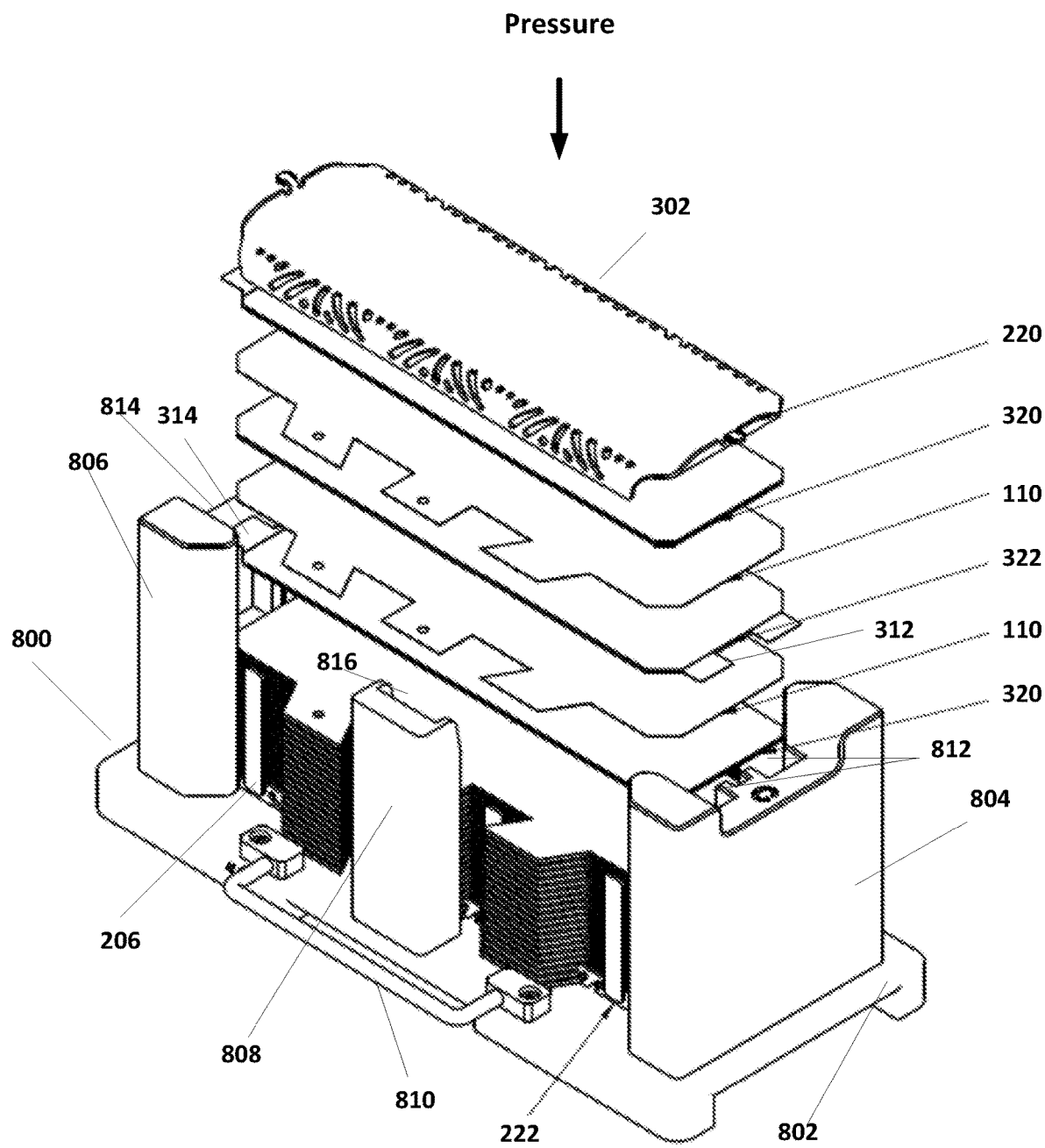
FIG. 8 illustrates assembly of the electrode stack according to some embodiments of the present disclosure.

FIG. 8 illustrates assembly of electrode stack 302 as illustrated in FIG. 3B. As is illustrated in FIG. 8A, electrode stack 302 is assembled on a jig 800 that positions each of cathode assemblies 322, anode assemblies 320, separators 110, upper portion 220, and lower portion 222 relative to each other.

Jig 800 includes a base 802 on which components of jig 800 are mounted. These components include a cathode end alignment 804 and an anode end alignment 806. As illustrated, cathode end alignment 804 includes notches 812 that receives tabs 312 of cathode assemblies 322. Similarly, anode end alignment 806 includes notches 814 that receives tabs 314. Anode end alignment 806 and cathode end alignment 804 are further shaped to receive the shapes of anode assemblies 320 and cathode assemblies 322 as discussed above and holds them in place. Another alignment 808 is included that is mounted between cathode end alignment 804 and cathode end alignment 806 and includes a notch 816 that receives the center wick tabs 202. As an additional feature, a carrier component 810 can be mounted to base 802 to allow easy transport of jig 800 when the components are loaded.

As illustrated in FIG. 8, the components of electrode stack 302 are assembled by first loading lower portion 222 and then stacking alternating layers of anode assembly 320 andcathode assembly 322, with separator 110 placed between each layer, appropriately to reach the appropriate number of anodes and cathodes in the stack. Finally, top portion 220 is placed over the top. Jib 800, with electrode stack 302 loaded, is then placed in a press and pressure is applied. Once the appropriate pressure is applied and electrode stack 302 is at a thickness of Tes as illustrated in FIG. 3E, then side supports 206 of lower portion 222 engages and is welded to top portion 220 to fix electrode stack 302. Once welded, electrode stack 302 can be removed from jig 800.

FIGS. 9A, 9B, and 9C illustrate an isolator 900 that can be used for isolators 304 and 306 as illustrated in FIG. 3A. As illustrated in the planar view of isolator 900 illustrated in FIG. 9A, includes frame 912 surrounding a hole 902. Frame 912 includes an indentation 904 in frame 912. Further, frame 912 includes tabs 906 on two opposing sides where connector 318 is formed. Connector 318 is a hole through frame 912 that mates with connector 316 on frame 106 as illustrated in FIGS. 7A through 7J. Further, barbs 716 as illustrated in FIG. 7D can engage with connector 318 such that, when positioned, barbs 716 of connector 316 hold isolator 900 in place. As is further illustrated in FIG. 9A, hole 902 is sized to allow tabs 312 and 314 of electrode stack 302 to pass through. Indentation 904 is sized to receive feedthrough 226 or feedthrough 228 as illustrated in FIG. 3A.

In a particular example of isolator 900 as is illustrated in FIG. 9A, isolator 900 has an overall length of $L_I1$ and a width of $W_I1$. As illustrated in FIG. 9B, which is a cross sectional view of isolator 900, the thickness isolator 900 is $T_I1$. Hole 902 can have a length $L_I3$ and width $W_I3$. Indentation 904 can have a length of $L_I2$ and width $W_I2$. As illustrated in FIG. 9C, which is a cross sectional view through line A-A illustrated in FIG. 9A, indent 904 has a thickness of $T_I2$. In some embodiments, the corners of hole 902 may be rounded with a radius $R_I2$ while indent 904 can have rounded edges with radius $R_I1$. As is further illustrated, connector 318 can be an elongated hole with a width of $W_I4$ that is positioned to receive barbs 716 of connector 316. FIG. 9A also illustrates features 908 and 910 that are incorporated with tabs 906. Features 908 and 910 assist in insulating electrode stack 302 and are formed to position the fully assembled electrode stack assembly 104 within pressure vessel 102.

In a specific example of isolator 900, $L_I1$=106.2 mm; $L_I2$=70.0 mm; $L_I3$=66.0 mm; $W_I1$=74.2 mm; $W_I2$=66.4 mm; $W_I3$=62.4 mm; $W_I4$=4.5 mm; $T_I1$=5.2 mm; $T_I2$=3.5 mm; $R_I1$=5.0 mm; and $R_I2$=3.0 mm. Further, isolator 900 can be formed of any insulating material, for example a plastic such as UHMW PE can be used. This particular example is not meant to be limiting and provides only a specific example of isolator 900. Isolator 900 can be formed with any dimensions that are consistent with other components of electrode stack assembly 104.

Figure 10C:
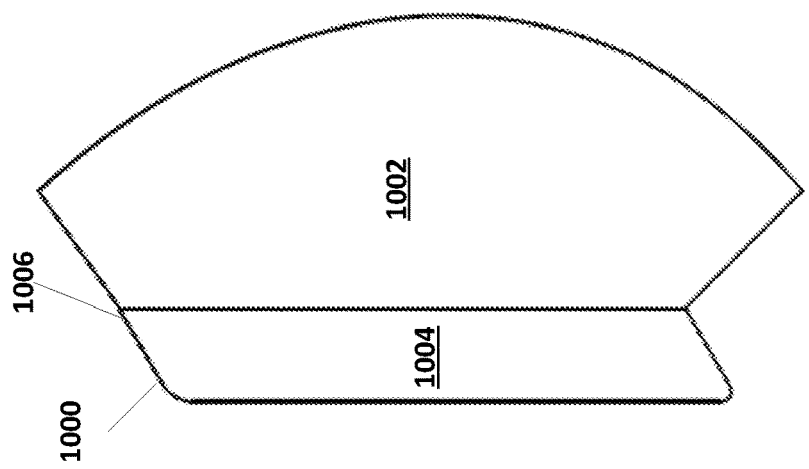
FIGS. 10A, 10B, and 10C illustrate an electrode shield according to some embodiments of the present disclosure.
Figure 10A:
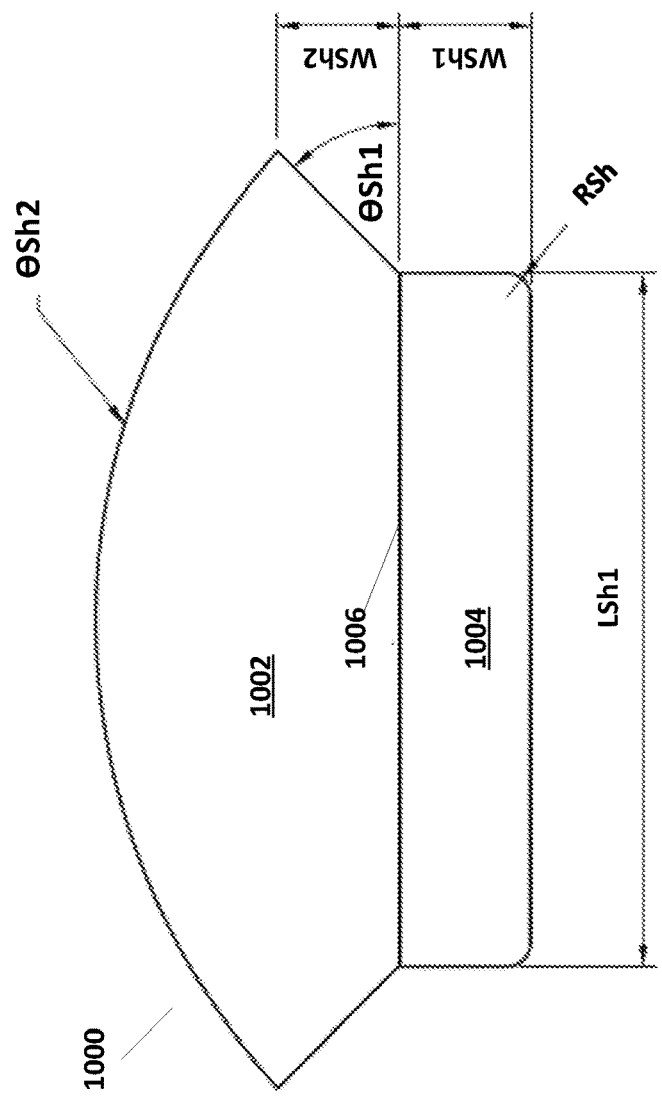
Figure 10B:
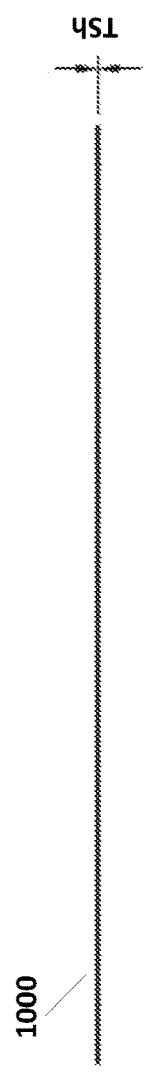

FIGS. 10A, 10B, and 10C illustrate an example of a separator shield 1000, which can be used as separator shields 308 and 310 as illustrated in FIG. 3A. Separator shield 1000 includes a fan portion 1002 and a flat portion 1004. Fan portion 1002 is folded away from flat portion 1004 along fold line 1006. FIG. 10A illustrates a flat rendition prior to folding along fold line 1006 that can be cut from a single sheet of material prior to folding. As is illustrated, flat portion 1004 has a length of $L_{Sh}1$ and width $W_{Sh}1$. Flat portion 1004 can have rounded corners with radius $R_{Sh}$. Fan portion 1002 extends at an angle of $\Theta_{Sh}1$ from flat portion 1004 to a distance of $W_{Sh}2$ from fold line 1006. Fan portion 1002 then extends through an angle $\Theta_{Sh}2$. FIG. 10B illustrates a cross section of separator shield 1000. As illustrated in FIG. 10B, the thickness of the sheet of material forming separator shield 1000 is $T_{Sh}$.

FIG. 10C illustrates separator shield 1000 after being folded out so that fan portion 1002 extends away from flat portion 1004. As is illustrated in FIG. 3A, separator shield 1000 (either separator shield 308 or separator shield 310) is attached to the side supports 206 of frame 106 closest to cathode tabs 312, for example by welding.

In a specific example of separator shield 1000, $L_{Sh}1$=58.0 mm; $W_{Sh}1$=11.0 mm; $W_{Sh}2$=10.1 mm; $T_{Sh}$=0.1 mm $\Theta_{Sh}1$=45°; and $\Theta_{Sh}2$=130°. Further, separator shield 1000 can be formed of any conductive material, for example stainless steel. This particular example is not meant to be limiting and provides only a specific example of separator shield 1000. Separator shield 1000 can be formed with any dimensions that are consistent with other components of electrode stack assembly 104.

Figure 11E:
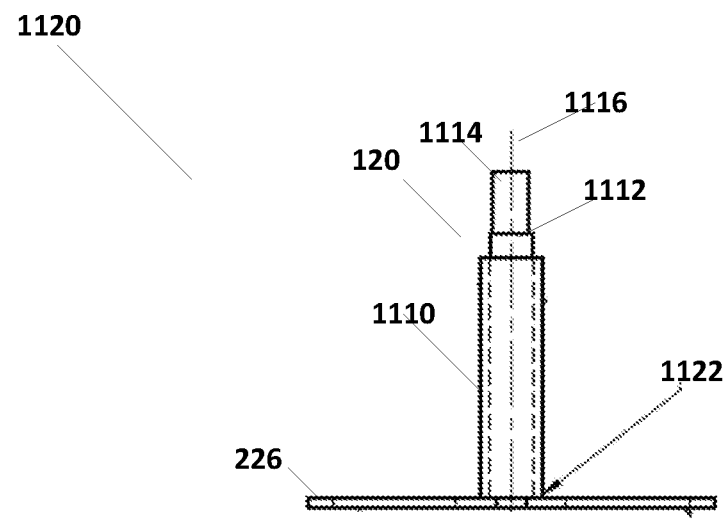
Figure 11F:
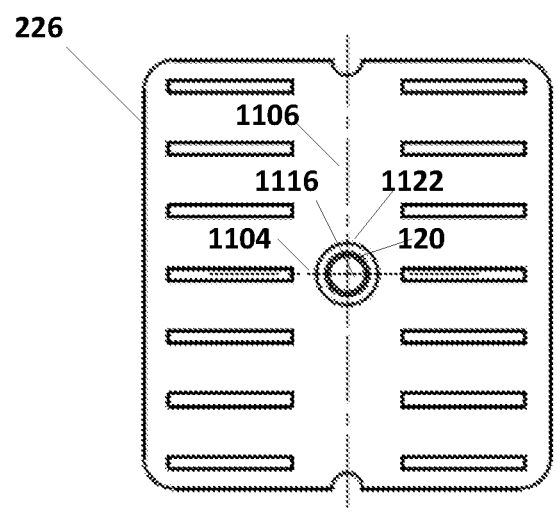

FIGS. 11A through 11F illustrate in more detail anode bridge 226 and anode feedthrough terminal 120 as well as the mounting of anode feedthrough terminal 120 onto anode bridge 226. FIGS. 11A and 11B illustrate an example of anode bridge 226 while FIGS. 11C and 11D illustrate an example of anode feedthrough terminal 120. FIGS. 11E and 11F illustrate attachment of anode feedthrough terminal 120 to anode bridge 226.

FIGS. 11A and 11B illustrate an example of anode bridge 226 as discussed above, for example with respect to FIG. 2C. As illustrated in FIG. 11A, anode bridge 226 is formed of a metallic plate with slots 224 arranged to receive tabs 314 from anode assemblies 320. As is illustrated in FIGS. 11A and 11B, anode bridge 226 has a length of $L_{AB}1$, width $W_{AB}1$, and thickness $T_{AB}1$. In some embodiments, the edges may be tapered so that anode bridge 226 can better be fitted into indent 904 of isolator 900 as illustrated in FIG. 9A. Further, the corners of anode bridge 226 can be curved with a radius of $R_{AB}2$. Additionally, opposite ends of anode bridge 226 can include notches 1102 with radius $R_{AB}1$. Notches 1102 are arranged along a center line 1102, which is centered and runs along the length of anode bridge 226. Slots 224 are elongated with respect to the width of anode bridge 226 and arranged symmetrically with respect to center line 1104 and further symmetrically arranged with respect to center line 1106 that is perpendicular to center line 1104. In the particular example illustrated in FIG. 11A, seven (7) slots 224 are arranged on each side of center line 1104 (a total of fourteen (14) slots are illustrated). It should be clear that there may be any number of slots 224 formed on either side of center line 1104. The number of slots 224 and the placement of slots 224 included in anode bridge 226 is dependent on the structure of anode assembly 320 and the number of anode assemblies 320 included in electrode stack 302.

As is illustrated in FIG. 11A, each of slots 224 has a width of $W_{AB}4$ and a thickness of $T_{AB}2$. As shown in FIG. 11A, the left-hand edge of the seven slots 224 on the left side of center line 1104 are spaced a distance $W_{AB}3$ from the left side edge of anode bridge 226. The left-hand edge on the right side of center line 1102 are spaced a distance of $W_{AB}2$ from the left side edge of anode bridge 226. The bottom edge of slots 224 is separated from the bottom of anode bridge 226 by $L_{AB}2$, $L_{AB}3$, $L_{AB}4$, $L_{AB}5$, $L_{AB}6$, $L_{AB}7$, and $L_{AB}8$. It should be noted that the terms left, right, up, and down are used for convenience only.

FIGS. 11C and 11D illustrates an example of anode feedthrough terminal 120. As illustrated in FIG. 11D, anode feedthrough terminal 120 can be formed from a metallic rod to form a first section 1110 having diameter $W_{AB}5$ and length $L_{AB}11$, a second section 1112 of less diameter, diameter $W_{AB}6$ that extends from the end of first section 1110 from between length $L_{AB}11$ to length $L_{AB}10$. A third section 1114 that extends between length $L_{AB}10$ to length $L_{AB}9$ from the end of second section 1112. Third section 1114 is threaded with thread characteristics $Th_{AB}$. A center line 1116 can extend down the center of feedthrough terminal 120 and along the length of anode feedthrough terminal 120. FIG. 11D is a view along center line 1116 viewed from section 1114.

FIGS. 11E and 11F illustrate attachment of anode feedthrough terminal 120 to anode bridge 226 to form anode bridge structure 1120. As illustrated in FIG. 11E, anode feedthrough terminal 120 is welded at weld point 1122 to the center of anode bridge 226. As is illustrated in FIG. 11F, feedthrough terminal 120 is welded to anode bridge 226 such that center line 1116 intersects with the intersection of center lines 1104 and 1106 of anode bridge 226.

In a specific example of anode bridge structure 1120, $L_{AB}1$=69.6 mm; $L_{AB}2$=64.4 mm; $L_{AB}3$=54.2 mm; $L_{AB}4$=44.0 mm; $L_{AB}5$=33.8 mm; $L_{AB}6$=23.6 mm; $L_{AB}7$=13.4 mm; $L_{AB}8$=3.2 mm; $L_{AB}9$=53.0 mm; $L_{AB}10$=43.0 mm; $L_{AB}11$=39.0 mm; $W_{AB}1$=66.0 mm; $W_{AB}2$=41.9 mm; $W_{AB}3$=4.10 mm; $W_{AB}4$=20.0 mm; $W_{AB}5$=10.0 mm; $W_{AB}6$=7.0 mm; $T_{AB}1$=1.6 mm; $T_{AB}2$=2.0 mm; $Th_{AB}$=M6×1; $R_{AB}1$=2.5 mm; and $R_{AB}2$=5.0 mm. Further, anode bridge structure 1120 can be formed of any conductive material or combination of conductive materials. For example, anode bridge 226 may be formed of nickel while anode feedthrough terminal 120 can be formed of stainless steel clad copper. This particular example is not meant to be limiting and provides only a specific example of anode bridge structure 1120. Anode bridge structure 1120 can be formed with any dimensions that are consistent with other components of electrode stack assembly 104.

Figure 12E:
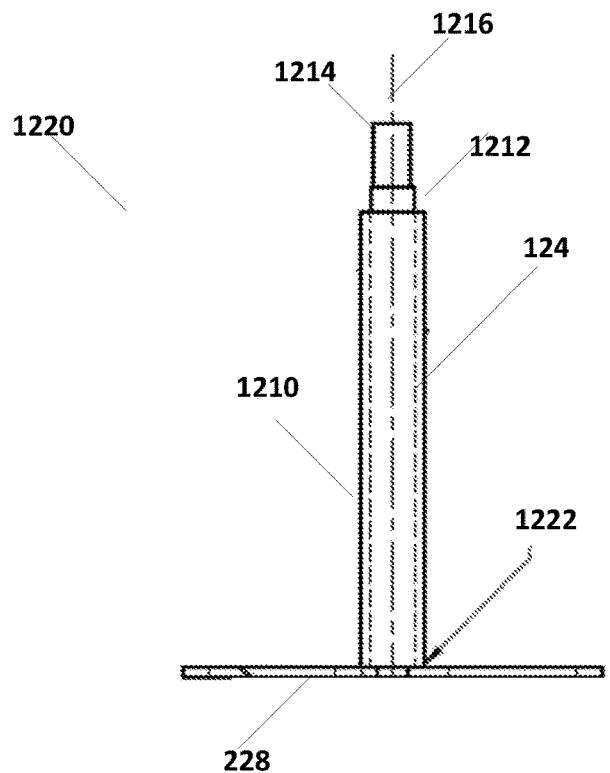
Figure 12F:
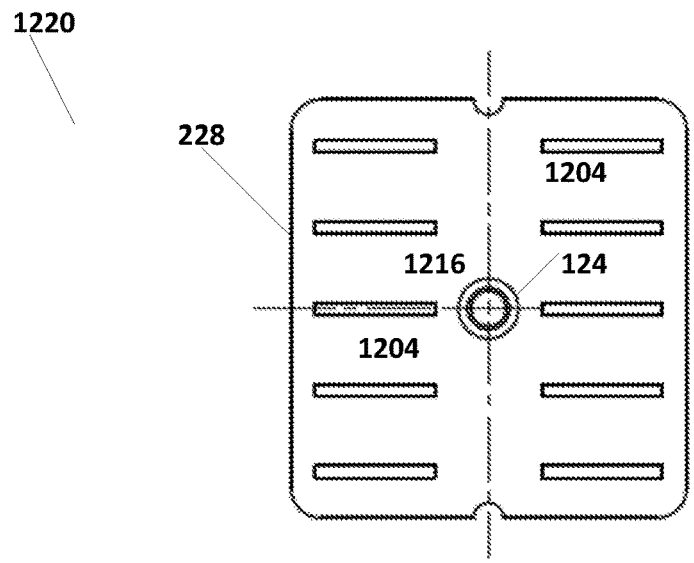

FIGS. 12A through 12F illustrate in more detail cathode bridge 228 and cathode feedthrough terminal 124 as well as the mounting of cathode feedthrough terminal 124 onto cathode bridge 228. FIGS. 12A and 12B illustrate an example of cathode bridge 228 while FIGS. 12C and 12D illustrate an example of cathode feedthrough terminal 124. FIGS. 12E and 12F illustrate attachment of cathode feedthrough terminal 124 to cathode bridge 228.

FIGS. 12A and 12B illustrate an example of cathode bridge 228 as discussed above, for example with respect to FIG. 2D. As illustrated in FIG. 12A, cathode bridge 228 is formed of a metallic plate with slots 230 arranged to receive tabs 312 from cathode assemblies 322. As is illustrated in FIGS. 12A and 12B, cathode bridge 226 has a length of $L_{CB}1$, width $W_{CB}1$, and thickness $T_{CB}1$. In some embodiments, the edges may be tapered so that cathode bridge 228 can better be fitted into indent 904 of isolator 900 as illustrated in FIG. 9A. Further, the corners of cathode bridge 228 can be curved with a radius of $R_{CB}2$. Additionally, opposite ends of cathode bridge 228 can include notches 1202 with radius $R_{CB}1$. Notches 1202 are arranged along a center line 1202, which is centered and runs along the length of cathode bridge 228. Slots 230 are elongated with respect to the width of cathode bridge 228 and arranged symmetrically with respect to center line 1204 and further symmetrically arranged with respect to center line 1206 that is perpendicular to center line 1204. In the particular example illustrated in FIG. 12A, five (5) slots 230 are arranged on each side of center line 1204 (a total of ten (10) slots 230 are illustrated). It should be clear that there may be any number of slots 230 formed on either side of center line 1204.

As is illustrated in FIG. 12A, each of notches 230 has a width of $W_{CB}4$ and a thickness of $T_{DB}2$. As shown in FIG. 12A, the left-hand edge of the five slots 230 on the left side of center line 1204 are spaced a distance $W_{CB}3$ from the left side edge of cathode bridge 228. The left-hand edge of slots 230 on the right side of center line 1202 are spaced a distance of $W_{CB}2$ from the left side edge of cathode bridge 228. The bottom edge of slots 230 is separated from the bottom of cathode bridge 228 by $L_{CB}2$, $L_{CB}3$, $L_{CB}4$, $L_{CB}5$, and $L_{CB}6$. It should be noted that the terms left, right, up, and down are used here for convenience only. It should be noted that the number and placement of slots 230 is dependent on the construction of cathode assembly 322 and the number of cathode assemblies 322 included in electrode stack 302.

FIGS. 12C and 12D illustrates an example of cathode feedthrough terminal 124. As illustrated in FIG. 12D, cathode feedthrough terminal 124 can be formed from a metallic rod to form a first section 1210 having diameter $W_{CB}5$ and length $L_{CB}9$, a second section 1212 of less diameter, diameter $W_{CB}6$ that extends from the end of first section 1210 from between length $L_{CB}9$ to length $L_{CB}8$. A third section 1214 that extends between length $L_{CB}8$ to length $L_{CB}9$ from the end of second section 1212. Third section 1214 is threaded with thread characteristics $Th_{CB}$. A center line 1216 can extend down the center of feedthrough terminal 124 and along the length of cathode feedthrough terminal 124. FIG. 12D is a view along center line 1216 viewed from section 1214.

FIGS. 12E and 12F illustrate attachment of cathode feedthrough terminal 124 to cathode bridge 228 to form cathode bridge structure 1120. As illustrated in FIG. 12E, cathode feedthrough terminal 124 is welded at weld point 1222 to the center of cathode bridge 228. As is illustrated in FIG. 12F, feedthrough terminal 124 is welded to cathode bridge 228 such that center line 1216 intersects with the intersection of center lines 1204 and 1206 of cathode 228.

In a specific example of cathode bridge structure 1220, $L_{CB}1$=69.6 mm; $L_{CB}2$=61.0 mm; $L_{CB}3$=47.4 mm; $L_{CB}4$=33.8 mm; $L_{CB}5$=20.2 mm; $L_{CB}6$=6.6 mm; $L_{CB}7$=86.0 mm; $L_{CB}8$=76.0 mm; $L_{CB}9$=72.0 mm; $W_{CB}1$=66.0 mm; $W_{CB}2$=41.9 mm; $W_{CB}3$=4.10 mm; $W_{CB}4$=20.0 mm; $W_{CB}5$=10.0 mm; $W_{CB}6$=7.0 mm; $T_{CB}1$=1.6 mm; $T_{CB}2$=2.0 mm; $Th_{CB}$=M6×1; $R_{CB}1$=2.5 mm; and $R_{CB}2$=5.0 mm. Further, cathode bridge structure 1120 can be formed of any conductive material or combination of conductive materials. For example, cathode bridge 228 may be formed of nickel while cathode feedthrough terminal 124 can be formed of stainless steel clad copper. This particular example is not meant to be limiting and provides only a specific example of anode bridge structure 1120. Cathode bridge structure 1220 can be formed with any dimensions that are consistent with other components of electrode stack assembly 104.

As is illustrated above, electrode stack assembly 104 can be assembled by starting with electrode stack 302 as illustrated in FIGS. 8. In one particular example, electrode stack 302 may include twenty (20) cathode assemblies 322 and twenty-one (21) anode assemblies 320, although other arrangements can be formed. As illustrated, for example, in FIG. 3A, isolators 304 and 306, as described above with isolator 900 of FIGS. 9A through 9C, are attached to connectors 316 of frame 106. Tabs 312 are then inserted through slots 230 in cathode bridge structure 1220 and cathode bridge structure 1220 is seated into indent 904 of isolator 304. In the particular example, four (4) tabs 312 can be inserted into each of slots 230, reflective of the twenty cathode assemblies 322. Similarly, tabs 314 of anode assemblies 320 are inserted into slots 230 of anode bridge structure 1120 such that three (3) tabs are inserted into each of slots 230, reflective of twenty-one anode assemblies 320 in electrode stack 302. Separator shields 308 and 310 can be attached to electrode stack 302 as described above at any time after electrode stack 302 is formed.

Figure 13A:
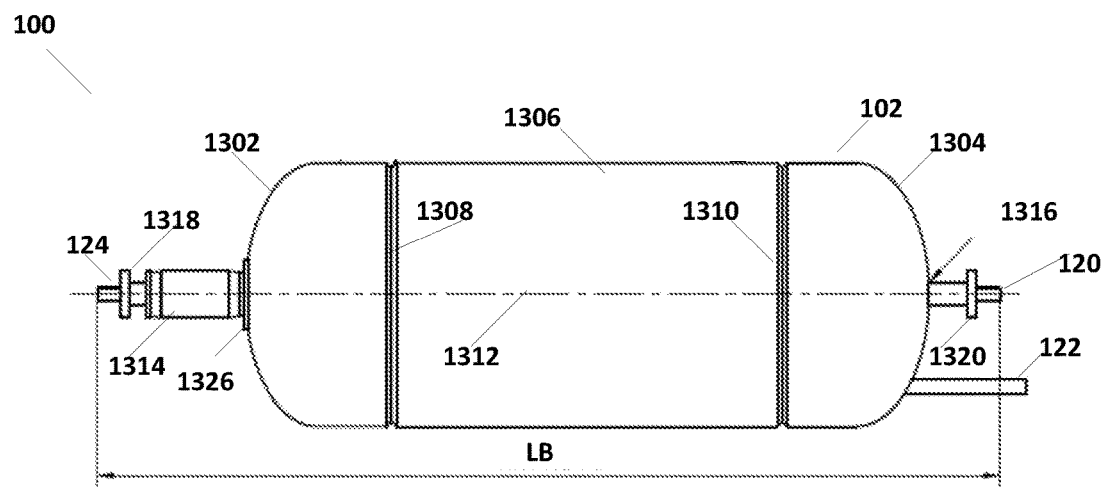
FIGS. 13A and 13B illustrate assembly of a battery according to some embodiments of the present disclosure.
Figure 13B:
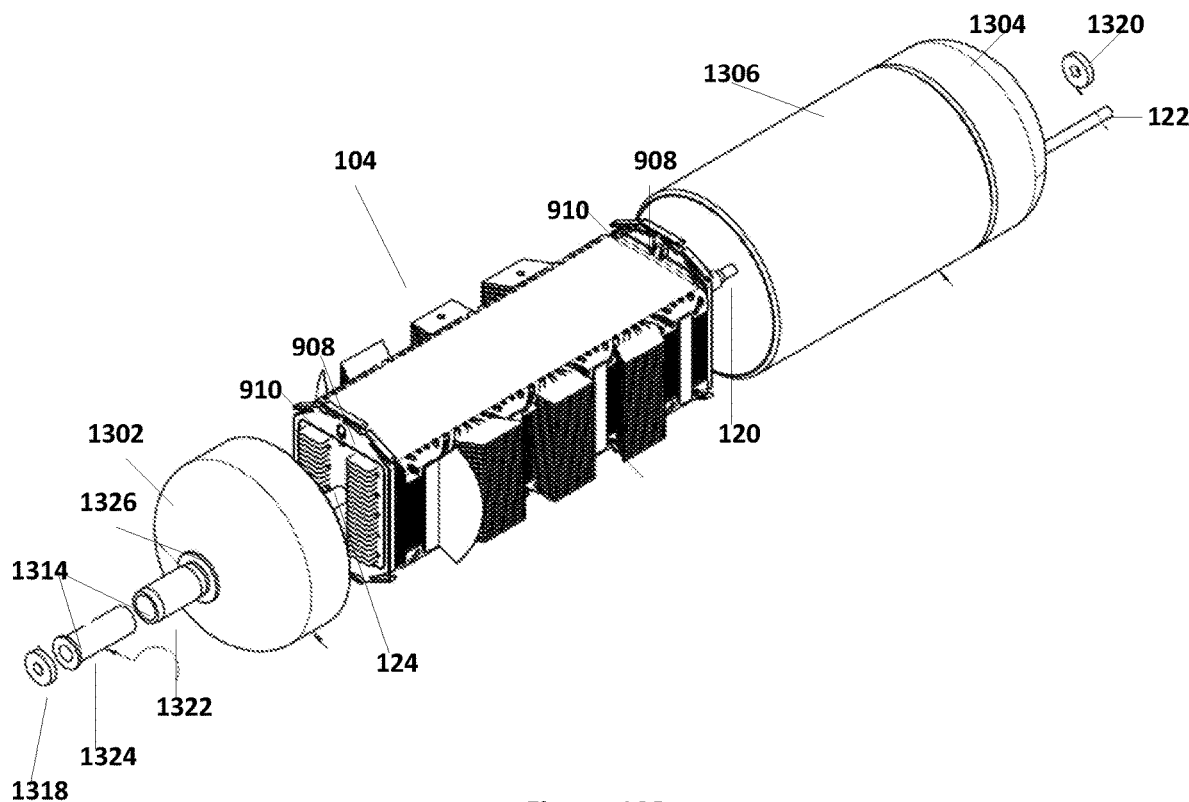

FIGS. 13A and 13B illustrate a pressure vessel 102 and assembly of battery 100 according to some embodiments of the present disclosure. In the example illustrated in FIG. 13A, pressure vessel 102 is formed by a cathode end cap 1302, a vessel body 1306, and an anode end cap 1304. As is illustrated, cathode end cap 1302 is welded to one side of vessel body 1306 at weld 1308 and anode end cap 1304 is welded to the opposite side of vessel body 1306 at weld 1310. Cathode end cap 1302, vessel body 1306, and anode end cap 1304 are arranged symmetrically around a center axis that extends through battery 100. In some examples, welds 1308 and 1310 can be formed, for example, with a gas tungsten arc welding (GTAW) technique, although other welds can be formed. As is further illustrated in FIG. 13A, the resultant length of battery 100 is LB. In a particular example, LB can be 390.4 mm.

In the example illustrated in FIG. 13A, fill tube 122 is attached through anode end cap 1304. Fill tube 122 may be passed through anode end cap 1304 and welded in place. As is further illustrated, anode feedthrough terminal 120 extends through anode end cap 1304 along a central axis 1312. A feedthrough shoulder 1320 may be inserted over anode feedthrough terminal 120. As is illustrated, anode feedthrough terminal 120 may be welded to anode end cap 1304 at weld 1316. Weld 1316 may also be formed with a GTAW technique.

As is further illustrated in FIG. 13A, cathode feedthrough terminal 124 extends through a feedthrough 1314 that is attached to cathode end cap 1302. In some embodiments, feedthrough 1314 is welded to cathode end cap 1302 at weld 1326, which as discussed above can be formed with a GTAW technique. A feedthrough shoulder 1318 may be placed on cathode feedthrough terminal 124. As is illustrated in FIG. 13A, cathode feedthrough terminal 124 and anode feedthrough terminal 120 are aligned along center axis 1312.

FIG. 13B illustrates assembly of battery 100 according to some embodiments. As is illustrated, anode end cap 1304, with fill tube 122 attached, is welded to one end of vessel body 1306. As is further illustrated, feedthrough 1314 includes a metallic body 1322 and an insulator 1324. Metallic body 1306 is welded to cathode end cap 1302. Electrode stack assembly 104 can then be inserted into vessel body 1306 such that anode feedthrough terminal 120 extends through anode end cap 1304 and can be welded into place. It should be noted that features 908 and 910 of isolators 900 are positioned to support electrode stack assembly 104 within vessel body 1306. Once in place, feedthrough insulator 1324 may be inserted into feedthrough body 1322 and cathode feedthrough terminal 124 passed through feedthrough 1314. Cathode end cap 1302 may then be welded to vessel body 1306 and feedthrough 1314 sealed against cathode feedthrough terminal 124. Feedthrough shoulders 1318 and 1320 can then be placed on cathode feedthrough terminal 124 and anode feedthrough terminal 120, respectively. FIGS. 14A and 14B illustrate a feedthrough shoulder 1400, which can be used for feedthrough shoulders 1318 and 1320 discussed above. As illustrated in FIG. 14A, feedthrough shoulder 1400 includes an inner hole of diameter $D_{FS}2$ and a metallic portion 1402 of outer diameter $D_{FS}1$. As shown in FIG. 14B, the thickness is $T_{FS}$. In some embodiments, feedthrough shoulder 1400 can be formed of a metal, for example copper. In a particular example, the dimensions can be given by $D_{FS}1$=20.0 mm; $D_{FS}2$=7.0 mm; and $T_{FS}$=4.0 mm. In some embodiments, the edges of feedthrough shoulder 1400 can be beveled. As is illustrated in FIGS. 13A and 13B feedthrough shoulders 1318 and 1320 can be placed over cathode feedthrough terminal 124 and anode feedthrough terminal 120, as illustrated above, such that feedthrough shoulder 1318 is pressed over section 1212 of cathode feedthrough terminal 124 and feedthrough shoulder 1320 is pressed over section 1112 of anode feedthrough terminal 120. This particular example is not meant to be limiting and provides only a specific example of feedthrough shoulder 1400. Feedthrough shoulder 1400 can be formed with any dimensions that are consistent with other components of electrode stack assembly 104.

FIGS. 15A and 15B illustrates a fill tube 122 according to some embodiments. As illustrated in FIGS. 15A and 15B, fill tube 122 is a tube of length $L_T1$, outer diameter $D_T1$, and inner diameter $D_T2$. In some embodiments, fill tube 122 can be formed of stainless steel and the dimensions can be $L_T1$=55.0 mm; $D_T1$=6.4 mm; and $D_T2$=4.6 mm. This particular example is not meant to be limiting and provides only a specific example of fill tube 122. Fill tube 122 can be formed with any dimensions that are consistent with other components of electrode stack assembly 104.

FIGS. 16A, 16B, 16C, and 16D illustrates an embodiment of feedthrough 1314 according to some aspects of the present disclosure. As illustrated in FIG. 13B, feedthrough 1314 includes a body 1322 as illustrated in FIGS. 16A and 16B and an insulator 1324 as illustrated in FIGS. 16C and 16D. Feedthrough 1314 is assembled by mating insulator 1324 with body 1322 such that cathode feedthrough terminal 124 extends through insulator 1324 and can be sealed against insulator 1324. Body 1322 can be formed of any material, for example a metal, that can be physically attached and sealed against cathode end cap 1302.

As illustrated in FIG. 16A, one example of body 1322, which is cylindrical in shape, can have a length of $L_{FT}1$. Body 1322 includes a base portion 1604 and a body portion 1606 which are integrated with one another (e.g., formed as a single piece or otherwise attached). Base portion 1604 can have a diameter of $W_{FT}1$ over a length of $L_{FT}5$. Measured from the bottom of base portion 1604, between a length of $L_{FT}3$ and $L_{FT}2$ body portion 1606 has an outer diameter of $w_{FT}2$. Between the top of base portion 1204 and to a length of $L_{FT}4$, body portion 1606 has an outer diameter of $w_{FT}3$. Between length $L_{FT}2$ and $L_{FT}1$ and between $L_{FT}4$ and $L_{FT}3$, body portion 1606 tapers between a diameter of $W_{FT}2$ and $W_{FT}3$. Body 1322 has an interior structure that is configured to receive insulator 1324.

FIG. 16B illustrates a cross-sectional view of body 1322 where body portion 1606 and base portion 1604 are viewed from the top. As is illustrated, a central portion 1614 forms a hole. Central portion 1614 of body portion 1606 has an inner thread, which can be a standard thread characterized by $TS_{FT}1$ with a thread depth of $TD_{FT}1$.

FIGS. 16C and 16D illustrate an example of insulator 1324 of feedthrough 1314. Insulator 1324 includes a body portion 1612 and a base portion 1610 and can be formed from an insulating material. As illustrated in FIG. 16C, insulator 1324 has a length of $L_{FT}6$ while base portion 1610 has a length of $L_{FT}7$. Insulator 1324 includes a through hole 1616 with a diameter of $w_{FT}4$, which receives cathode feedthrough terminal 124. FIG. 16D illustrates a cross section of insulator 1324. In particular, $W_{FT}4$ is sized to allow passage of cathode feedthrough terminal 124 with sufficient tightness to form a seal. Further, as is illustrated in the cross section illustrated in FIG. 16D, body portion 1612 has an external thread characterized at $TS_{FT}2$. In particular, the external thread of body portion 1612 engages with the internal thread of body portion 1606 such that insulator 1608 screws into body 1322. In some embodiments, the internal thread of body portion 1606 and the external thread of insulator 1608 can be pipe threads that provide a seal as they engage with one another. Additionally, base portion 1610 can be octagonal with an overall width of $W_{FT}5$ where the edges of individual edges of the octagon meet at rounded ends with a radius of $R_{FT}$.

In a specific example of feedthrough 1314 that is consistent with the specific examples discussed above, the following dimensions and characteristics can be used: $L_{FT}1$=44.0 mm; $L_{FT}2$=39.5 mm; $L_{FT}3$=10.5 mm; $L_{FT}4$=6.0 mm; $L_{FT}5$=4.0 mm; $L_{FT}6$=48.0 mm; $L_{FT}7$=4.0 mm; $W_{FT}1$=30.0 mm; $W_{FT}2$=20.0 mm; $W_{FT}3$=19.2 mm; $W_{FT}4$=10.0 mm; $W_{FT}5$=21.0 mm; RFT=3.0 mm; $TS_{FT}1$=G 3/8-19; $TS_{FT}2$=G 3/8-19; and $TD_{FT}1$=0.4 mm. Body 11322 can be metallic and consistent with the material of cathode end cap 1302 (e.g., can be welded to or otherwise attached to cathode end cap 1302). In some examples, body 1322 can be stainless steel. Insulator 1324 can be any insulator, for example ultra-high molecular weight polyethylene (UHMW) plastic. During assembly, after body 1322 is welded to cathode end cap 1302, the insulator 1324 can be screwed into body 1322.

Figure 17A:
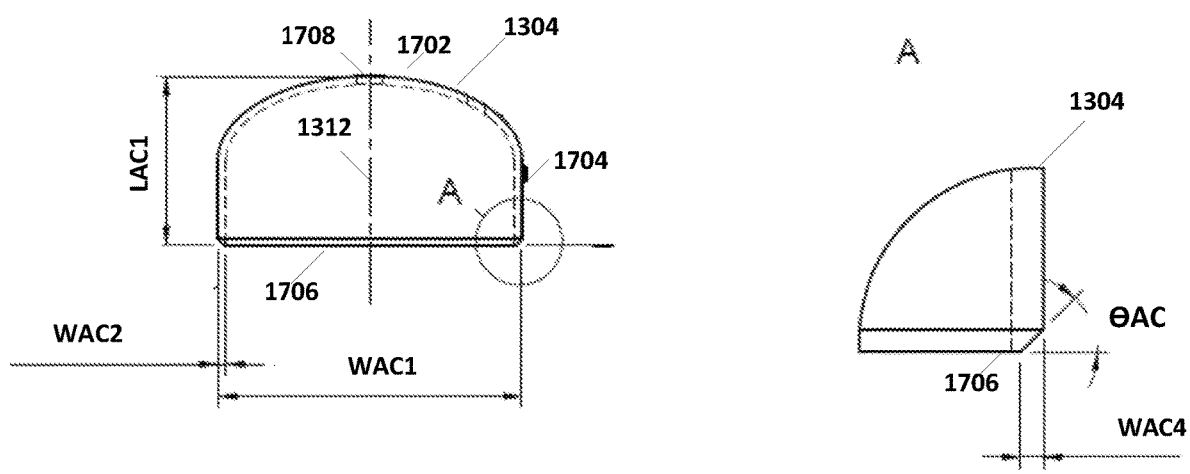
FIGS. 17A, 17B, 17C, and 17D illustrate an example of an anode end cap according to some embodiments of the present disclosure.
Figure 17C:
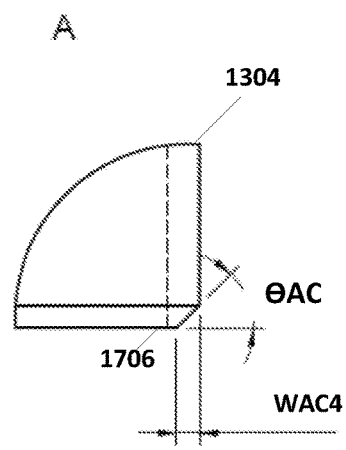
Figure 17B:
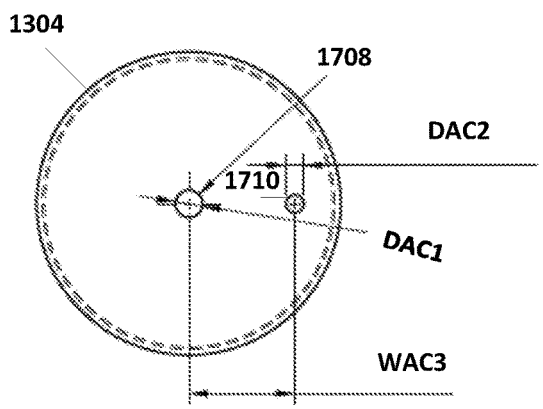

FIGS. 17A through 17D illustrates an example of anode end cap 1304 according to some embodiments of the present disclosure. As illustrated in FIG. 17A, anode end cap 1304 includes a domed portion 1702 and a straight portion 1704. There is a lip 1706 formed on the straight portion 1704. The total height of anode end cap 1304 is $L_{AC}1$ while the outer diameter of straight portion 1706 is $W_{AC}1$. The wall thickness is $W_{AC}2$. As illustrated in FIG. 17B, a center hole 1708 of diameter $D_{AC}1$ is formed in the center, corresponding to center line 1312, to pass anode feedthrough terminal 120. A fill tube hole 1710 of diameter $D_{AC}2$ is formed a distance $W_{AC}3$ from the center of center hole 1708. FIG. 17C illustrates an example of lip 1706 with a bevel from the outer wall of angle $\Theta_{AC}$. The bevel reaches into a depth of $W_{AC}4$ from the outer edge of straight portion 1704.

Figure 17D:
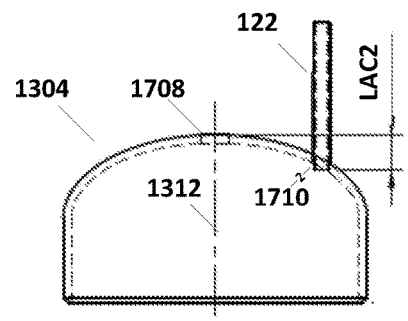

FIG. 17D illustrates attachment of fill tube 122 to anode end cap 1304. As is illustrated, fill tube 122 is inserted into fill tube hole 1710 such that the end of fill tube 122 extends a distance $L_{AC}2$ into anode end cap 1304 from center hole 1708.

In a specific example of anode end cap 1304, $L_{AC}1$=63.4 mm; $L_{AC}2$=12.7 mm; $W_{AC}1$=114.3 mm; $W_{AC}2$=3.0 mm; $W_{AC}3$=40.0 mm; $W_{AC}4$=2.2 mm; $D_{AC}1$=10.2 mm; $D_{AC}2$=6.7 mm; and $\Theta_{AC}$=45°. Anode end cap 1304 can be formed of any material, for example stainless steel. This particular example is not meant to be limiting and provides only a specific example of anode end cap 1304. Anode end cap 1304 can be formed with any dimensions that are consistent with other components of electrode stack assembly 104.

Figure 18A:
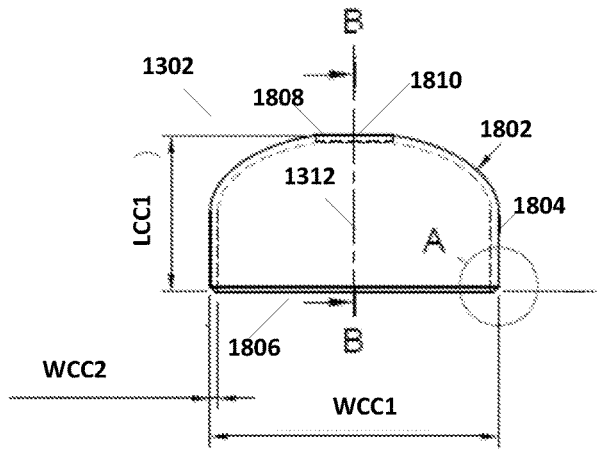
FIGS. 18A, 18B, 18C, 18D, 18E, 18F, 18G, and 18H illustrate an example of cathode end cap according to some embodiments of the present disclosure.

FIGS. 18A through 18H illustrate an example of cathode end cap 1302 according to some embodiments of the present disclosure. As illustrated in FIG. 18A, cathode end cap 1302 includes a domed portion 1802, a straight portion 1804, and a lip 1806 formed in the straight portion 1804. A flattened portion 1808 is formed at the crest of domed portion 1802. As is illustrated in FIG. 18A, cathode end cap 1302 is an outer diameter at straight portion 1804 of $W_{CC}1$ and an overall height of $L_{CC}1$. The wall thickness at straight portion 1802 is $W_{CC}2$. As illustrated in FIG. 18A, center line 1312 extends through flat portion 1808.

Figure 18B:
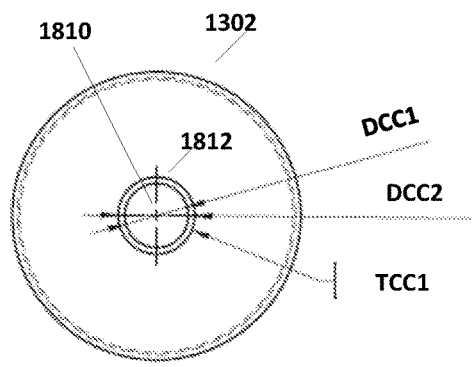

FIG. 18B illustrates a view of cathode end cap 1302 from straight section 1804 along center line 1312 in FIG. 18A. As illustrated, through-holes 1810 and counterbore 1812 formed in flat section 1808. Through hole 1810 is formed in the bottom of flat portion 1808 such that hole 1810 has an inner diameter of $D_{CC}1$ through a thickness of $T_{CC}1$ of the bottom of flat portion 1808. Counterbore 1812 has a diameter $D_{CC}1$ and is formed above through hole 1810. Consequently, base 1604 of body 1322 of feedthrough 1314 seats into counterbore 1812. It should be noted that in this context, the bottom of flat portion 1808 refers to the portion of flat portion 1808 on the interior of cathode end cap 1302.

Figure 18C:
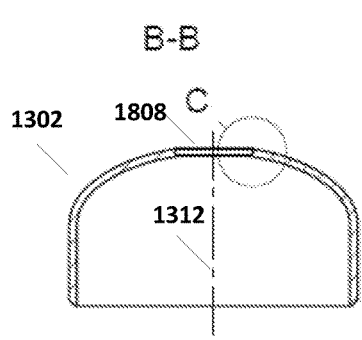
Figure 18D:
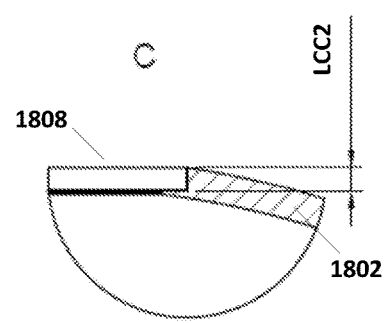

FIG. 18C illustrates a cross sectional view of cathode end cap 1302 along line B-B (i.e. center line 1312) and further illustrates flat portion 1808. FIG. 18D illustrates an expanded view of the area marked C in FIG. 18C, which further illustrates the edge of flat portion 1808 and domed portion 1802. As is illustrated, flat portion 1808 has a depth of $L_{CC}2$ in domed portion 1802.

Figure 18E:
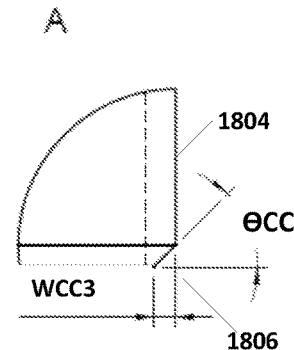

FIG. 18E illustrates an expanded view of area A identified in FIG. 18A and further illustrates lip 1806. As illustrated, in FIG. 18E, lip 1806 is formed by a bevel at angle $\Theta_{CC}$ through a length $W_{CC}3$ at the edge of straight portion 1804.

Figure 18F:
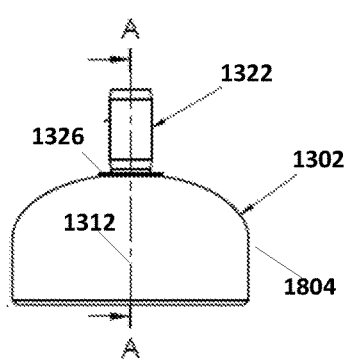
Figure 18G:
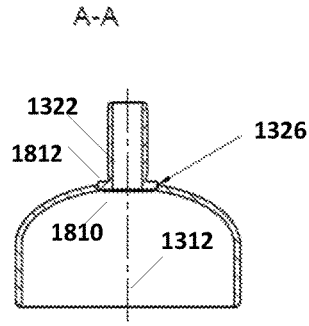
Figure 18H:
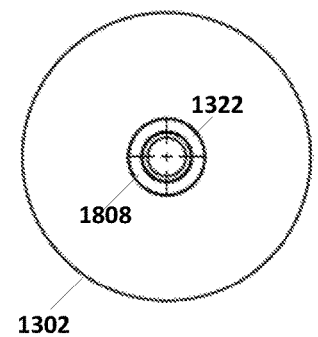

FIGS. 18F, 18G, and 18H illustrate assembly of cathode end cap 1302 with feedthrough body 1322. As illustrated in FIG. 18F, body 1322 of feedthrough 1314 is welded at weld point 1326 to cathode end cap 1302. FIG. 18G illustrates a cross-sectional view through line A-A (center line 1312). As is illustrated, body 1322 is inserted into hole 1812 and seats against the lip formed by the lower diameter hole 1810 and then welded at weld 1326. As discussed above, weld 1326 can be a GTAW weld. FIG. 18H further illustrates a view from the straight portion 1804. FIG. 18H further illustrates the seating of body 1322 into through counterbore 1812 against through hole 1810.

In a specific example of cathode end cap 1302, $L_{CC}1$=62.4 mm; $L_{CC}2$=2.4 mm; $W_{CC}1$=114.3 mm; $W_{CC}2$=3.0 mm; $W_{CC}3$=2.2 mm; $D_{CC}1$=25.4 mm; $D_{CC}2$=30.5 mm; TCC1 =0.5 mm; and $\Theta_{CC}$=45°. Cathode end cap 1302 can be formed of any material, for example stainless steel. This particular example is not meant to be limiting and provides only a specific example of cathode end cap 1302. Cathode end cap 1302 can be formed with any dimensions that are consistent with other components of electrode stack assembly 104.

Figure 19A:
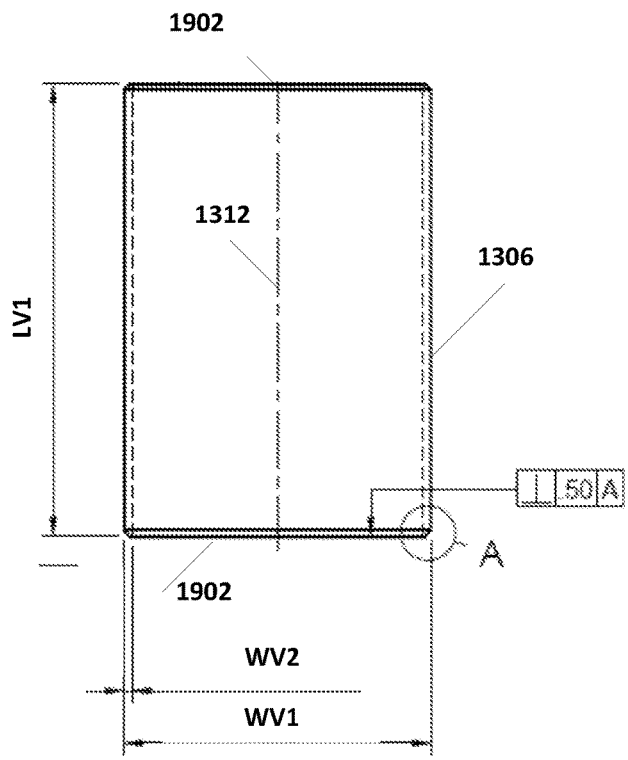
FIGS. 19A, 19B, and 19C illustrate an example of vessel body according to some embodiments of the present disclosure.
Figure 19B:
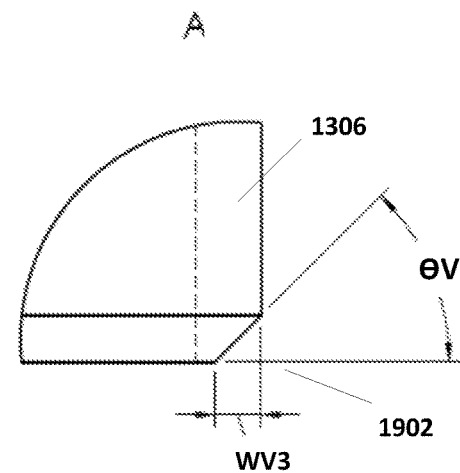
Figure 19C:
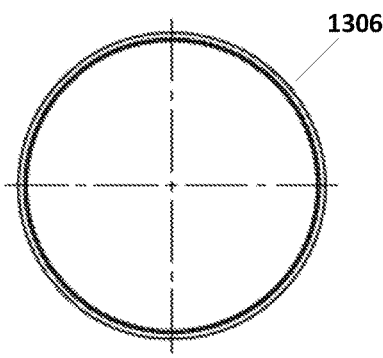

FIGS. 19A through 19C illustrate an example of vessel body 1306 according to some embodiments of the disclosure. FIG. 19A illustrates a side view of vessel body 1306 while FIG. 19C illustrates a cross section of vessel body 1306. As illustrated in FIGS. 19A and 19C, vessel body 1306 is a tubular structure of overall length Lv1 having an outer diameter of Wv1. The vessel body 1306 includes lips 1902 at each end that mate with similar structures of anode end cap 1304 and cathode end cap 1302 to form welds 1308 and 1310 as illustrated in FIG. 13A. FIG. 19B illustrates an expanded view of the area A illustrated in FIG. 19A, which further illustrates lip 1902. Lip 1902 is formed by a bevel of angle ev that extends a distance Wv3 into the sidewall of vessel body 1306.

Figure 20A:
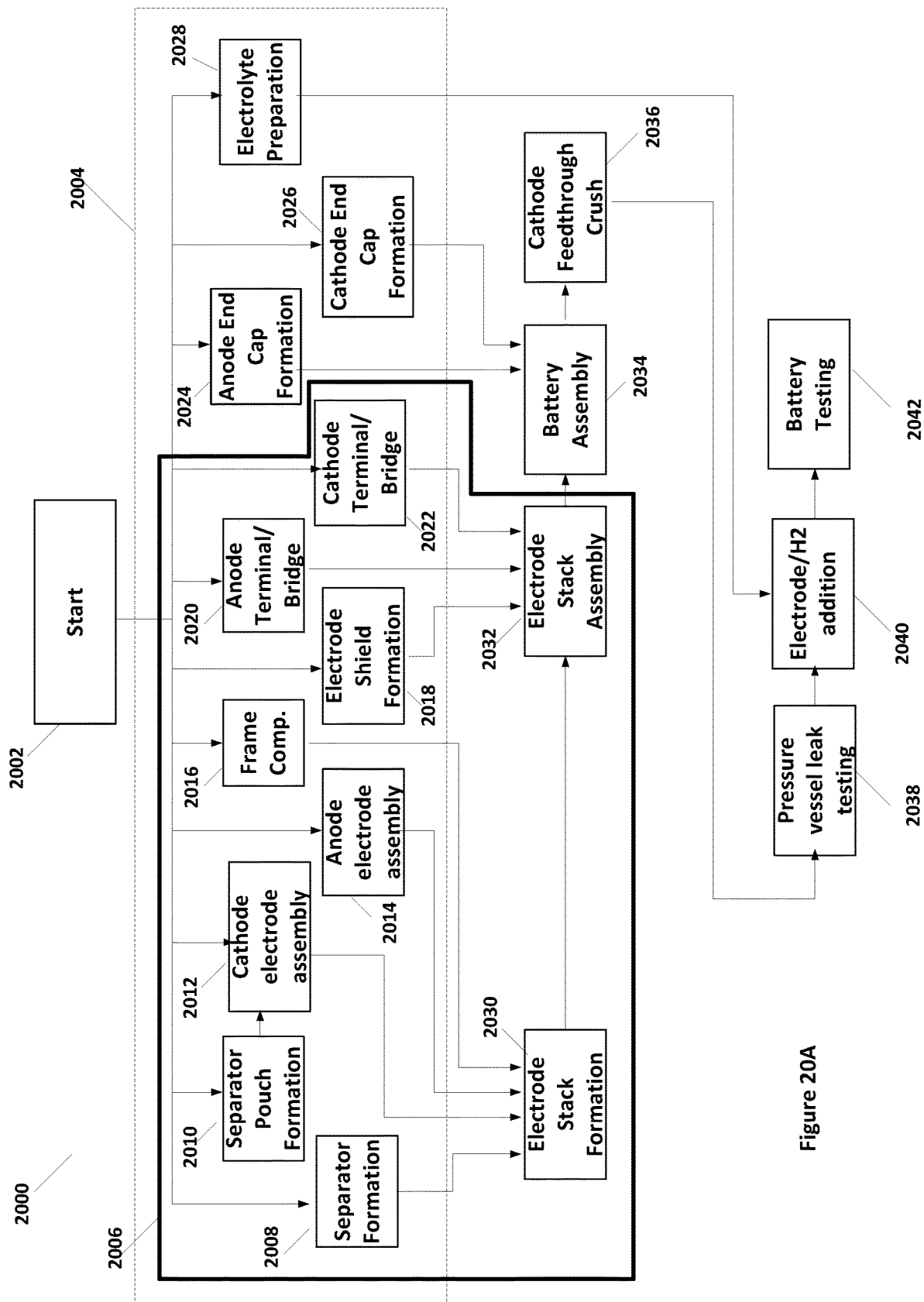

FIGS. 20A through 20O illustrate a method 2000 for producing a battery 100 according to some embodiments of the present disclosure. As is illustrated in FIG. 20A, method 2000 starts at step 2002 where all of the various parts used in the construction and assembly described below are collected. From step 2002, method 2000 proceeds to block 2004, which includes a series of pre-assemblies that can be performed prior to assembly of battery 100. As is illustrated in FIG. 20A, the steps in block 2006 indicates steps for producing an electrode stack assembly 302 according to some embodiments of the present disclosure. The remaining steps in method 2000 result in the finished battery 100.

Preassembly steps 2004 can include separator formation 2008, separator pouch assembly 2010, cathode electrode assembly 2012, anode electrode assembly 2014, frame formation 2016, electrode shield formation 2018, anode terminal/bridge assembly 2020, cathode terminal/bridge assembly 2022, anode end cap formation 2024, cathode end cap formation 2026, and electrode preparation 2028. Each of these steps can be performed in parallel, except for separator pouch formation 2010 and cathode electrode assembly 212, are not dependent on completion of the others. As is illustrated in FIG. 20A, a separator 110 produced in separator formation 2008, the cathode electrode assembly 322 produced in cathode electrode assembly step 212, an anode electrode assembly 2014 produced in anode electrode assembly step 2014, and frame components 220 and 222 formed in frame component step 2016 are brought together in electrode stack formation step 2030. In electrode stack formation 2030, electrode stack 302 is formed. Electrode shields 308 and 310 formed in electrode shield formation 2018, anode bridge structure 1120 formed in anode terminal/bridge step 2020 and cathode bridge structure 1220 formed in cathode terminal/bridge step 2022 are input to electrode stack assembly step 2032 where electrode stack assembly 104 is formed.

The electrode stack assembly 104, the anode end cap 1304 formed in anode end cap formation 2024 and the cathode end cap 1302 from cathode end cap formation step 2026 are input to battery assembly 2034 where the structure of battery 104 is formed, including formation of pressure vessel 102. In step 2036, the feedthrough 1314 is crushed to form a seal.

In step 2038, the resulting structure is leak tested. Leak testing can be performed by over pressuring the formed pressure vessel 102 or by creating a vacuum in pressure vessel 102. In this step, pressure testing can be performed by pressurizing (or evacuating) pressure vessel 102 to a particular test pressure and monitoring pressure over time. Pressure vessel 102 can be determined to pass the test if pressure holds for a set period of time. If the leak test is successful, in step 2040 electrolyte and hydrogen can be input to charge the battery structure and the fill tube 122 is sealed.

The resulting battery can then be tested in battery testing step 2042. Electrical testing in step 2042 may include charging and discharging the resulting battery 100 over several cycles and monitoring performance of battery 100.

Figure 20B:
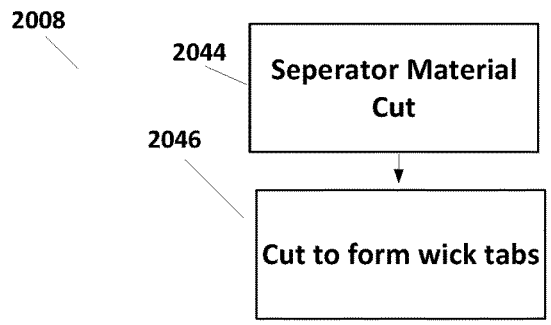

FIG. 20B further illustrates separator formation step 2008. Separator formation step 2008 starts in step 2044 where separation material is roughly cut to the dimensions illustrated in FIGS. 4D and 4E. In some embodiments, in step 2046 further cuts to form wick tabs 202 are made to form separator 110. As illustrated in FIG. 4D, wick tabs 202 that are closest on the end can be angled towards the center in order to prevent damage during subsequent welding processes. As is discussed above, multiple ones of separator 110 will be used in electrode stack assembly 104.

Figure 20C:
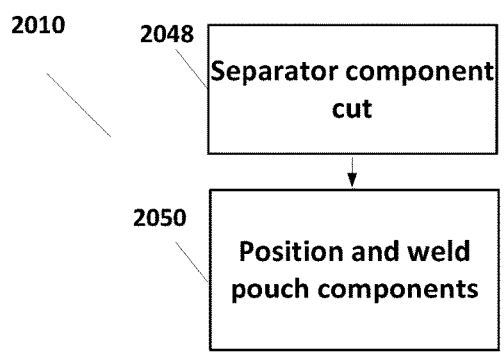

FIG. 20C further illustrates separator pouch formation step 2010. Separator formation step 2010 starts in step 2048 where separator material is cut according to the dimensions illustrated in FIGS. 4A and 4B to form separator pouch components 402. In step 2050, two separator pouch components 402 are positioned and heat welded on three sides as illustrated in FIG. 4C to form separator pouch 410.

Figure 20D:
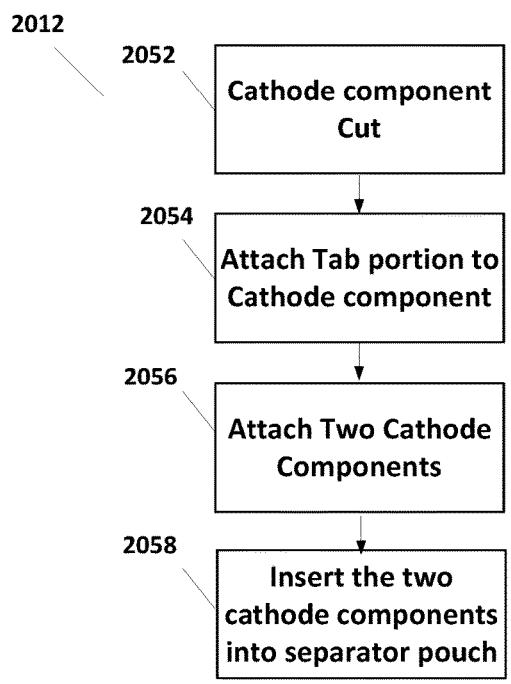

FIG. 20D further illustrates cathode formation assembly step 2012 for formation of cathode assembly 322 as illustrated in FIGS. 6A through 6H. Step 2012 starts in step 2052 where cathode material is cut according to the dimensions illustrated in FIGS. 6C and 6D. In step 2054, tab portion 604 is attached to cathode material to form cathode components 602 as illustrated in FIGS. 6C through 6E. In cases where the cathode sheet material, from which cathode component 602 that includes cathode portion 606 and tab body 610 are jointly cut, then step 2054 has already been completed. In step 2056, two cathode components 602 are positioned as shown in FIGS. 6F through 6H. In step 2058, the resulting structure is inserted into separator pouch 410 to form cathode assembly 322.

Figure 20E:
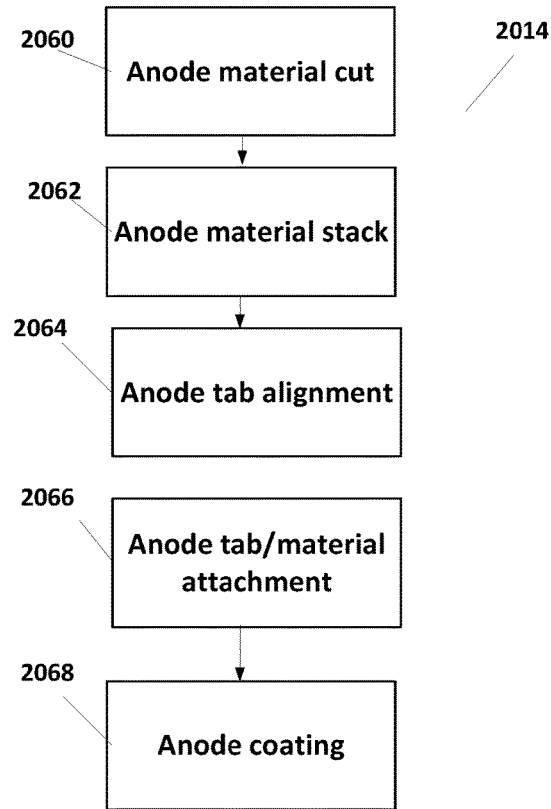

FIG. 20E further illustrates anode electrode assembly 2014 as illustrated in FIGS. 5A through 5E. Assembly step 2014 starts in step 2060 where the anode material is cut according to the dimensions illustrates in FIGS. 5C through 5E. As discussed, anode assembly 320 can include three anode layers, one of which can be corrugated. In step 2062, the cut anode material is stacked such that the corrugated layer is the middle layer. In step 2064, anode tab 314 is aligned with the stacked anode layers formed in step 2062. In step 2066, the anode tab 314 and the anode layers 508, 510, and 512 are attached. During step 2066, anode layers 508, 510, and 512 can be attached by pressing. Anode tab 314 can then be attached, for example by welding. In some embodiments, further processing of anode assembly 320 can be performed. In particular, in step 2068 an anode coating can be applied. In step 2070, the anode assembly 320 can be oven dried. In step 2072, the resulting structure can be sintered.

FIG. 20F further illustrates frame component preparation 2016. In step 2074 of frame component preparation 2016, a sheet of material can be cut according to the dimensions illustrated in FIGS. 7A through 7J for upper portion 220 and lower portion 222. Further, side supports 206 can be cut according to the dimensions illustrated in FIGS. 7H and 7I. In step 2076, the resulting structures are formed into upper portion 220 and lower portion 222 by appropriately bending the material as detailed in FIGS. 7A through 7J. In step 2078, side supports 206 are attached, for example by welding, to lower portion 220.

FIG. 20G illustrates electrode shield formation step 2018, which results in formation of electrode shield 1000 that can be used for electrode shields 308 and 310 as described above. Electrode shield 1000 is illustrated in FIGS. 10A through 10C. As illustrated in FIG. 20G, step 2018 starts in step 2080 where a metallic sheet is cut according to the dimensions illustrated in FIGS. 10A and 10B. In step 2082, the structure is bent along line 1006 to form electrode shield 1000.

FIG. 20H illustrates anode terminal/bridge formation 2020 that results in anode bridge structure 1120 as illustrated in FIGS. 11E and 11F. Formation step 2020 starts in step 2084, where anode terminal bridge 226 that has the structure and dimensions illustrated in FIGS. 11A and 11B is formed. In step 2086, the anode feedthrough terminal 120 with dimensions as illustrated in FIGS. 11C and 11D is attached, for example by welding, to anode terminal bridge 226 as illustrated in FIGS. 11E and 11F to form anode bridge structure 1120.

FIG. 20I illustrates cathode terminal/bridge formation 2022 that results in cathode bridge structure 1220 as illustrated in FIGS. 12E and 12F. Formation step 2022 starts in step 2088, where cathode terminal bridge 228 has the structure and dimensions illustrated in FIGS. 12A and 12B is formed. In step 2090, the cathode feedthrough terminal 124 with dimensions as illustrated in FIGS. 12C and 12D is attached, for example by welding, to cathode terminal bridge 228 as illustrated in FIGS. 12E and 12F to form cathode bridge structure 1220.

FIGS. 20J further illustrates electrode stack formation 2030, as is illustrated in FIG. 8. Electrode stack formation 2030 starts in step 2092, where lower portion 222 of frame 106 is placed in jig 800. In step 2094, alternating layers of anode assembly 320 and cathode assembly 322 are placed in jig 800 appropriately with separator 110 placed between each layer, until the desired number of electrodes is positioned. As shown in FIG. 8, each of anode assemblies 320, separators 110, and cathode assemblies 322 are positioned according to the structure of jig 800. In step 2096, upper portion 220 of frame 106 is added. In step 2098, jig 800 can be placed in a press where pressure is applied to the electrode stack to a particular thickness of electrode stack 302 (for example, thickness Tes as illustrated in FIG. 3E). In step 2001, side supports 206 that have been attached to lower portion 222 are welded to top portion 220 to complete formation of frame 106. The resulting structure is electrode stack 302.

Figures 20K, 20L, 20M:
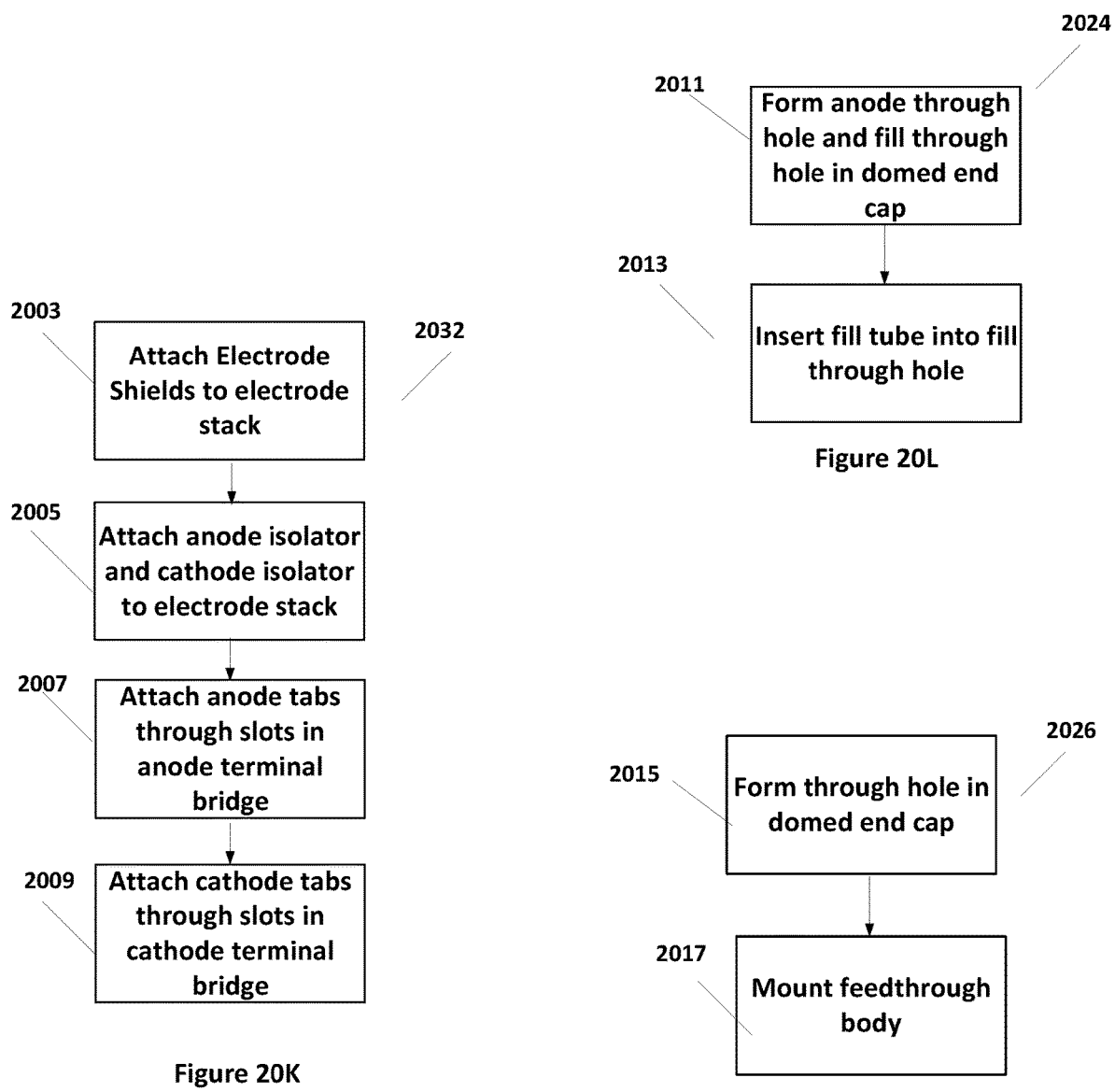

FIG. 20K further illustrates electrode stack assembly formation 2032. Electrode stack assembly formation 2032 starts in step 20032 where the electrode shields 308 and 310 formed in electrode shield formation 2018 is attached, for example by welding, to side supports 206 that are closes to the cathode side of electrode stack 302 as illustrated in FIG. 3A. In step isolators 304 and 306 as described in FIGS. 9A through 9C are attached to electrode stack 302. As described, connector 318 of isolators 304 and 306 engage with connectors 316 of frame 106. In step 2007, anode tabs 314 are inserted through slots 224 in anode terminal bridge 226 and fixed in place, e.g. by welding. As described above, anode terminal bridge 226 seats in isolator 306 as illustrated in FIG. 3A. In step 2009, cathode tabs 312 are inserted through slots 230 in cathode terminal bridge 228 and fixed in place, e.g. by welding. As described above, cathode terminal bridge 228 seats in isolator 304 as illustrated in FIG. 3A. Isolators 304 and 306 are further described with respect to FIGS. 9A through 9C.

FIG. 20L further illustrates anode end cap formation 2024 to form anode cap 1304. Step 2024 starts in step 2011, where through holes 1708 and 1710 as described with respect to FIGS. 17A through 17D. In step 2013, a fill tube 122 as described in FIGS. 15A and 15B is inserted into through hole 1710 as illustrated in FIG. 17D and welded in place to form cathode end cap 1304.

FIG. 20M further illustrates cathode end cap formation 2026. Step 2026 starts in step 2015 where through holes 1810 and counterbore 1812 are formed as illustrated in FIGS. 18A and 18B. In step 2017, feedthrough body 1322 as illustrated in FIGS. 16A and 16B can be seated into holes 1810 and counterbore 1812 and welded in place as illustrated in FIGS. 18F through 18H to form cathode end cap 1302.

FIG. 20N further illustrates battery assembly 2034 to form the structure of battery 100. Battery assembly 2034 starts in step 2019, where anode end cap 1304 that was prepared in anode cap formation 2024 is welded to vessel body 1306 at weld 1310 as described above with respect to FIGS. 13A and 13B. In step 2021, electrode stack assembly 104 is inserted into vessel body 1306 such that anode feedthrough terminal 120 extends through hole 1708. In step 2023, the anode feedthrough terminal 120 is welded at weld 1316 to anode end cap 1304, where lip 1902 of vessel body 1306 is mated to lip 1706 of anode end cap 1304. In step 2025, feedthrough insulator 1324 is screwed into feedthrough body 1322 as illustrated in FIG. 13B to form feedthrough 1314. Examples of feedthrough insulator 1324 and feedthrough body 1322 are illustrated in FIGS. 16A through 16D. In step 2027, cathode end cap 1302 as formed in cathode end cap formation 2026, is positioned such that cathode feedthrough terminal 124 passes through feedthrough insulator 1324 of feedthrough 1314 and lip1806 of cathode end cap 1302 mates with lip 1902 of vessel body 1306. In step 2029, cathode end cap 1302 is welded to vessel body 1306 at weld 1308. In step 2039, feedthrough shoulders 1318 and 1320, which are illustrated in FIGS. 14A and 14B, are installed over cathode feedthrough terminal 124 and anode feedthrough terminal 120, respectively.

FIG. 20O further illustrates step 2040. In step 2040, pressure vessel 102 is charged with electrolyte produced in electrolyte preparation step 2028. An example of step 2040 is illustrated in FIG. 20O. As shown in FIG. 20O, step 2040 starts with degas step 2031. In degas step 2031, pressure vessel 102 is evacuated to allow the interior to degas. In step 2033, pressure vessel 102 may be flushed one or more times with electrolyte 126 by filling and draining electrolyte 126 from pressure vessel 102 one or more times. Filling and draining may include evacuating pressure vessel 102 and filling pressure vessel 102 with electrolyte then applying gas at a pressure to drain pressure vessel 102. In step 2035, electrolyte 126 is added to pressure vessel 102 to fill pressure vessel 102. This can be accomplished, as discussed above, by repeatedly evacuating pressure vessel 102 and adding electrolyte 126 until pressure vessel 102 is filled with electrolyte 126. In step 2037, pressure vessel 102, now filled with electrolyte 126, is allowed to sit for a period of time to allow electrode stack 104 to absorb a sufficient amount of electrolyte 126 for operation of battery 100. In some embodiments, this step may be sufficiently long to saturate electrode stack 104 with electrolyte 126. Once electrode stack 104 contains sufficient electrolyte 126, which may take several hours (e.g. about 8 hrs) overall, then step 2040 proceeds to step 2039 where excess electrolyte 126 is drained. This can be accomplished by providing a pressure of hydrogen gas to fill tube 122 to remove excess electrolyte 126. In step 2041, fill tube 122 is sealed to form a completed battery 100. From step 2040, method 2000 proceeds to step 2042 for electrical testing. Electrical testing in step 2042 may include charging and discharging the resulting battery 100 over several cycles and monitoring performance of battery 100.

Aspects of the present disclosure describe a metal hydrogen battery and its assembly. A selection of the multitude of aspects of the present invention can include the following aspects:

Aspect 1: An electrode stack assembly for a metal hydrogen battery, comprising: a plurality of anode assemblies, each anode assembly including at least one anode layer attached to an anode tab; a plurality of cathode assemblies, each cathode assembly including at least one cathode layer attached to a cathode tab; a plurality of separators; an anode feedthrough bridge arranged to engage each anode tab of each of the plurality of anode assemblies; a cathode feedthrough bridge arranged to engage each cathode tab of each of the plurality of cathode assemblies; an anode feedthrough terminal coupled to the anode feedthrough bridge; and a cathode feedthrough terminal coupled to the cathode feedthrough bridge, wherein the plurality of anode assemblies and the plurality of cathode assemblies are alternately arranged and separated by the plurality of separators to form an electrode stack.

Aspect 2: The electrode stack assembly of Aspect 1, wherein each of the plurality of separators includes a plurality of wick tabs.

Aspect 3: The electrode stack assembly of Aspects 1-2, further including a frame arranged to hold the electrode stack.

Aspect 4: The electrode stack assembly of Aspects 1-3, wherein the frame includes a top portion and a bottom portion that are welded while the electrode stack enclosed in the frame is pressed.

Aspect 5: The electrode stack assembly of Aspects 1-4, further including an anode isolator positioned between the electrode stack and the anode feedthrough bridge; and a cathode isolator positioned between the electrode stack and the cathode feedthrough bridge.

Aspect 6: The electrode stack assembly of Aspects 1-5, wherein the at least one anode layer includes three layers attached by application of pressure and wherein the anode tab is attached to the three layers by welding.

Aspect 7: The electrode stack assembly of Aspects 1-6, wherein each of the plurality of cathode layers includes a pair of cathode components, each cathode component including a cathode layer attached to a tab, the pair of cathode components being positioned with respect to one another such that the tabs align to form the cathode tab; and a separator pouch, the pair of cathode components being inserted into the separator pouch such that the cathode tab is exposed.

Aspect 8: The electrode stack assembly of Aspects 1-7, wherein the anode feedthrough assembly is formed of a metal with an array of slots formed to receive tabs from the anode tab.

Aspect 9: The electrode stack assembly of Aspects 1-8, wherein the cathode feedthrough assembly is formed of a metal with an array of slots formed to receive tabs from the cathode tab.

Aspect 10: A metal hydrogen battery, comprising: an electrode stack assembly, the electrode stack assembly including: a plurality of anode assemblies, each anode assembly including at least one anode layer attached to an anode tab, a plurality of cathode assemblies, each cathode assembly including at least one cathode layer attached to a cathode tab, a plurality of separators, an anode feedthrough bridge arranged to engage each anode tab of each of the plurality of anode assemblies, a cathode feedthrough bridge arranged to engage each cathode tab of each of the plurality of cathode assemblies; an anode feedthrough terminal coupled to the anode feedthrough bridge; and a cathode feedthrough terminal coupled to the cathode feedthrough bridge, wherein the plurality of anode assemblies, the plurality of cathode assemblies, and the plurality of separators are alternately arranged to form an electrode stack; a pressure vessel surrounding the electrode stack assembly such that the cathode feedthrough terminal extends through the pressure vessel; and an electrolyte contained within the pressure vessel.

Aspect 11: The metal hydrogen battery of Aspect 10, wherein the cathode feedthrough terminal extends through a feedthrough in an end of the pressure vessel.

Aspect 12: The metal hydrogen battery of Aspects 10-11, wherein the feedthrough includes a body portion that attaches to the pressure vessel and an insulator portion that inserts into the body portion and engages the cathode feedthrough terminal.

Aspect 13: The metal hydrogen battery of Aspects 10-12, wherein the body portion is crushed to form seals between the body portion, the insulator portion, and the cathode feedthrough terminal.

Aspect 14: The metal hydrogen battery of Aspects 10-13, wherein the pressure vessel is formed with a vessel side wall, a cathode end cap that includes the feedthrough attached to the vessel side wall, and an anode end cap attached to the vessel side wall.

Aspect 15: The metal hydrogen battery of Aspects 10-14, wherein the anode feedthrough terminal is attached to the anode end cap.

Aspect 16: The metal hydrogen of Aspects 10-14, wherein the anode feedthrough terminal extends through the anode end cap.

Aspect 17: A method of forming an electrode stack assembly for a metal hydrogen battery, comprising: preassembling components of the electrode stack assembly by assembling a plurality of cathode assemblies, each cathode assembly having cathode tabs attached to one or more cathode material layers, assembling a plurality of anode assemblies, each anode assembly having anode tabs coupled to one or more anode material layers, forming a plurality of separators from separator material, forming frame top portions and frame bottom portions, forming an anode feedthrough bridge assembly, and forming a cathode feedthrough bridge assembly; stacking the separators, anode assemblies, and cathode assemblies in alternate fashion between the frame top portion and the frame bottom portion to capture the electrodes between the frame top portion and the frame bottom portion; pressing the electrodes, the frame top portion, and the frame bottom portion; forming an electrode stack by attaching the frame top portion to the frame bottom portion to form a frame; attaching cathode tabs of the plurality of cathode assemblies in the electrode stack to the cathode feedthrough bridge assembly; and attaching anode tabs of the plurality of anode assembles in the electrode stack to the anode feedthrough bridge assembly.

Aspect 18: The method of forming an electrolyte stack assembly of Aspect 17, wherein assembling the plurality of cathode assemblies comprises, for each of the cathode assemblies, producing two cathode components, each of the cathode components include a cathode layer attached to a cathode tab structure; arranging the two cathode components such that the cathode tab structures form the cathode tab; forming a separator pouch; and inserting the cathode components into the separator pouch.

Aspect 19: The method of forming an electrolyte stack assembly of Aspects 17-18, wherein assembling a plurality of anode assemblies includes stacking a plurality of layers of anode material; and attaching the anode tabs to the layers of anode materials.

Aspect 20: The method of forming an electrolyte stack assembly of Aspects 17-19, wherein forming an anode feedthrough bridge assembly includes providing an anode feedthrough bridge that includes a plurality of slots for receiving tabs from the anode assemblies; and attaching an anode feedthrough terminal to the anode terminal bridge.

Aspect 21: The method of forming an electrolyte stack assembly of Aspects 17-20, wherein forming a cathode feedthrough bridge assembly includes providing a cathode feedthrough bridge that includes a plurality of slots for receiving tabs from the cathode assemblies; and attaching a cathode feedthrough terminal to the cathode terminal bridge.

Aspect 22: A method of forming a hydrogen metal battery, comprising: forming an electrode stack assembly, wherein forming the electrode stack assembly includes: assembling a plurality of cathode assemblies, each cathode assembly having cathode tabs attached to one or more cathode material layers, assembling a plurality of anode assemblies, each anode assembly having anode tabs coupled to one or more anode material layers, forming a plurality of separators from separator material, forming frame top portions and frame bottom portions, forming an anode feedthrough bridge assembly that includes an anode feedthrough terminal, forming a cathode feedthrough bridge assembly that includes a cathode feedthrough terminal, stacking the separators, anode assemblies, and cathode assemblies in alternate fashion between the frame top portion and the frame bottom portion to capture the electrodes between the frame top portion and the frame bottom portion, pressing the electrodes, the frame top portion, and the frame bottom portion, forming an electrode stack by attaching the frame top portion to the frame bottom portion to form a frame, attaching cathode tabs of the plurality of cathode assemblies in the electrode stack to the cathode feedthrough bridge assembly, and attaching anode tabs of the plurality of anode assembles in the electrode stack to the anode feedthrough bridge assembly; attaching an anode end cap to a vessel side wall; inserting the electrode stack assembly into the vessel side wall so that the anode feedthrough terminal engages with the anode end cap; attaching a cathode end cap to the vessel side wall such that the cathode feedthrough terminal passes through a feedthrough in the cathode end cap.

One skilled in the art will recognize that the steps described above with method 2000 may be performed in orders other than that specifically described. Further, particular dimensions or descriptions described above with respect to particular components are exemplary only and are not intended to be limiting. Embodiments of the invention described herein are not intended to be limiting of the invention. One skilled in the art will recognize that numerous variations and modifications within the scope of the present invention are possible. Consequently, the present invention is set forth in the following claims.

What is claimed is:

1. An electrode stack assembly for a metal hydrogen battery, comprising:
    a plurality of anode assemblies, each anode assembly including a plurality of anode layers each attached to an anode tab, wherein each anode layer of the plurality of anode layers is formed of a porous conductive substrate with a bi-functional catalyst layer;
    a plurality of cathode assemblies, each cathode assembly including at least one cathode layer attached to a cathode tab;
    a plurality of separators;
    an anode feedthrough bridge arranged to engage each anode tab of each of the plurality of anode assemblies;
    a cathode feedthrough bridge arranged to engage each cathode tab of each of the plurality of cathode assemblies;
    an anode feedthrough terminal coupled to the anode feedthrough bridge; and
    a cathode feedthrough terminal coupled to the cathode feedthrough bridge,
    wherein the plurality of anode assemblies and the plurality of cathode assemblies are alternately arranged and separated by the plurality of separators to form an electrode stack.

2. The electrode stack assembly of claim 1, wherein each of the plurality of separators includes a plurality of wick tabs.

3. The electrode stack assembly of claim 1, further including a frame arranged to hold the electrode stack.

4. The electrode stack assembly of claim 3, wherein the frame includes a top portion and a bottom portion that are welded while the electrode stack enclosed in the frame is pressed.

5. The electrode stack assembly of claim 3, further including
    an anode isolator positioned between the electrode stack and the anode feedthrough bridge; and
    a cathode isolator positioned between the electrode stack and the cathode feedthrough bridge.

6. The electrode stack assembly of claim 1, wherein the plurality of anode layers includes three layers attached by application of pressure and wherein the anode tab is attached to the three layers by welding.

7. The electrode stack assembly of claim 1, wherein each of the plurality of cathode assemblies includes
    a pair of cathode components, each cathode component including a cathode layer of the at least one cathode layer attached to the cathode tab, the pair of cathode components being positioned with respect to one another such that the cathode tabs align; and
    wherein the plurality of separators include separator pouches where the pair of cathode components are inserted into the separator pouch such that the cathode tabs are exposed to engage in the cathode feedthrough bridge.

8. The electrode stack assembly of claim 1, wherein the anode feedthrough assembly is formed of a metal with an array of slots formed to receive anode tabs.

9. The electrode stack assembly of claim 1, wherein the cathode feedthrough assembly is formed of a metal with an array of slots formed to receive cathode tabs.

10. A metal hydrogen battery, comprising:
    an electrode stack assembly, the electrode stack assembly including:
        a plurality of anode assemblies, each anode assembly including at a plurality of anode layers each attached to an anode tab, wherein each anode layer of the plurality of anode layers is formed of a porous conductive substrate with a bi-functional catalyst layer,
        a plurality of cathode assemblies, each cathode assembly including at least one cathode layer attached to a cathode tab,
        a plurality of separators,
        an anode feedthrough bridge arranged to engage each anode tab of each of the plurality of anode assemblies, a cathode feedthrough bridge arranged to engage each cathode tab of each of the plurality of cathode assemblies;

an anode feedthrough terminal coupled to the anode feedthrough bridge; and a cathode feedthrough terminal coupled to the cathode feedthrough bridge, wherein the plurality of anode assemblies, the plurality of cathode assemblies, and the plurality of separators are alternately arranged to form an electrode stack;

a pressure vessel surrounding the electrode stack assembly such that the cathode feedthrough terminal extends through the pressure vessel; and an electrolyte contained within the pressure vessel.

11. The metal hydrogen battery of claim 10, wherein the cathode feedthrough terminal extends through a feedthrough in an end of the pressure vessel.

12. The metal hydrogen battery of claim 11, wherein the feedthrough includes a body portion that attaches to the pressure vessel and an insulator portion that inserts into the body portion and engages the cathode feedthrough terminal.

13. The metal hydrogen battery of claim 12, wherein the body portion is crushed to form seals between the body portion, the insulator portion, and the cathode feedthrough terminal.

14. The metal hydrogen battery of claim 12, wherein the pressure vessel is formed with a vessel side wall, a cathode end cap that includes the feedthrough attached to the vessel side wall, and an anode end cap attached to the vessel side wall.

15. The metal hydrogen battery of claim 14, wherein the anode feedthrough terminal is attached to the anode end cap.

16. The metal hydrogen of claim 15, wherein the anode feedthrough terminal extends through the anode end cap.

* * * * *